(12) United States Patent
Fadell et al.

(10) Patent No.: US 10,853,733 B2
(45) Date of Patent: Dec. 1, 2020

(54) DEVICES, METHODS, AND ASSOCIATED INFORMATION PROCESSING FOR SECURITY IN A SMART-SENSORED HOME

(71) Applicant: Google LLC, Mountain View, CA (US)

(72) Inventors: Anthony M. Fadell, Portola Valley, CA (US); Matthew Lee Rogers, Los Gatos, CA (US); Yoky Matsuoka, Los Altos Hills, CA (US); David Sloo, Menlo Park, CA (US); Maxime Veron, San Jose, CA (US); Shigefumi Honjo, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 581 days.

(21) Appl. No.: 15/705,400

(22) Filed: Sep. 15, 2017

(65) Prior Publication Data

US 2018/0005125 A1   Jan. 4, 2018

Related U.S. Application Data

(63) Continuation of application No. 14/824,834, filed on Aug. 12, 2015, now Pat. No. 9,798,979, which is a
(Continued)

(51) Int. Cl.
*G05B 19/042* (2006.01)
*G06N 5/04* (2006.01)
(Continued)

(52) U.S. Cl.
CPC .............. *G06N 5/04* (2013.01); *G05B 15/02* (2013.01); *G05B 19/042* (2013.01); *G08B 19/00* (2013.01);
(Continued)

(58) Field of Classification Search
CPC ........ G06N 5/04; H05B 47/10; H05B 47/175; H05B 47/105; H04W 4/80; H04W 4/00;
(Continued)

(56) References Cited

U.S. PATENT DOCUMENTS 2,101,637 A   12/1937 Davis
3,640,455 A   2/1972 Romanelli
(Continued)

FOREIGN PATENT DOCUMENTS

BE   1001873   4/1990
CA   1187966   5/1985
(Continued)

OTHER PUBLICATIONS

Preliminary Rejection dated Feb. 3, 2020 in Korean Patent Application No. 10-2019-7031303, 10 pages.
(Continued)

*Primary Examiner* — Adam R Mott
(74) *Attorney, Agent, or Firm* — Kilpatrick Townsend & Stockton LLP

(57) ABSTRACT

Various systems and method related to home automation systems are presented. A service robot system may be present that includes a service robot that autonomously moves within a structure to perform a household task. The service robot system may include a wireless communication interface, wherein the service robot system is configured to transmit, via the wireless communication interface, an indication of robot activity indicative of the service robot moving within the structure. Such a home automation system may also include a home security system that includes one or more motion sensors that detect motion within a structure. The home security system may be configured to
(Continued)

distinguish intrusion activity (e.g., a burglar) from robot activity based at least in part on the indication of robot activity.

16 Claims, 16 Drawing Sheets

Related U.S. Application Data continuation of application No. 13/830,795, filed on Mar. 14, 2013, now Pat. No. 9,208,676.

(51) Int. Cl.
| | | |
|---|---|---|
| *G08B 27/00* | (2006.01) | |
| *H04W 4/80* | (2018.01) | |
| *G08B 19/00* | (2006.01) | |
| *H04L 12/28* | (2006.01) | |
| *G05B 15/02* | (2006.01) | |
| *H05B 47/10* | (2020.01) | |
| *H04W 4/00* | (2018.01) | |
| *C08L 1/00* | (2006.01) | |
| *G08B 15/00* | (2006.01) | |
| *G08B 25/00* | (2006.01) | |
| *H05B 47/105* | (2020.01) | |
| *H05B 47/175* | (2020.01) | |

(52) U.S. Cl.
CPC ........ *G08B 27/003* (2013.01); *H04L 12/2803* (2013.01); *H04L 12/2825* (2013.01); *H04W 4/80* (2018.02); *H05B 47/10* (2020.01); *C08L 1/00* (2013.01); *G05B 2219/2642* (2013.01); *G08B 15/002* (2013.01); *G08B 25/008* (2013.01); *H04W 4/00* (2013.01); *H05B 47/105* (2020.01); *H05B 47/175* (2020.01)

(58) Field of Classification Search
CPC ............. H04L 12/2825; H04L 12/2803; H04L 12/2807; H04L 12/2821; G08B 19/00; G08B 27/003; G08B 25/008; G08B 15/002; G08B 21/00; G05B 2219/2642; G05B 15/02; G05B 19/042; C08L 1/00
See application file for complete search history.

(56) References Cited

U.S. PATENT DOCUMENTS

| | | |
|---|---|---|
| 3,724,534 A | 4/1973 | Weatherston |
| 4,183,290 A | 1/1980 | Kucharczyk |
| 4,330,047 A | 5/1982 | Ruspa et al. |
| 4,401,978 A | 8/1983 | Solomon |
| 4,417,687 A | 11/1983 | Grant |
| 4,646,964 A | 3/1987 | Parker et al. |
| 4,656,835 A | 4/1987 | Kidder et al. |
| 4,657,179 A | 4/1987 | Aggers et al. |
| 4,716,957 A | 1/1988 | Thompson et al. |
| 4,742,475 A | 5/1988 | Kaiser et al. |
| 4,754,697 A | 7/1988 | Asselbergs |
| 4,809,593 A | 3/1989 | Asselbergs |
| 4,824,012 A | 4/1989 | Tate |
| 4,830,095 A | 5/1989 | Friend |
| RE32,960 E | 6/1989 | Levine |
| 4,846,399 A | 7/1989 | Asselbergs |
| 4,857,895 A | 8/1989 | Kaprelian |
| 4,857,912 A | 8/1989 | Everett, Jr. et al. |
| 4,886,110 A | 12/1989 | Jackson |
| 4,942,348 A | 7/1990 | Nilsson |
| 4,948,040 A | 8/1990 | Kobayashi et al. |
| D310,873 S | 9/1990 | Asselbergs |
| 4,962,473 A | 10/1990 | Crain |
| 5,065,813 A | 11/1991 | Berkeley et al. |
| 5,086,385 A | 2/1992 | Launey et al. |
| 5,161,606 A | 11/1992 | Berkeley et al. |
| 5,224,648 A | 7/1993 | Simon et al. |
| 5,268,668 A | 12/1993 | Berube |
| 5,271,558 A | 12/1993 | Hampton |
| 5,301,101 A | 4/1994 | MacArthur et al. |
| 5,303,767 A | 4/1994 | Riley |
| 5,318,104 A | 6/1994 | Shah et al. |
| 5,348,078 A | 9/1994 | Dushane et al. |
| 5,364,304 A | 11/1994 | Hampton |
| 5,381,950 A | 1/1995 | Aldridge |
| 5,395,042 A | 3/1995 | Riley et al. |
| 5,449,319 A | 9/1995 | Dushane et al. |
| 5,452,762 A | 9/1995 | Zillner, Jr. |
| 5,467,921 A | 11/1995 | Shreeve et al. |
| 5,489,238 A | 2/1996 | Asselbergs |
| 5,495,887 A | 3/1996 | Kathnelson et al. |
| 5,533,668 A | 7/1996 | Erikson |
| 5,544,036 A | 8/1996 | Brown, Jr. et al. |
| 5,595,342 A | 1/1997 | McNair et al. |
| 5,611,484 A | 3/1997 | Uhrich |
| 5,622,221 A | 4/1997 | Genga, Jr. et al. |
| 5,635,896 A | 6/1997 | Tinsley et al. |
| 5,644,173 A | 7/1997 | Elliason et al. |
| 5,711,480 A | 1/1998 | Zepke et al. |
| 5,761,083 A | 6/1998 | Brown, Jr. et al. |
| 5,802,467 A | 9/1998 | Salazar et al. |
| 5,810,245 A | 9/1998 | Heitman et al. |
| 5,819,840 A | 10/1998 | Wilson et al. |
| 5,839,654 A | 11/1998 | Weber |
| 5,926,776 A | 7/1999 | Glorioso et al. |
| 5,944,098 A | 8/1999 | Jackson |
| 5,950,709 A | 9/1999 | Krueger et al. |
| 6,023,938 A | 2/2000 | Taras et al. |
| 6,102,749 A | 8/2000 | Lynn et al. |
| 6,111,511 A | 8/2000 | Sivathanu et al. |
| 6,116,512 A | 9/2000 | Dushane et al. |
| 6,145,752 A | 11/2000 | Jackson |
| 6,250,382 B1 | 6/2001 | Rayburn et al. |
| 6,322,443 B1 | 11/2001 | Jackson |
| 6,338,677 B1 | 1/2002 | White |
| 6,385,510 B1 | 5/2002 | Hoog et al. |
| 6,400,265 B1 | 6/2002 | Saylor et al. |
| 6,453,687 B2 | 9/2002 | Sharood et al. |
| 6,488,081 B2 | 12/2002 | Rayburn et al. |
| 6,491,094 B2 | 12/2002 | Rayburn et al. |
| 6,519,509 B1 | 2/2003 | Nierlich et al. |
| 6,574,581 B1 | 6/2003 | Bohrer et al. |
| 6,604,023 B1 | 8/2003 | Brown et al. |
| 6,619,055 B1 | 9/2003 | Addy |
| 6,619,555 B2 | 9/2003 | Rosen |
| 6,622,115 B1 | 9/2003 | Brown et al. |
| 6,622,925 B2 | 9/2003 | Carner et al. |
| 6,692,349 B1 | 2/2004 | Brinkerhoff et al. |
| 6,798,341 B1 | 9/2004 | Eckel et al. |
| 6,851,621 B1 | 2/2005 | Wacker et al. |
| 6,851,967 B2 | 2/2005 | Miyoshi et al. |
| 6,891,838 B1 | 5/2005 | Petite et al. |
| 6,909,921 B1 | 6/2005 | Bilger |
| 6,912,429 B1 | 6/2005 | Bilger |
| 6,975,958 B2 | 12/2005 | Bohrer et al. |
| 6,983,889 B2 | 1/2006 | Alles |
| 6,997,390 B2 | 2/2006 | Alles |
| 7,014,124 B2 | 3/2006 | Gottlieb |
| 7,055,759 B2 | 6/2006 | Wacker et al. |
| 7,057,506 B2 | 6/2006 | Bash et al. |
| 7,083,109 B2 | 8/2006 | Pouchak |
| 7,109,879 B2 | 9/2006 | Stults et al. |
| 7,135,965 B2 | 11/2006 | Chapman, Jr. et al. |
| 7,156,316 B2 | 1/2007 | Kates |
| 7,156,318 B1 | 1/2007 | Rosen |
| 7,163,156 B2 | 1/2007 | Kates |
| 7,167,079 B2 | 1/2007 | Smyth et al. |
| 7,168,627 B2 | 1/2007 | Kates |
| 7,181,317 B2 | 2/2007 | Amundson et al. |
| 7,289,887 B2 | 10/2007 | Rodgers |
| 7,360,370 B2 | 4/2008 | Shah et al. |
| RE40,437 E | 7/2008 | Rosen |
| 7,434,742 B2 | 10/2008 | Mueller et al. |
| 7,455,236 B2 | 11/2008 | Kates |

(56) References Cited

U.S. PATENT DOCUMENTS

| | | |
|---|---|---|
| 7,455,237 B2 | 11/2008 | Kates |
| 7,460,690 B2 | 12/2008 | Cohen et al. |
| 7,469,550 B2 | 12/2008 | Chapman, Jr. et al. |
| 7,537,171 B2 | 5/2009 | Mueller et al. |
| 7,558,648 B2 | 7/2009 | Hoglund et al. |
| 7,562,536 B2 | 7/2009 | Harrod et al. |
| 7,571,865 B2 | 8/2009 | Nicodem et al. |
| 7,579,945 B1 | 8/2009 | Richter et al. |
| 7,605,714 B2 | 10/2009 | Thompson et al. |
| 7,623,028 B2 | 11/2009 | Kates |
| 7,634,504 B2 | 12/2009 | Amundson et al. |
| 7,703,694 B2 | 4/2010 | Mueller et al. |
| D614,976 S | 5/2010 | Skafdrup et al. |
| 7,748,640 B2 | 7/2010 | Roher et al. |
| 7,832,465 B2 | 11/2010 | Zou et al. |
| 7,837,128 B2 | 11/2010 | Helt et al. |
| 7,844,764 B2 | 11/2010 | Williams |
| 7,847,681 B2 | 12/2010 | Singhal et al. |
| 7,904,209 B2 | 3/2011 | Podgorny et al. |
| 7,904,830 B2 | 3/2011 | Hoglund et al. |
| 7,994,928 B2 | 8/2011 | Richmond |
| 8,016,205 B2 | 9/2011 | Drew |
| 8,033,479 B2 | 10/2011 | Kates |
| 8,037,022 B2 | 10/2011 | Rahman et al. |
| 8,067,912 B2 | 11/2011 | Mullin |
| 8,098,166 B2 | 1/2012 | Lang |
| D660,732 S | 5/2012 | Bould et al. |
| 8,510,255 B2 | 8/2013 | Fadell et al. |
| 8,606,374 B2 | 12/2013 | Fadell et al. |
| 8,695,888 B2 | 4/2014 | Kates |
| 8,727,611 B2 | 5/2014 | Huppi et al. |
| 9,046,414 B2 | 6/2015 | Fadell |
| 9,208,676 B2 | 12/2015 | Fadell et al. |
| 9,223,323 B2 | 12/2015 | Matas et al. |
| 9,798,979 B2 | 10/2017 | Fadell et al. |
| 2001/0048030 A1 | 12/2001 | Sharood et al. |
| 2001/0052774 A1 | 12/2001 | Rossi et al. |
| 2002/0017107 A1 | 2/2002 | Bailey et al. |
| 2002/0078382 A1 | 6/2002 | Sheikh et al. |
| 2003/0231001 A1 | 12/2003 | Bruning |
| 2003/0234169 A1 | 12/2003 | Iwakiri |
| 2004/0130454 A1 | 7/2004 | Barton |
| 2004/0164238 A1 | 8/2004 | Xu et al. |
| 2004/0193324 A1 | 9/2004 | Hoog et al. |
| 2004/0194484 A1 | 10/2004 | Zou et al. |
| 2004/0211200 A1 | 10/2004 | McMillan et al. |
| 2004/0215750 A1 | 10/2004 | Stilp et al. |
| 2004/0224627 A1 | 11/2004 | Becelaere et al. |
| 2004/0238651 A1 | 12/2004 | Juntunen et al. |
| 2005/0040250 A1 | 2/2005 | Wruck |
| 2005/0043907 A1 | 2/2005 | Eckel et al. |
| 2005/0082053 A1 | 4/2005 | Halabi |
| 2005/0090915 A1 | 4/2005 | Geiwitz et al. |
| 2005/0114625 A1 | 5/2005 | Snyder et al. |
| 2005/0156731 A1 | 7/2005 | Chapman et al. |
| 2005/0159846 A1 | 7/2005 | Van Ostrand et al. |
| 2005/0194455 A1 | 9/2005 | Alles |
| 2005/0194456 A1 | 9/2005 | Tessier et al. |
| 2005/0270151 A1 | 12/2005 | Winick |
| 2005/0284622 A1 | 12/2005 | Nichols |
| 2006/0059557 A1 | 3/2006 | Markham et al. |
| 2006/0071086 A1* | 4/2006 | Kates ................... F24F 11/30 236/1 B |
| 2006/0071087 A1 | 4/2006 | Kates |
| 2006/0071089 A1 | 4/2006 | Kates |
| 2006/0105697 A1 | 5/2006 | Aronstam et al. |
| 2006/0149395 A1 | 7/2006 | Archacki et al. |
| 2006/0186214 A1 | 8/2006 | Simon et al. |
| 2006/0208099 A1 | 9/2006 | Chapman et al. |
| 2007/0037507 A1 | 2/2007 | Liu |
| 2007/0045441 A1 | 3/2007 | Ashworth et al. |
| 2007/0082601 A1 | 4/2007 | Desrochers et al. |
| 2007/0095518 A1 | 5/2007 | Kates |
| 2007/0102149 A1 | 5/2007 | Kates |
| 2007/0114295 A1 | 5/2007 | Jenkins |
| 2007/0115902 A1 | 5/2007 | Shamoon et al. |
| 2007/0119957 A1 | 5/2007 | Kates |
| 2007/0131787 A1 | 6/2007 | Rossi et al. |
| 2007/0157639 A1 | 7/2007 | Harrod |
| 2007/0208461 A1 | 9/2007 | Chase |
| 2007/0221225 A1 | 9/2007 | Kutt et al. |
| 2007/0221741 A1 | 9/2007 | Wagner et al. |
| 2007/0228183 A1 | 10/2007 | Kennedy et al. |
| 2007/0241945 A1 | 10/2007 | Moorer et al. |
| 2007/0266575 A1 | 11/2007 | Nash |
| 2007/0275690 A1 | 11/2007 | Hunter et al. |
| 2008/0015740 A1 | 1/2008 | Osann |
| 2008/0015742 A1 | 1/2008 | Kulyk et al. |
| 2008/0097651 A1 | 4/2008 | Shah et al. |
| 2008/0099568 A1 | 5/2008 | Nicodem et al. |
| 2008/0128523 A1 | 6/2008 | Hoglund et al. |
| 2008/0161977 A1 | 7/2008 | Takach et al. |
| 2008/0179052 A1 | 7/2008 | Kates |
| 2008/0179053 A1 | 7/2008 | Kates |
| 2008/0185450 A1 | 8/2008 | Kwon et al. |
| 2008/0188763 A1 | 8/2008 | John et al. |
| 2008/0201116 A1 | 8/2008 | Ozdemir et al. |
| 2008/0231468 A1 | 9/2008 | Myllymaki |
| 2008/0281473 A1 | 11/2008 | Pitt |
| 2008/0294212 A1 | 11/2008 | Siejko et al. |
| 2009/0045263 A1 | 2/2009 | Mueller et al. |
| 2009/0057425 A1 | 3/2009 | Sullivan et al. |
| 2009/0065595 A1 | 3/2009 | Kates |
| 2009/0066534 A1 | 3/2009 | Sivakkolundhu |
| 2009/0077622 A1 | 3/2009 | Baum et al. |
| 2009/0140056 A1 | 6/2009 | Leen |
| 2009/0140064 A1 | 6/2009 | Schulz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0194601 A1 | 8/2009 | Flohr |
| 2009/0236433 A1 | 9/2009 | Mueller et al. |
| 2009/0243842 A1 | 10/2009 | Mitchell et al. |
| 2009/0261174 A1 | 10/2009 | Butler et al. |
| 2010/0000239 A1 | 1/2010 | Lifson et al. |
| 2010/0006660 A1 | 1/2010 | Leen et al. |
| 2010/0012737 A1 | 1/2010 | Kates |
| 2010/0114382 A1 | 5/2010 | Ha et al. |
| 2010/0131112 A1 | 5/2010 | Amundson et al. |
| 2010/0161720 A1 | 6/2010 | Colligan et al. |
| 2010/0163633 A1 | 7/2010 | Barrett et al. |
| 2010/0163635 A1 | 7/2010 | Ye |
| 2010/0168924 A1 | 7/2010 | Tessier et al. |
| 2010/0238036 A1 | 9/2010 | Holcombe |
| 2010/0250009 A1 | 9/2010 | Lifson et al. |
| 2010/0261465 A1 | 10/2010 | Rhoads et al. |
| 2010/0298985 A1 | 11/2010 | Hess et al. |
| 2010/0305771 A1 | 12/2010 | Rodgers |
| 2011/0001812 A1 | 1/2011 | Kang et al. |
| 2011/0054699 A1 | 3/2011 | Imes et al. |
| 2011/0151837 A1 | 6/2011 | Winbush, III |
| 2011/0253796 A1 | 10/2011 | Posa et al. |
| 2011/0254680 A1 | 10/2011 | Perkinson et al. |
| 2011/0298623 A1 | 12/2011 | Lenkeit et al. |
| 2012/0001755 A1 | 1/2012 | Conrady |
| 2012/0024969 A1 | 2/2012 | Kates |
| 2012/0065783 A1 | 3/2012 | Fadell et al. |
| 2012/0128025 A1 | 5/2012 | Huppi et al. |
| 2012/0130546 A1 | 5/2012 | Matas et al. |
| 2012/0184305 A1 | 7/2012 | Betts et al. |
| 2012/0185945 A1 | 7/2012 | Andres et al. |
| 2012/0248211 A1 | 10/2012 | Warren et al. |
| 2012/0306661 A1 | 12/2012 | Xue et al. |
| 2012/0310547 A1 | 12/2012 | Cristoforo |
| 2013/0008787 A1 | 1/2013 | Mammoto et al. |
| 2013/0049950 A1 | 2/2013 | Wohlert |
| 2013/0241727 A1 | 9/2013 | Coulombe |
| 2014/0006502 A1 | 1/2014 | Gandhi |

(56) References Cited

U.S. PATENT DOCUMENTS

| | | | | |
|---|---|---|---|---|
| 2014/0207282 | A1* | 7/2014 | Angle | H04L 12/2809 700/257 |
| 2015/0170509 | A1* | 6/2015 | Artes | G08B 13/18 340/501 |

FOREIGN PATENT DOCUMENTS

| | | | |
|---|---|---|---|
| CN | 101887631 | A | 11/2010 |
| CN | 102306439 | A | 1/2012 |
| EP | 447458 | | 9/1991 |
| EP | 510807 | | 10/1992 |
| EP | 632234 | | 1/1995 |
| EP | 697571 | | 2/1996 |
| EP | 710804 | | 5/1996 |
| EP | 710804 | | 12/1997 |
| EP | 1614975 | | 1/2006 |
| EP | 1275037 | | 2/2006 |
| FR | 2671372 | | 7/1992 |
| JP | 9298780 | | 11/1997 |
| JP | 10023565 | | 1/1998 |
| JP | 2003-288118 | A | 10/2003 |
| JP | 2007-072622 | A | 3/2007 |
| JP | 2007-316821 | A | 12/2007 |
| JP | 2012-008902 | A | 1/2012 |
| JP | 2012-083845 | A | 4/2012 |
| KR | 2007-0061213 | A | 6/2007 |
| KR | 2009-0114965 | A | 11/2009 |
| KR | 2011-0092502 | A | 8/2011 |
| KR | 2011-0138711 | A | 12/2011 |
| KR | 2013-0002218 | A | 1/2013 |
| SI | 20556 | | 10/2001 |
| WO | 2005019740 | | 3/2005 |
| WO | 2006041599 | | 4/2006 |
| WO | 09/28/2006 | A1 | 9/2006 |
| WO | 2006041599 | | 9/2006 |
| WO | 2007027554 | | 3/2007 |
| WO | 2008054938 | | 5/2008 |
| WO | 2008094166 | | 8/2008 |

OTHER PUBLICATIONS

CN Patent Application No. 201480024599.0 filed Mar. 7, 2014, Office Action dated Nov. 10, 2017, all pages.
AU Patent Application No. 2014241282 filed Mar. 7, 2014), Second Examination Report dated Dec. 5, 2017, all pages.
6 Zone HVAC Control Unit, Product Specification for RCS Model ZC6R, 2 pages.
A 6-in-1 Device: Intelligent Residential Control Introduced by Carrier, Retrieved from the Internet URL: http://www.global.carrier.com/details/0.CLI1_DIV28_ET18093.00.html, 3 pages.
Aprilaire Electronic Thermostats Model 8355 User's Manual, Research Products Corporation, Dec. 2000, 16 pages.
Arens, et al., Demand Response Enabling Technology Development, Phase I Report: Jun. 2003-Nov. 2005, University of California Berkeley, Apr. 4, 2006, pp. 1-108.
Arens, et al., New Thermostat Demand Response Enabling Technology, Poster, University of California Berkeley, Jun. 10, 2004.
Automatically Control Your In-Wall or In-Floor Registers!, Retrieved from the Internet URL: http://www.smarthome.com/3096.html, 2004, 1 page.
Automation for Your Home, RCS Product Catalog, Jun. 2004, 14 pages.
Bourke, Server Load Balancing, O'Reilly & Associates, Inc., Aug. 2001, 182 pages.
Braeburn 5300 Installer Guide , Braeburn Systems, LLC, Dec. 9, 2009, 10 pages.
Braeburn Model 5200, Braeburn Systems, LLC, Jul. 20, 2011, 11 pages.
Bryant, SYSTXBBUID01 Evolution Control Installation Instructions, Feb. 2004, 16 pages.
Comfort System: Commercial VAV & Zone Control Systems, Product Specification, Mar. 2003, 14 pages.
DIY Zoning: Can I Do It? Retrieved from the Internet URL: http://diy-zoning.sourceforge.net/Advanced/prerequisites.html, Sep. 2004, 4 pages.
DIY Zoning: Dampers, Retrieved from the Internet URL: http://diy-zoning.sourceforge.net/Advnaced/dampers.html, Sep. 2004, 3 pages.
DIY Zoning: Passive Mode, Retrieved from the Internet URL: http://diyzoning.sourceforge.net/Advanced/passive_mode.html, Sep. 2004, 4 pages.
DIY Zoning: Technical FAQ, Retrieved from the Internet URL: http://diy-zoning.sourceforge.net/Advanced/faq.html, Sep. 2004, 11 pages.
DIY Zoning: Total Control, Retrieved from the Internet URL: http://diy-zoning.sourceforge.net/Advanced/total_control.html, Sep. 2004, 3 pages.
Ecobee Smart Thermostat Installation Manual, Jun. 29, 2011, 20 pages.
Ecobee Smart Thermostat User Manual, May 11, 2010, 20 pages.
Honeywell Installation Guide FocusPRO TH6000 Series, Honeywell International, Inc., Jan. 5, 2012, 24 pages.
Honeywell Operating Manual FocusPRO TH6000 series, Honeywell International, Inc., Mar. 25, 2011, 80 pages.
Honeywell Prestige THX9321-9421 Operating Manual, Honeywell International, Inc., Jul. 6, 2011, 120 pages.
Honeywell THX9321 Prestige 2.0 and TXH9421 Prestige IAQ 2.0 with EIM Product Data, Honeywell International, Inc., 68-0311, Jan. 2012, 126 pages.
Hunter Internet Thermostat Installation Guide, Hunter Fan Co., Aug. 14, 2012, 8 pages.
Indoor: Home Comfort: Fans/Air Conditioning: Blower Booster, Retrieved from the Internet URL: http://www.improvementscatalog.com/product.asp?product=49254zz&dept%5Fid=10100.html, 2003, 1 page.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
Rauchwarnmelder, Datasheet [online]. GIRA [retrieved on Mar. 7, 2013]. Retrieved from the Internet: <URL: http://www.gira.de/gebaeudetechnik/produukte/sicherheit/rauchmelder/rauchwarnmelderdualvds.html>, 14 pages.
Rauchwarnmelder, Design [online]. GIRA [retrieved on Mar. 7, 2013]. Retrieved from the Internet: <URL:http://www.gira.de/gebaeudetechnik/produkte/sicherheit/rauchmelder/rauchwarnmelderdualvds.html?vid=1145>, 7 pages.
Rauchwarnmelder, Installation and User Manual [online]. GIRA [retrieved on Mar. 8, 2013]. Retrieved from the Internet: <URL: http://download.gira.de.data2/23301210.pdf>.
RobertShaw Product Manual 9620, Maple Chase company, Jun. 12, 2001, 14 pages.
RobertShaw Product Manual 9825i2, Maple Chase Company, Jul. 17, 2006, 36 pages.
SA720 Smoke Alarm User Manual, First alert, Aug. 2007, 6 pages.
Smoke Alarm User Manual, Kiddie, i9060, Dec. 1, 2009, 2 pages.
SYSTXCCUIZ01-V Infinity Control Installation Instructions, Carrier Corp., May 31, 2012, 20 pages.
TB-PAC, TB-PHP, Base Series Programmable Thermostats, Carrier Corp., May 14, 2012, 8 pages.
TP-PAC, TP-PHP, TP-NAC, TP-NHP Performance Series AC/HP Thermostat Installation Instructions, Carrier Corp., Sep. 2007, 56 pages.
Trane Communicating Thermostats for Fan Coil, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.

(56) References Cited

OTHER PUBLICATIONS

Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
Want to Prevent Over Pressure Buildup in Your HVAC System?, Retrieved from the Internet URL: http://www.smarthome.com/3072.html, 1 page.
White, et al., A conceptual Model for Simulation Load Balancing, Proceedings of the 1998 Spring Simulation Interoperability Workshop, 1998, pp. 1-7.
White Rodgers (Emerson) Model 1F81-261 Installation and Operating instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Restriction Requirement dated May 31, 2006, for U.S. Appl. No. 10/959,361, filed Oct. 6, 2004, all pages.
Notice of Allowance dated Oct. 11, 2006, for U.S. Appl. No. 10/959,361, filed Oct. 6, 2004, all pages.
Restriction Requirement dated May 31, 2006, for U.S. Appl. No. 10/959,362, filed Oct. 6, 2004, all pages.
Notice of Allowance dated Oct. 11, 2006, for U.S. Appl. No. 10/959,362, filed Oct. 6, 2004, all pages.
Restriction Requirement dated Apr. 27, 2006, for U.S. Appl. No. 10/959,494, filed Oct. 6, 2004, all pages.
Notice of Allowance dated Oct. 26, 2006, for U.S. Appl. No. 10/959,494, filed Oct. 6, 2004, all pages.
Restriction Requirement dated Mar. 3, 2008, for U.S. Appl. No. 11/613,090, filed Dec. 19, 2006, all pages.
Non-Final Office Action dated Apr. 22, 2008, for U.S. Appl. No. 11/613,090, filed Dec. 19, 2006, all pages.
Notice of Allowance dated Oct. 3, 2008, for U.S. Appl. No. 11/613,090, filed Dec. 19, 2006, all pages.
Restriction requirement dated Nov. 15, 2007 for U.S. Appl. No. 11/613,110, filed Dec. 19, 2006, all pages.
Non-Final Office Action dated Feb. 1, 2008, for U.S. Appl. No. 11/613,110, filed Dec. 19, 2006, all pages.
Non-Final Office Action dated Jul. 22, 2008, for U.S. Appl. No. 11/613,110, filed Dec. 19, 2006, all pages.
Restriction Requirement dated Jan. 16, 2008, for U.S. Appl. No. 11/613,116, filed Dec. 19, 2006, all pages.
Non-Final Office Action dated Apr. 23, 2008, for U.S. Appl. No. 11/613,116, filed Dec. 19, 2006, all pages.
Notice of Allowance dated Oct. 9, 2008, for U.S. Appl. No. 11/613,116, filed Dec. 19, 2006, all pages.
Non-Final Office Action dated Aug. 22, 2013, for U.S. Appl. No. 13/269,155, filed Oct. 7, 2011, all pages.
Notice of Allowance dated Dec. 6, 2013, for U.S. Appl. No. 13/269,155, filed Oct. 7, 2011, all pages.
ISR/WO mailed on Feb. 13, 2009, for International Application No. PCT/US2007/008322 filed on Apr. 4, 2007, all pages.
ISR/WO mailed on Sep. 19, 2014, for International Application No. PCT/US2014/022105 filed on May 7, 2014, all pages.
International Preliminary Report on Patentability dated Sep. 24, 2015, for International Patent Application No. PCT/US2014/022105, 8 pages.
Non-Final Office Action dated Jul. 11, 2016, for U.S. Appl. No. 14/047,447 8 pages.
CN Patent Application No. 201480024599.0 filed Mar. 7, 2014, CN/EP Office Action dated Nov. 9, 2016.
RCS Technology, "6 Zone HVAC Control Unit", Product Specification for RCS Model ZC6R, Feb. 2002, ww2 pages.
Carrier Corporation, "A 6-in-1 Device: Intelligent Residential Control Introduced by Carrier", Jan. 21, 2004, Retrieved from: http://www.global.carrier.com/details/O.CLI1_DIV28_ET18093.00.html, 3 pages.
Smart Homes, "Want to Prevent Over Pressure Buildup in Your HVAC System?: Barometric Pressure Relief Bypass Duct", Sep. 30, 2004, Retrieved from: http://www.smarthome.com/3072.html, 1 page.
Arens, et al., "New Thermostat Demand Response Enabling Technology", Poster, University of California Berkeley, Jun. 10, 2004, all pages.
U.S. Appl. No. 14/047,447, filed Oct. 7, 2013, Non-Final Office Action dated Jul. 11, 2016, all pages.
Grilli, S. et al. (Sep. 2008). Comanche: An architecture for software configuration management in the home environment. In International Conference on Network-Based Information Systems (pp. 283-292) Springer Berlin Heidelberg.
DIY Zoning: Release Notes, Retrieved from the Internet URL: http://diy-zoning.sourceforge.net/Advanced/release_notes.html, Sep. 2004, 4 pages.
Trane Communicating Thermostats for Heat Pump Control, Trane, May, 2011, 32 pages.
Invitation to Pay Additional Fees and Partial Search Report dated Jul. 17, 2014 in International Patent Application No. PCT/US2014/022105, all pages.
Ryan, D. et al. 'Safety and Health in Manufactured Structures', U.S. Department of Health and Human Services & U.S. Department of Housing and Urban Development. [retrieved from Internet on Dec. 5, 2017] <URL: https://www.cdc.gov/healthyhomes/manufactured_structures.pdf>published on Oct. 27, 2011 as per WayBack Machine, all pages.
Extended European Search Report dated Oct. 27, 2016 in European Patent Application No. 14774144.1, all pages.
$1^{st}$ Examination report dated Sep. 8, 2017 for Australian application No. 2014241282, all pages.
2nd Examination report dated Dec. 5, 2017 for Australian application No. 2014241282, all pages.
Insurance Council of Australia, "Consumer Tips, Increasing Community & Individual Resilience, Securing Your Property", Nov. 2010, available at http://www.insurancecouncil.com.au/for-consumers/consumer-tips or https://www.bing.com/search?q=insurance+council+of+australia+%22consumer+tips+increasing+community+and+individual+resilience+securing+your+property%22+november+2010&src=IE-SearchBox&FORM=IESR3N&PC=UF03, retrieved online on Jan. 23, 2020, 3 pages.

* cited by examiner

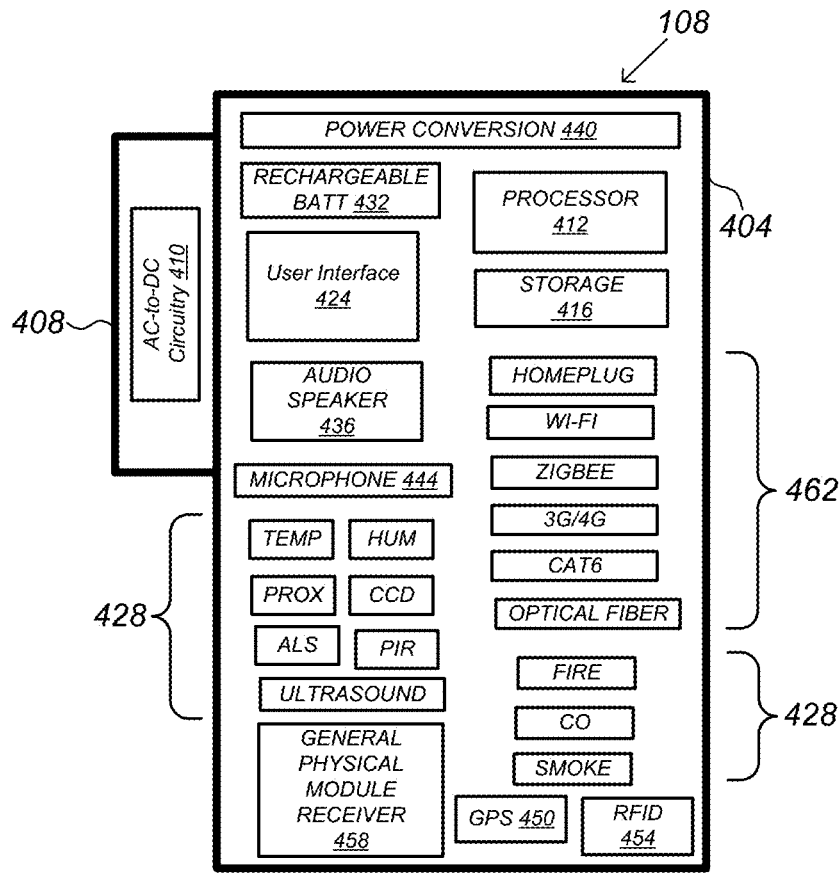
FIG. 4A
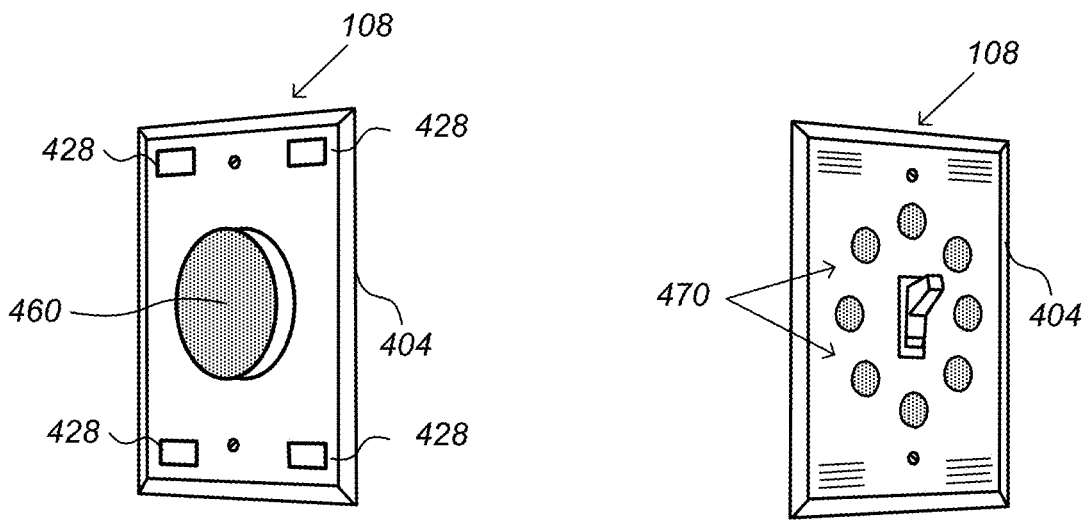
FIG. 4B
FIG. 4C

DEVICES, METHODS, AND ASSOCIATED INFORMATION PROCESSING FOR SECURITY IN A SMART-SENSORED HOME

CROSS-REFERENCES TO RELATED APPLICATIONS

This application is a continuation of U.S. patent application Ser. No. 14/824,834, filed Aug. 12, 2015, which is a continuation of U.S. patent application Ser. No. 13/830,795, filed Mar. 14, 2013, now U.S. Pat. No. 9,208,676, the entire disclosures of which are incorporated by reference herein for all purposes.

FIELD

This patent specification relates to apparatus, systems, methods, and related computer program products for providing home security objectives, such as calculating a security score for a home. More particularly, this patent specification relates to a plurality of devices, including intelligent, multi-sensing, network-connected devices, that communicate with each other and/or with a central server or a cloud-computing system to provide any of a variety of useful home security objectives, such as calculating a security score for a home.

BACKGROUND

Some homes today are equipped with smart home networks to provide automated control of devices, appliances and systems, such as heating, ventilation, and air conditioning ("HVAC") system, lighting systems, home theater, entertainment systems, as well as security systems. Smart home networks may include control panels that a person may use to input settings, preferences, and scheduling information that the smart home network uses to provide automated control of the various devices, appliances, and systems in the home. For example, the person may input a schedule indicating when the person is away from the home, and the smart home network uses this information along with information obtained from various devices in the home to detect unauthorized entry when the user is away.

BRIEF SUMMARY

Various techniques for providing home security objectives are disclosed herein. Embodiments described herein are representative examples of devices, methods, systems, services, and/or computer program products that can be used in conjunction with an extensible devices and services platform that, while being particularly applicable and advantageous for providing security objectives in the smart home context, is generally applicable to any type of enclosure or group of enclosures (e.g., offices, factories, retail stores), vessels (e.g., automobiles, aircraft), or other resource-consuming physical systems that will be occupied by humans or with which humans will physically or logically interact. Thus, although particular examples are set forth in the context of a smart home, it is to be appreciated that the scope of applicability of the described extensible devices and services platform is not so limited.

According to an embodiment, a method is provided for calculating and reporting a security score for a home. The method comprises: obtaining, by a server, one or more security criterions for assessing security of the home; obtaining, by the server, security data from the home, the security data comprises a plurality of conditions that were sensed by one or more home devices in the home; comparing, by the server, the security data obtained from the home devices to the security criterions to determine which of the security criterions are satisfied; calculating, by the server, the security score for the home based in part on which of the security criterions are satisfied; generating, by the server, a security log that lists the security criterions and corresponding indications of whether the respective criterions are satisfied; and outputting, by the server, the security score and the security log.

According to another embodiment, a method is provided for creating and using a neighborhood security network to detect security-related conditions and to distribute notifications thereof. The method comprises: obtaining, at a server, geographic location information from one or more home devices of one or more residential homes; grouping, at the server, some of the one or more residential homes into the neighborhood security network based at least in part on the geographic location information; monitoring, at the server, security-related information received from the home devices of the residential homes in the neighborhood security network to detect a security-related condition in one of the residential homes; and responsive to detecting the security-related condition in the one of the residential homes, distributing, by the server, a security notification to the home devices of residential homes in the neighborhood security network.

According to yet another embodiment, a method is provided for pre-alarm condition trend detection and notification. The method comprises: establishing, at a device, an alarm condition based at least in part on a predetermined amount of a substance in an environment; establishing, at the device, a pre-alarm condition based at least in part on a predetermined trend in the amount of the substance in the environment; receiving, at the device, signals from one or more sensors, the signals indicative of the amount of the substance in the environment; analyzing, at the device, the signals to detect at least one of the alarm condition and the pre-alarm condition; and responsive to detecting the pre-alarm condition but not the alarm condition, providing a notification of the pre-alarm condition.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

FIG. 4A is a simplified block diagram illustrating components of a wall switch according to an embodiment.

FIGS. 4B-C illustrate example modular head units for the wall switch of FIG. 4A, according to an embodiment.

DETAILED DESCRIPTION

Embodiments of the present invention generally relate to a plurality of devices, including intelligent, multi-sensing, network-connected devices, that communicate with each other and/or with a central server or a cloud-computing system to provide any of a variety of home-security objectives. The subject matter of this patent specification relates to the subject matter of the following commonly assigned application, which is incorporated by reference herein: U.S. Ser. No. 61/704,437 filed Sep. 21, 2012.

Figure 1:
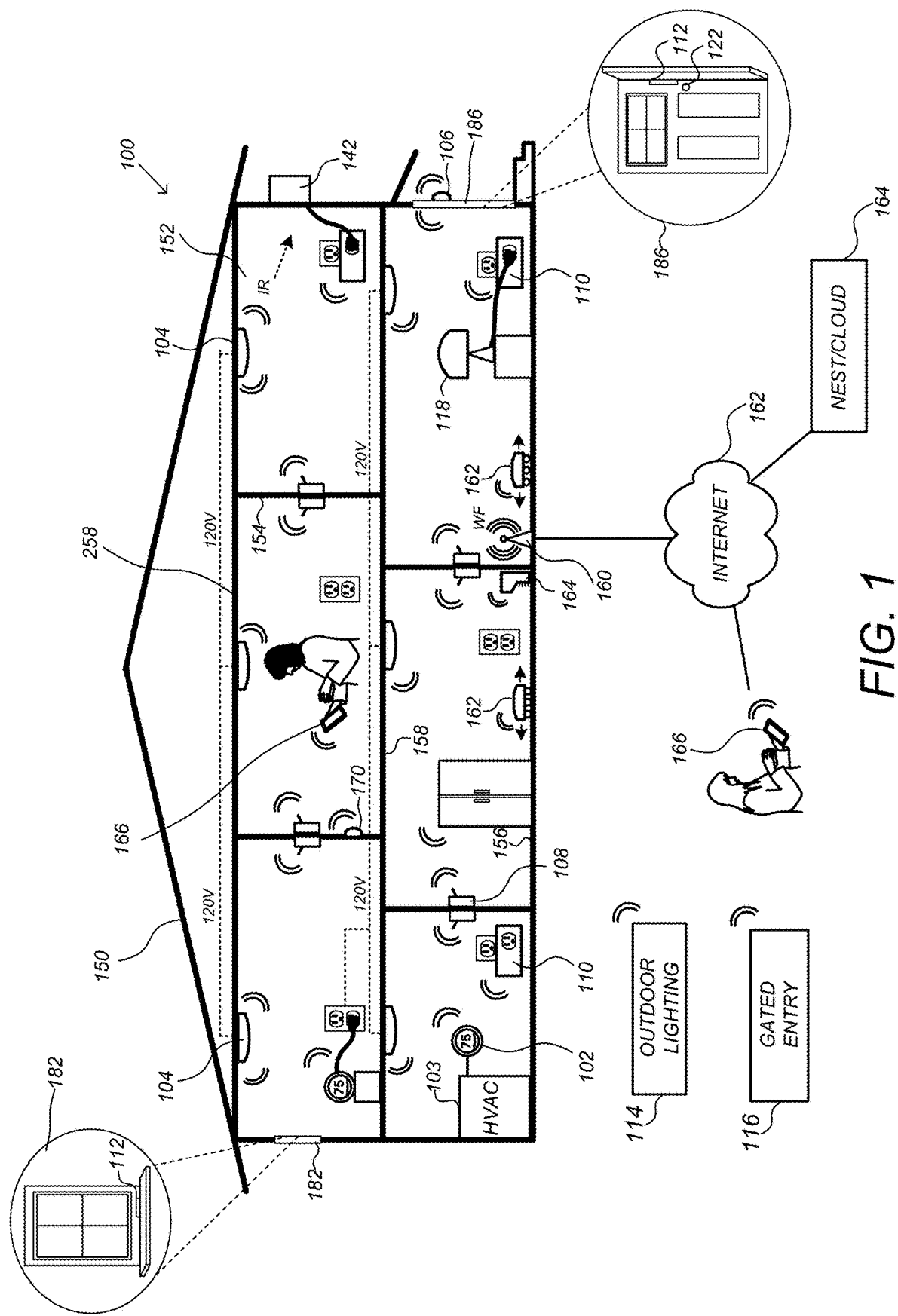
FIG. 1 an example of a smart-home environment within which one or more of the devices, methods, systems, services, and/or computer program products described further herein will be applicable, according to an embodiment.

Various aspects and possible implementations of providing home-security objectives are disclosed herein. Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, e.g., a house, office building, garage, or mobile home. It will be appreciated that devices can also be integrated into a smart-home environment 100 that does not include an entire structure 150, such as an apartment, condominium, or office space. Further, the smart home environment can control and/or be coupled to devices outside of the actual structure 150. Indeed, several devices in the smart home environment need not physically be within the structure 150. For example, a device controlling an outdoor lighting system 114 or gated entry system 116 can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor 156 or ceiling 158.

In some embodiments, the smart-home environment 100 of FIG. 1 includes a plurality of devices, including intelligent, multi-sensing, network-connected devices, that can integrate seamlessly with each other and/or with a central server or a cloud-computing system to provide any of a variety of useful home-security and smart-home objectives. The smart-home environment 100 may include one or more intelligent, multi-sensing, network-connected thermostats 102 (herein after referred to as "smart thermostats 102"), one or more intelligent, network-connected, multi-sensing hazard detection units 104 (herein after referred to as "smart hazard detectors 104"), and one or more intelligent, multi-sensing, network-connected entryway interface devices 106 (herein after referred to as "smart doorbells 104"). According to embodiments, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, or carbon monoxide). The smart doorbell 106 may control doorbell functionality, detect a person's approach to or departure from a location (e.g., an outer door), and announce a person's approach or departure via audio or visual means.

In some embodiments, the smart-home environment 100 of FIG. 1 further includes one or more intelligent, multi-sensing, network-connected wall switches 108 (herein after referred to as "smart wall switches 108"), along with one or more intelligent, multi-sensing, network-connected wall plug interfaces 110 (herein after referred to as "smart wall plugs 110"). The smart wall switches 108 may detect ambient lighting conditions and control a power and/or dim state of one or more lights. In some instances, smart wall switches 108 may also control a power state or speed of a fan, such as a ceiling fan. The smart wall plugs 110 control supply of power to one or more wall plugs (e.g., such that power is not supplied to the plug if nobody is at home). In the illustrated example, one of the smart wall plugs 110 controls supply of power to a lamp 118.

In some embodiments, the smart-home environment 100 of FIG. 1 further includes one or more intelligent, multi-sensing, network-connected entry detectors 112 (herein after referred to as "smart entry detector 112"). The illustrated smart entry detectors 112 are located at windows 182, doors 186, and other entry points of the smart-home environment 100 for detecting when a window, door, or other entry point is opened, broken, or otherwise breached. According to embodiments, the smart entry detectors 112 may include first and second parts. The first part is attached to a fixed part of the house structure, such as the windowsill, door sill, outer frame, side jamb, head jamb, etc. A second part is attached to part of the window or door that moves when opening and closing, such as the upper or lower sash, top or bottom rail, side stile, latch, handle, etc. The first and second parts of the smart entry detectors 112 are in close proximity when the window or door is closed, and the first and second parts move apart from one another when the window or door opens. The smart entry detectors 112 generate a corresponding signal when a window or door is opened or closed, etc. It should be appreciated that, according to some embodiments, the smart entry detectors 112 can be any type of window, door, entryway alarm sensor known in the art for detecting when a window, door, or other entry point is opened, broken, or otherwise breached, and that the known alarm sensors become smart when connected to the central server or cloud-computing system 164. According to embodiments, the alarm system of the home will not arm unless all smart entry detectors 112 of the home indicate that all doors, windows, and other entryways are closed and/or that all smart entry detectors 112 are "armed".

Figure 14:
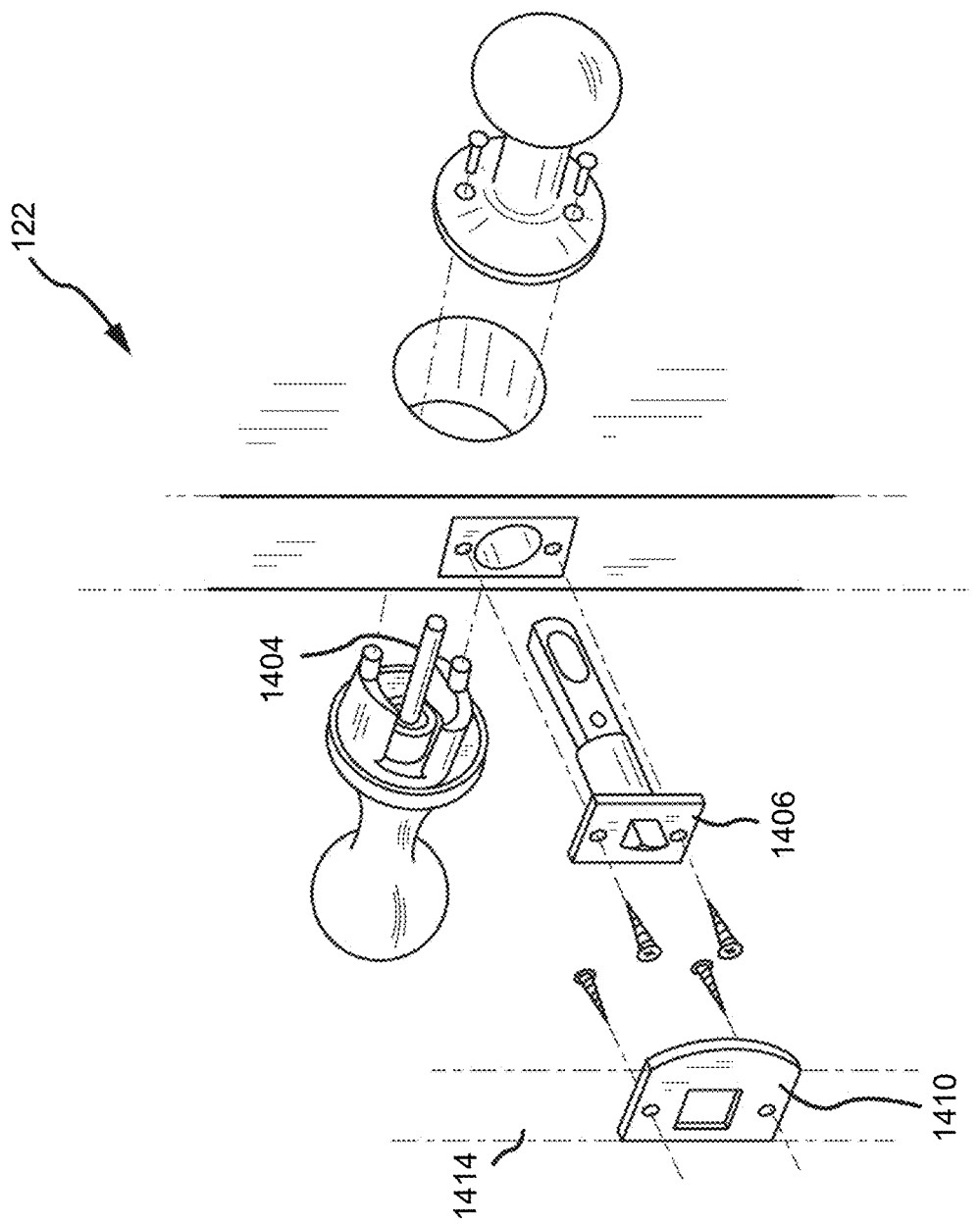
FIG. 14 is a schematic diagram illustrating an intelligent, multi-sensing, network-connected doorknob, according to an embodiment.

In some embodiments, the smart-home environment 100 of FIG. 1 further includes one or more intelligent, multi-sensing, network-connected doorknobs 122 (herein after referred to as "smart doorknob 122"). The illustrated smart doorknob 122 are located on external doors 186 of the smart-home environment 100. However, it should be appreciated that smart doorknobs 122 can be provided on all doors of the smart-home environment 100. As illustrated in FIG. 14, the smart doorknob includes a remote controlled electronic lock that locks a spindle 1404. This locks the door because it prevents the spindle from disengaging a latch 1406 of the doorknob from a strike plate 1410 of a door stop 1414. Accordingly, the smart doorknob is able to automatically unlock the door 186, without the user having to touch the doorknob. For example, the smart doorbell 106 can recognize a registered occupant approaching the door and instruct the smart doorknob to automatically unlock. It should also be appreciated that occupants can use a registered mobile device 166 to remotely unlock the door. For example, if when inside the home, the occupant receives notice from the smart doorbell 106 that a trusted neighbor is approaching the door, the occupant can use the mobile device 166 to unlock the door to the neighbor can let himself or herself in. Alternatively, the occupant can speak an audible command instructing the smart doorknob 122 to unlock. According to some embodiments, the smart doorknob 122 includes a remote controlled electronic motor that turns the spindle 1404 to disengage the latch 1406 of the doorknob from the strike plate 1410 of the door stop 1414. Accordingly, the smart doorknob is able to automatically open the door 186, without the user having to touch the doorknob.

According to embodiments, the smart thermostats 102, the smart hazard detectors 104, the smart doorbells 106, the smart wall switches 108, the smart wall plugs 110, the smart entry detectors 112, the smart doorknobs, the keypads, and other devices (collectively referred herein to as "the network-connected smart devices") of the smart-home environment 100 are connected to each other and to the central server or cloud-computing system 164 to accomplish security-related objectives for the smart home environment. In addition to containing processing and sensing capabilities, each of the network-connected smart devices is capable of data communications and information sharing with any other of the network-connected smart devices, as well as to any central server or cloud-computing system 164 or any other device that is network-connected anywhere in the world to accomplish security-related objectives. The required data communications can be carried out using any of a variety of custom or standard wireless protocols (Wi-Fi, ZigBee, 6LoWPAN, 3G/4G, etc.) and/or any of a variety of custom or standard wired protocols (CAT6 Ethernet, Home-Plug, etc.). In some cases, backup means of wireless communication (e.g., 3G/4G) is provided in the event the primary means of communication (e.g., Wi-Fi) becomes disabled, such as due to power outage.

According to embodiments, all or some of the network-connected smart devices can serve as wireless or wired repeaters. For example, a first one of the network-connected smart devices can communicate with a second one of the network-connected smart device via a wireless router 160. The network-connected smart devices can further communicate with each other via a connection to a network, such as the Internet 162. Through the Internet 162, the network-connected smart devices can communicate with a central server or a cloud-computing system 164. The central server or cloud-computing system 164 can be associated with a manufacturer, support entity, or service provider, such as a home-security provider, associated with the network-connected smart devices. For one embodiment, a user may be able to contact local law enforcement and other emergency or security personnel as well as contact customer support using one of the network-connected smart devices itself rather than needing to use other communication means such as a telephone or Internet-connected computer. Further, software updates and security alerts can be automatically sent from the central server or cloud-computing system 164 to the network-connected smart devices (e.g., when available, when purchased, at routine intervals, when emergency news needs to be broadcasted throughout the home, when the security system needs to be armed, and when the smart-home environment needs to be put on lock down).

According to embodiments, the network-connected smart devices combine to create a mesh network of spokesman and low-power nodes in the smart-home environment 100, where some of the network-connected smart devices are "spokesman" nodes and others are "low-powered" nodes. Some of the network-connected smart devices in the smart-home environment 100 are battery powered, while others have a regular and reliable power source, such as by connecting to wiring (e.g., to 120V line voltage wires) behind the walls 154 of the smart-home environment 100. The network-connected smart devices that have a regular and reliable power source are referred to as "spokesman" nodes. These nodes are equipped with the capability of using any wireless protocol or manner to facilitate bidirectional communication with any of a variety of other devices in the smart-home environment 100 as well as with the central server or cloud-computing system 164. On the other hand, the network-connected smart devices that are battery powered are referred to as "low-power" nodes. These nodes tend to be smaller than spokesman nodes and communicate using wireless protocol that requires very little power, such as Zigbee, 6LoWPAN, etc. Further, some, but not all, low-power nodes are incapable of bidirectional communication. These low-power nodes send messages, but they are unable to "listen". Thus, other network-connected smart devices in the smart-home environment 100, such as the spokesman nodes, cannot send information to these low-power nodes.

As described, the network-connected smart devices serve as low-power and spokesman nodes to create a mesh network in the smart-home environment 100. Individual low-power nodes in the smart-home environment regularly send out messages regarding what they are sensing, and the other low-powered nodes in the smart-home environment—in addition to sending out their own messages-repeat the messages, thereby causing the messages to travel from node to node (i.e., network-connected smart device to network-connected smart device) throughout the smart-home environment 100. The spokesman nodes in the smart-home environment 100 are able to "drop down" to low-powered communication protocols to receive these messages, translate the messages to other communication protocols, and send the translated messages to other spokesman nodes and/or the central server or cloud-computing system 164. Thus, the low-powered nodes using low-power communication protocols are able to send messages across the entire smart-home environment 100 as well as over the Internet 162 to the central server or cloud-computing system 164. According to embodiments, the mesh network enables the central server or cloud-computing system 164 to regularly receive data from all of the network-connected smart devices in the smart-home environment, make inferences based on the data, and send commands back to individual one of the network-connected smart devices to accomplish some of the home-security objectives described herein. For example, in the event the home-security system is armed and one of the nodes, either low- or high-power, detects movement, then the node can send a corresponding message through the mesh network to the central server or cloud-computing system 164, which processes the message and determines the appropriate response, such as contacting authorities and/or the home owner as well as instructing the network-connected smart devices to enter an alarm mode, which may involve activating lights, sounding audible alarms, etc.

As described, the spokesman nodes and some of the low-powered nodes are capable of "listening". Accordingly, users, other devices, and the central server or cloud-computing system 164 can communicate controls to the low-powered nodes. For example, as discussed below, a user can use the portable electronic device (e.g., a smartphone) 166 to send commands over the Internet to the central server or cloud-computing system 164, which then relays the commands to the spokesman nodes in the smart-home environment 100. The spokesman nodes drop down to a low-power protocol to communicate the commands to the low-power nodes throughout the smart-home environment, as well as to other spokesman nodes that did not receive the commands directly from the central server or cloud-computing system 164.

Examples of spokesman nodes include smart doorbells 106, smart thermostats 102, smart wall switches 108, smart wall plugs 110, keypads, doorknobs, etc. These devices 102, 106, 108, and 110 are often located near and connected to a reliable power source, and therefore can include more power-consuming components, such as one or more communication chips capable of bidirectional communication in any variety of protocols.

An example of a low-powered node is a battery-operated version of the smart entry detector 112. These smart entry detectors 112 are often located in an area without access to constant and reliable, such as in a window or door frame. According to embodiments, the smart entry detector 112 includes a low-power wireless communication chip (e.g., ZigBee chip) that sends instantaneous messages coincident with movement of the door or window or with detection of a nearby person, animal or object. In some embodiments, the low-power wireless communication chip regularly sends messages regarding the position (open, closed, partially open, etc.) of the relevant door or window. These messages may be sent wirelessly, using the mesh network, from node to node (i.e., network-connected smart device to network-connected smart device) within the smart-home environment 100 as well as over the Internet 162 to the central server or cloud-computing system 164.

Another example of a low-power node is a smart nightlight 170. According to embodiments, the nightlight 170 houses a light source having variable intensity. Further, according to embodiments, the color of the light emitted from the nightlight 170 is changeable. In addition to housing a light source, the smart nightlight 170 houses an occupancy sensor, such as an ultrasonic or passive IR sensor, and an ambient light sensor, such as a photoresistor or a single-pixel sensor that measures light in the room. In some embodiments, the smart nightlight 170 is configured to activate the light source when its ambient light sensor detects that the room is dark and/or when its occupancy sensor detects a person's presence or movement. The smart nightlight 170, according to embodiments, is configured to adjust the color and intensity of the light source. For example, the smart nightlight 170 adjusts the intensity of the light source in a manner where intensity is inversely proportional to the amount of natural light detected in the environment. According to embodiments, the smart nightlight 170 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., network-connected smart device to network-connected smart device) within the smart-home environment 100 as well as over the Internet 162 to the central server or cloud-computing system 164.

Yet another example of a low-powered node is a battery-operated version of the smart hazard detector 104. These smart hazard detectors 104 are often located in an area without access to constant and reliable power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104, according to some embodiments, include a low-power wireless communication chip (e.g., ZigBee chip) that regularly sends messages that correspond to each of the respective sensors to the other network-connected smart devices and the central server or cloud-computing system 164, such as by using the mesh network as described above.

According to embodiments, the network-connected devices (a.k.a. the low- and high-power nodes) of the smart-home environment 100 are capable of enhancing home security. For example, as discussed, all or some of the network-connected smart devices are equipped with motion sensing, heat sensing, pressure sensing, noise sensing, or other types of sensing capabilities that combine with rules-based inference engines and/or artificial intelligence of the central server or cloud-computing system 164 to detect the presence, movement, and/or identity of people, animals, and objects and trigger various alarms in the event a person, animal, or object is in the wrong place at the wrong time anywhere inside or in the curtilage of the smart-home environment 100.

By virtue of network connectivity, a user can remotely interact with one or more of the network-connected smart devices. For example, a user can communicate with one or more of the network-connected smart devices using a computer (e.g., a desktop computer, laptop computer, or tablet) or other portable electronic device (e.g., a smartphone) 166. A webpage or app can be configured to receive communications from the user and control the one or more of the network-connected smart devices based on the communications and/or to present information about the device's operation to the user. For example, the user can view can arm or disarm the security system of the home.

As discussed, users can control one or more of the network-connected smart devices in the smart-home environment 100 using a network-connected computer or portable electronic device 166. In some examples, some or all of the occupants (e.g., individuals who live in the home) can register their mobile device 166 with the smart-home environment 100. Such registration can be made at a central server to authenticate the occupant and/or the mobile device 166 as being associated with the smart-home environment 100, and to give permission to the occupant to use the mobile device 166 to control the network-connected smart devices and the security system of the smart-home environment 100. An occupant can use their registered mobile device 166 to remotely control the network-connected smart devices and security system of the smart-home environment 100, such as when the occupant is at work or on vacation. The occupant may also use their registered mobile device 166 to control the network-connected smart devices when the occupant is actually located inside the smart-home environment 100, such as when the occupant sitting on a couch inside the home or in a bedroom preparing for sleep.

It should be appreciated that instead of or in addition to registering mobile devices 166, the smart-home environment 100 makes inferences about which individuals live in the home and are therefore occupants and which mobile devices 166 are associated with those individuals. As such, the smart-home environment "learns" who is an occupant and permits the mobile devices 166 associated with those individuals to control the network-connected smart devices of the smart-home environment 100. As described herein, various types of notices and other information are provided to occupants via messages sent to the occupants' mobile devices 166 and other electronic devices. It should be appreciated that these messages can be sent via email, short message service (SMS), multimedia messaging service (MMS), unstructured supplementary service data (USSD), as well as any other type of messaging services and/or communication protocols known in the art, including any type of push notification service.

According to embodiments, the network-connected smart devices of the smart-home environment 100 are modular and can be incorporated into older and new houses. For example, the devices are designed around a modular platform consisting of two basic components: a head unit and a backplate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

According to embodiments, some of these modular smart devices have security-enhancing features that trigger a notification or an alarm in the event the head is removed from the docking station. For example, as discussed, some smart devices are capable of detecting motion and function as "tripwires" in the security system. Others provide live video feeds and function as security cameras. In the event an intruder attempts to disable a network-connected smart device and therefore avert detection by removing the smart device's head unit from its docking station, an alarm or alert notification is triggered. For example, the smart device sends a message indicating head unit removal to the central server or cloud-computing system 164. Responsive to receiving a message indicating head unit removal, the central server or cloud-computing system 164, according to embodiments, sends a message to the home owner's or other occupants' mobile device(s) 166, indicating the removal and asking whether the removal is authorized. If no response after a timeout period or if the response indicates that removal was not authorized, then the central server or cloud-computing system 164 triggers the alarm. In other embodiments, such as when the alarm is armed (i.e., in security mode), the alarm is triggered immediately upon removal of the head unit. The alarm may be local on the head unit itself and therefore an alert sound it broadcasted from the head unit, or may be centralized and controlled by the central server or cloud-computing system 164 and the other network-connected smart devices are instructed to broadcast an alert sound. In still other embodiments, upon removal, the head unit asks the person to verbally identify themselves and, if the voice is not recognized, then the alarm is triggered.

The smart-home environment 100 may also include communication with devices outside of the smart-home environment 100 but within a proximate geographical range of the home, such as within the home's curtilage. For example, the smart-home environment 100 may include an outdoor lighting system 114 that communicates information through the mesh network or directly to the central server or cloud-computing system 164 regarding detected movement and/or presence of people, animals, and any other objects and receives back commands for controlling the lighting accordingly. The central server or cloud-computing system 164 can control the outdoor lighting system 114 based on information received from the other network-connected smart devices in the smart-home environment. For example, in the event, any of the network-connected smart devices, such as smart wall plugs 110 located outdoors, detect movement at night time, the central server or cloud-computing system 164 can "turn on" the outdoor lighting system 114 as well as other lights in the smart-home environment 100. This is advantageous over known outdoor-motion detecting lights because the motion-detection capability is not limited to just the motion sensor attached to the light itself, but extends across the all network-connected smart devices in the smart-home environment 100.

The smart-home environment 100 may include a gated entry 116 that communicates information through the mesh network or directly to the central server or cloud-computing system 164 regarding detected movement and/or presence of people, animals, and any other objects and receives back instructions for controlling the gated entry such an opening, closing, locking, unlocking the gate. According to embodiments, an algorithm is provided for considering the geographic location of the smart-home environment 100, such as based on the zip code or geographic coordinates of the home. The geographic information is then used to obtain data helpful for determining optimal times for turning on/off or otherwise adjusting lighting as well as opening, closing, locking, unlocking gates or otherwise securing the smart-home environment 100.

In some embodiments, the mesh network of low-powered and spokesman nodes can be used to provide exit lighting in the event of an emergency, such as an earthquake, a fire, a detected home invasion, dangerous CO levels, etc. In some instances, to facilitate this, users provide pre-configuration information that indicates exit routes in the smart-home environment 100. For example, for each room in the house, the user provides a map of the best exit route. It should be appreciated that instead of a user providing this information, the central server or cloud-computing system 164 or some other device could the automatically determine the routes using uploaded maps, diagrams, architectural drawings of the smart-home house, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting. It should also be appreciated that all or some of the network-connected smart devices, including the smart hazard detector 104 and the smart thermostat 102, include a light that is activated to help occupants evacuate the home. Additionally, in the event of an emergency, such as earthquake or fire, an audible alarm can be sounded in the home giving information about the event. Also, a message, such as an SMS or MMS message, may be sent to the mobile device of the occupants.

In some embodiments, the mesh network of low-powered and spokesman nodes can be used to provide security lighting in the event of an unauthorized occupant is detected in the home. In such cases, all lights in and/or outside of the home may be activated. Turning on all light will alert authorized occupants to the danger and will likely cause the unauthorized.

In some embodiments, the smart home environment 100 may include a home safe for storing valuables, such as jewels, money, rare coins, important documents, etc. In the event an individual tampers with the safe, such as if someone attempts to pick the lock, carry it way, or break it open, the safe automatically sends out wireless alarms, SMS, notifies the authorities, etc. The safe also includes a location tracking device, such as GPS device, so that in the event it is carried away, it can transmit information about its location.

Figure 2:
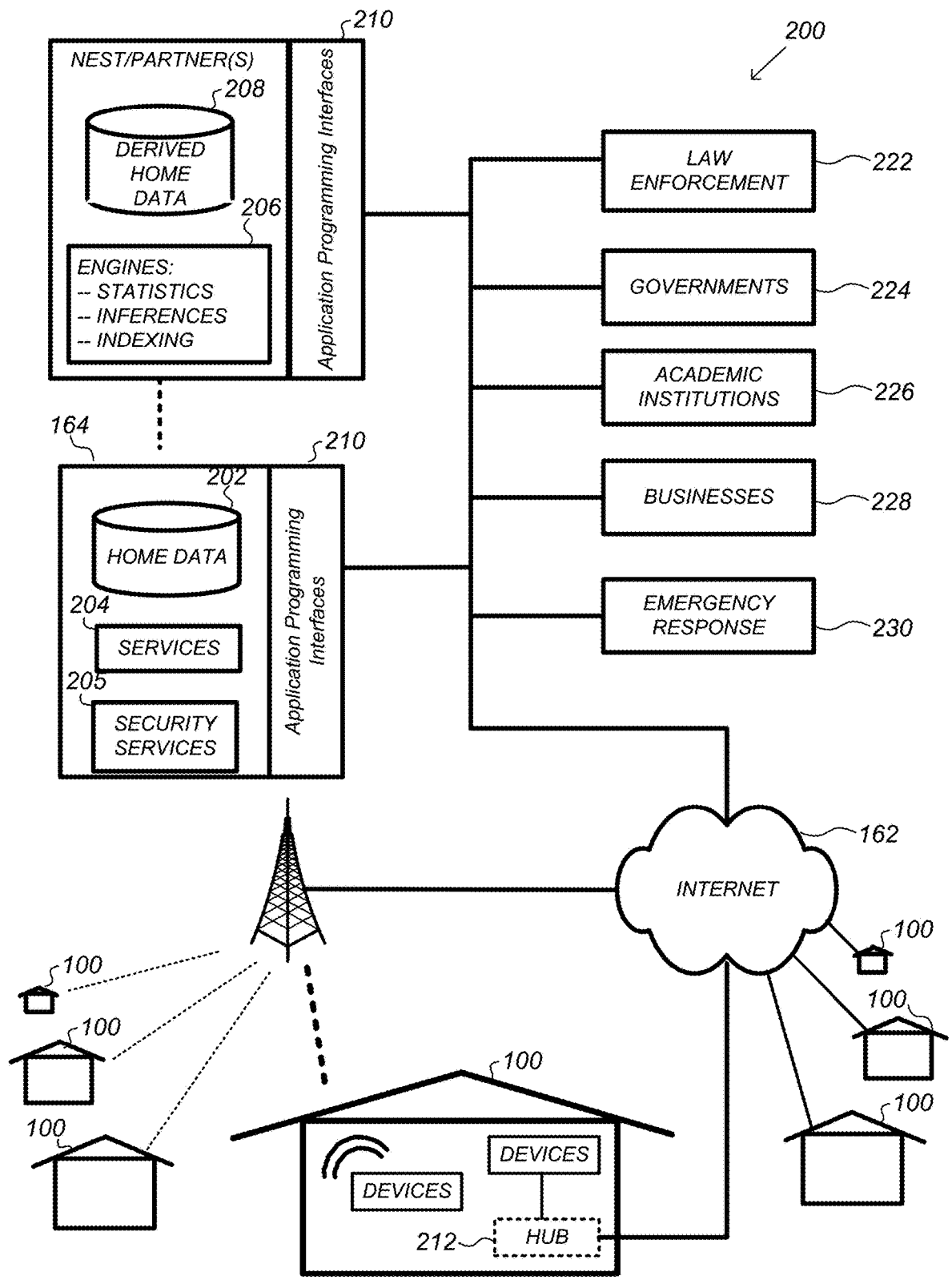
FIG. 2 illustrates a network-level view of an extensible devices and services platform with which the smart-home environment of FIG. 1 can be integrated, according to an embodiment.

FIG. 2 illustrates a network-level view of an extensible devices and services platform 200 with which a plurality of smart-home environments, such as the smart-home environment 100 of FIG. 1, can be integrated. The extensible devices and services platform 200 includes remote servers or cloud computing architectures 164. Each of the network-connected smart devices from FIG. 1 can communicate with the remote servers or cloud computing architectures 164. For example, a connection to the Internet 162 can be established either directly (for example, using 3G/4G connectivity to a wireless carrier), though a hubbed network 212 (which can be a scheme ranging from a simple wireless router, for example, up to and including an intelligent, dedicated whole-home control node), or through any combination thereof.

Although in some examples provided herein, the devices and services platform 200 communicates with and collects data from the network-connected smart devices of smart-home environment 100 of FIG. 1, it should be appreciated that the devices and services platform 200 communicates with and collects data from a plurality of smart-home environments across the world. For example, the central server or cloud-computing system 164 can collect home data 202 from the network-connected devices of one or more smart-home environments, where network-connected the devices can routinely transmit home data or can transmit home data in specific instances (e.g., when a device queries the home data 202). Thus, the devices and services platform 200 routinely collects data from homes across the world. As described, the collected home data 202 includes, for example, security data, such as a map of the home and the respective network-connected smart devices and their capabilities in each room, alarm settings information, contact information for the registered occupants of the home, etc. The collected home data 202 may also include, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

The central server or cloud-computing architecture 164 can further provide one or more services 204, such as security related services described herein. The services 204 can include sensor data collection/logging, where sensor data and other data from network-connected smart devices of smart-home environments 100 is collected and logged. For example, the data collected and logged may include maps of homes, maps of users' in-home movements from room to room as determined by network-connected smart devices equipped with motion and/or identification technology, time spent in each room, intra-home occupancy maps that indicate which rooms are occupied and by whom and different time (including in real time), fire-detection incidents, false alarms, CO data, temperature data, humidity data, etc. According to embodiments, in the event the data collected from the network-connected smart devices of a smart-home environment 100 indicates that an alarm threshold for a particular home is being approached, the services 204 increases the frequency at which it collects and logs data from network-connected devices in that home. For example, in the event the data collected from network-connected devices indicates activity in a kitchen of a smart-home environment 100 while the occupants are asleep, then, instead of collecting data from the network-connected smart devices of the home in thirty-second intervals, the services 204 collects data in ten-second intervals. According to embodiments, the data collected and logged may be provided to investigators after the occurrence of a crime, fire, etc., so that the data may be used to solve the crime, determine the cause of the fire, etc.

The services 204 can further include, for example, remote access, remote or distributed control, security improvement suggestions (e.g., provide suggestions for enhancing security of a home based on collected home data 202, etc.), software updates, customer support, etc. Data associated with the services 204 can be logged at the central server or cloud-computing system 164 and the central server or the cloud-computing system 164 can retrieve and transmit the data at an appropriate time (e.g., at regular intervals, upon receiving request from a user, etc.).

As illustrated in FIG. 2, an embodiment of the extensible devices and services platform 200 includes a processing engine 206, which can be concentrated at a single server or distributed among several different computing entities without limitation. The processing engine 206 can include engines configured to receive data from network-connected smart devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the network-connected smart device(s) that provided home data used to derive the results, to other network-connected smart devices, to a user mobile device 166, to a server providing a webpage to the user's mobile device 166, or to other non-device entities. For example, patterns and statistics summarizing data received from network-connected smart devices can be generated by the processing engine 206 and transmitted. The results or statistics can be provided via the Internet 162. In this manner, the processing engine 206 can be configured and programmed to derive a variety of useful information from the home data 202. A single server can include one or more engines.

The derived data can be highly beneficial at a variety of different granularities for a variety of useful purposes, ranging from explicit programmed control of network-connected smart devices on a per-home, per-neighborhood, or per-region basis (for example, security related statistics unique to particular neighborhoods can be used to control particular network-connected smart devices), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about network-connected smart device usage across a population of devices and send the statistics to device users, service providers or other entities (e.g., that have requested or may have provided monetary compensation for the statistics).

In some embodiments, to encourage security-related innovation and research and to increase security-related and other products and services available to users, the devices and services platform 200 exposes a range of application programming interfaces (APIs) 210 to third parties, such as law enforcement agencies 222, governmental entities 224 (e.g., the Health and Safety Agencies), academic institutions 226 (e.g., university researchers), businesses 228 (e.g., private security businesses), emergency response providers 230, such as fire and ambulance, and other third parties. The APIs 210 are coupled to and permit third-party systems to communicate with the central server or the cloud-computing system 164, including the services 204, the processing engine 206, the home data 202, and the derived home data 208. For example, the APIs 210 allow applications executed by the third parties to initiate specific data processing tasks that are executed by the central server or the cloud-computing system 164, as well as to receive dynamic updates to the home data 202 and the derived home data 208.

For example, third parties can develop programs and/or applications, such as web or mobile apps, that integrate with the central server or the cloud-computing system 164 to provide services and information to users. Such programs and application may be, for example, designed to help users secure their homes by performing any of a variety of beneficial functions or tasks now known or hereinafter developed. Examples, include providing user with local crime news, information, and statistics, safety tips and check lists, such as tips for installing security lights, door and window locks, etc.

According to some embodiments, third-party applications make inferences from the home data 202 and the derived home data 208, such inferences may include when are occupants home, when are they sleeping, when are they in the den watching television, when they shower. The answers to these questions may help third-parties benefit consumers by providing them with interesting security-related information, products and services. In one example, a private security company creates an application that makes inferences regarding when people are away from home. The application uses the inferences to schedule private security officers to stop or drive by the home when people will most likely be away from home, the application may also put the user's network-connected smart devices in alarm mode, notify trusted neighbors that the user is away, etc.

In some embodiments, the devices and services platform 200 exposes APIs 210 to third parties, such as businesses 228 exchange for revenue, such as for a monthly fee, similar to a subscription service. In one example, the business 228 may be a retail store that sells consumer products and building and construction supplies and materials, including the network-connected smart devices described above with reference to FIG. 1. In one example, the retail store 228 agrees to sale network-connected smart devices at discount in exchange for free or discounted access to the APIs 210. The retails store 228 can use the information from the APIs 210 to better target their customers and increase sales. While the provider of the devices and services platform 200 benefits from a proliferation of discounted network-connected smart devices.

Figure 3:
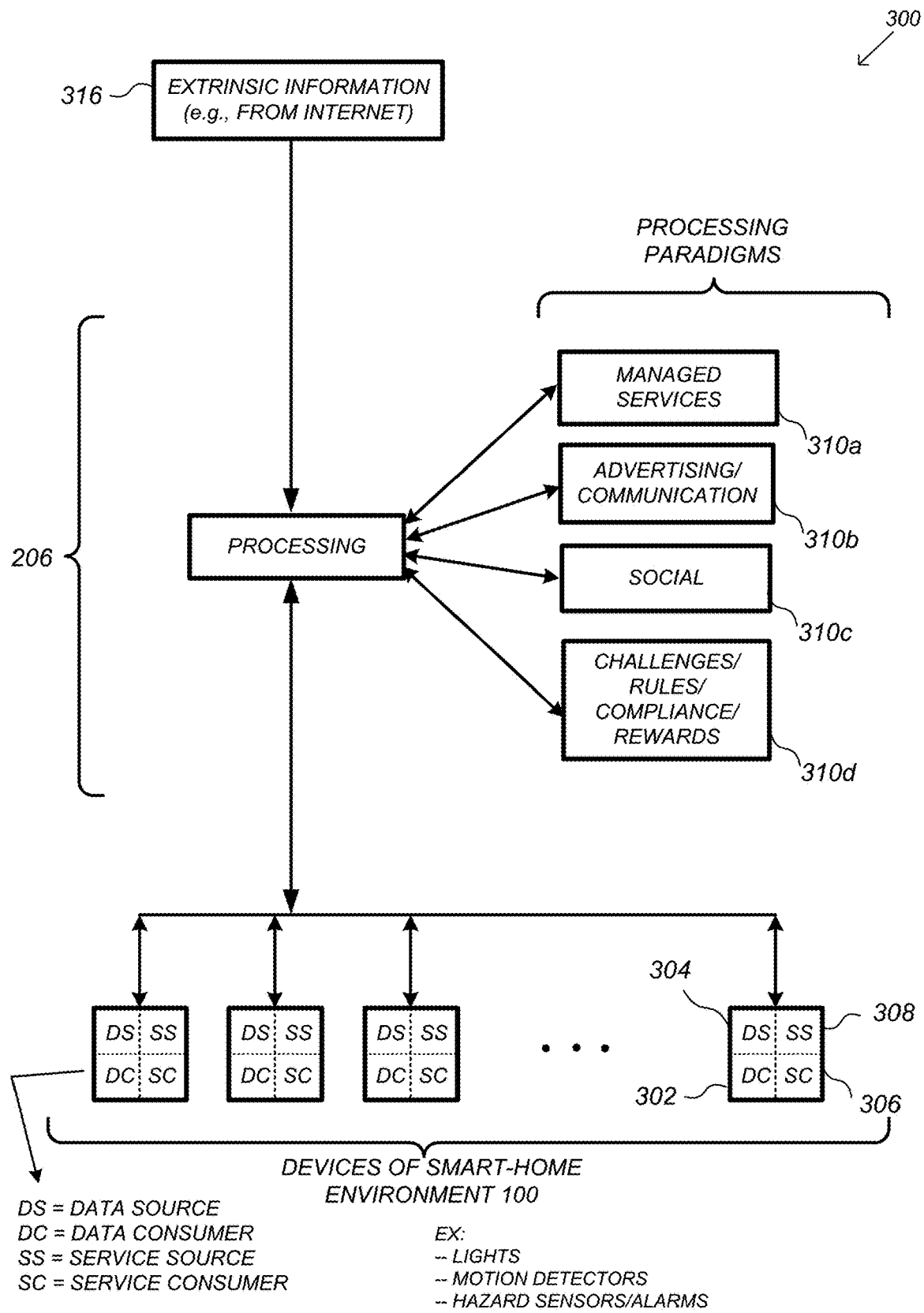
FIG. 3 illustrates an abstracted functional view of the extensible devices and services platform of FIG. 2, with reference to a processing engine as well as devices of the smart-home environment of FIG. 1, according to an embodiment.

FIG. 3 illustrates an abstracted functional view of the extensible devices and services platform 200 of FIG. 2, with particular reference to the processing engine 206 as well as devices, such as the network-connected smart devices of the smart-home environment 100 of FIG. 1. Even though network-connected smart devices situated in smart-home environments will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform 200 can also be configured to harness the large amount of data that is flowing out of these devices. In addition to enhancing or optimizing the actual operation of the devices themselves with respect to their immediate functions, the extensible devices and services platform 200 can be directed to "repurposing" that data in a variety of automated, extensible, flexible, and/or scalable ways to achieve a variety of useful security-related objectives. These security-related objectives may be predefined or adaptively identified based on, e.g., usage patterns, device efficiency, and/or user input (e.g., requesting specific functionality, manually inputting specific data).

For example, FIG. 3 shows processing engine 206 as including a number of paradigms 310. Processing engine 206 can include a managed services paradigm 310*a* that monitors and manages primary or secondary device functions. The device functions can include ensuring proper operation of a network-connected smart device given user inputs, detected that (e.g., and responding to) an intruder has entered or is attempted to enter a dwelling, detecting a failure of equipment coupled to a network-connected smart device (e.g., a light bulb having burned out, passive IR senor having gone bad), or alerting a user of a current or predicted future events.

Processing engine 206 can further include an advertising/communication paradigm 310*b* that estimates characteristics (e.g., demographic information, time spend doing particular activities like cooking or watching television), desires and/or products of interest of a user based on data received from network-connected smart devices. Services, promotions, products or upgrades can then be offered or automatically provided to the user. Processing engine 206 can further include a social paradigm 310*c* that uses information from a social network, provides information to a social network, and/or processes data associated with user and/or device interactions with the social network platform. For example, a user's status as reported to their trusted contacts on the social network could be updated to indicate when they are home or away based on light detection, security system inactivation or device usage detectors.

The processing engine 206 can include a challenges/rules/compliance/rewards paradigm 310*d* that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to improve security in the home (e.g., regularly lock door, install adequate number of motion detectors or outdoor lights, etc.), to live safely (e.g., reducing exposure to toxins or carcinogens), to conserve equipment life, to improve health, etc. For example, one challenge may involve participates achieve a certain "security score" by properly equipping their home with security devices and services and properly using and maintaining those devices. Those that successfully complete the challenge are rewarded, such as by coupons, virtual currency, status, etc. Regarding compliance, an example involves a parent making a safety and security rule that children are not permitted to leave the home alone after a specified curfew, such as 9:00 PM. The network-connected smart devices in the home could track the movement of the various occupants and send alerts to the parent when a child leaves the home alone after the curfew or when the child is away from home after the curfew.

The processing engine 206 can integrate or otherwise utilize extrinsic information 316 from extrinsic sources to improve the functioning of one or more processing paradigms. Extrinsic information 316 can be used to interpret data received from a network-connected smart device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform 200, ranging from the ordinary to the profound. Thus, in one "ordinary" example, each bedroom of the smart-home environment 100 can be provided with a smart wall switch 108, a smart wall plug 110, and/or smart hazard detectors 104, all or some of which include an occupancy sensor, wherein the occupancy sensor is also capable of inferring (e.g., by virtue of motion detection, facial recognition, audible sound patterns, etc.) whether the occupant is asleep or awake. If a home intruder is detected, the remote security/monitoring service or police department is advised of how many occupants there are in each bedroom, and whether those occupants are still asleep (or immobile), and the real time location of the intruder in the home. Further, video from the home can be broadcasted to video-capable devices of the nearest security personnel and police so that the police can monitor the activity in the home while in route to the home. By way of another example, the same data that is being used for home security can also be "repurposed" by the processing engine 206 in the context of a social paradigm of neighborhood security. Thus, for example, the same data discussed in the example above can be collected and made available for processing (properly anonymized) in which the crime patterns and home safety in a particular ZIP code can be tracked.

In some embodiments, the devices and services platform 200 provides a home security services 205 into which users can enroll their smart-home environments 100. The security services 205 can be offered on a non-commitment month-to-month basis. It should also be appreciated that the security services 205 can be offered year-to-year or for lifetime. For example, the security services 205 can provide multi-tiered offerings, including offer basic, plus, and premium services. Basic services, for example, include basic intrusion detection and emergency personnel notification. For example, the basic security services 205 monitor incoming data from the network-connected smart devices of the home to determine when a possible intrusion is occurring, as indicated by motion detection outside the home, information from the smart entry detectors indicating that any one of the doors 186 or windows 182 of the home have been opened, etc. Upon detection, the basic security services 205 contact the occupants of the home and/or local law enforcement. Plus security services 205, for example, monitor dangerous conditions in the home including smoke, CO, in addition to home invasion. Premium services 205 include, for example, availing the home to the many benefits of "neighbor security networks" (described below), detecting when individuals in the home are in distress, mimicking user patterns of turning on lights and appliances when the user is on vacation, providing users with security scores and corresponding tips for improving the security of their home, providing live video stream of activity in the home to the user when the user is away and to local law enforcement, etc.

In some embodiments, pricing for the security services varies depending on the security score of the home. As described below, security score is based on information such having adequate numbers and placement of network-connected smart devices (e.g., hazard detectors, entry detectors, etc.), percentage of smart device that have WiFi (rather than low-power communication protocols), percentage of smart devices that are wired (rather than battery powered), number of strangers that visit the home, etc. The higher the security score of the home, the more secure the home and the cheaper the security services. The devices and services platform 200, according to embodiments, provides suggestion regarding how to improve security scores and, to incent users to improve their home's score, the platform 200 also indicates what discounts the user will receive if the user's home achieves a particular score.

In some embodiments, upon receive an enrollment request from a user, the devices and services platform 200 assess the capabilities of the network-connected smart devices in the user's home, and determines whether the requested services are appropriate for the user. For example, if the user request a premium services, such as the capability to broadcast live video stream to law enforcement, but the user only has but a couple of video enabled smart devices and/or a limited WiFi network, then the devices and services platform 200 recommends that the user upgrade the smart devices in the home or select more basic services.

Examples of security-related objectives will now be provided with reference to FIGS. 1-3. In one security-related example, some or all of the network-connected smart devices function as "tripwires" in the security system. In this example, in the event one of the network-connected smart devices detects motion, heat, sound, etc., it sends a corresponding message through the mesh network (e.g., from network-connected smart device to network-connected smart-device) and, in some cases, over the Internet to the central server or cloud-computing system 164, which triggers an alarm if the security system is armed (e.g., the occupants are away or asleep). In this example, a user could enhance the security of the smart-home environment 100 by buying and installing extra network-connected smart devices, such as smart motion detectors 112 and smart nightlights 170.

In another security-related example, some or all of the network-connected smart devices are equipped with identification technology (e.g., face recognition, RFID, ultrasonic sensors) that "fingerprints" or creates a "signature" for the people, animals, and objects. The identification technology can be the same as or similar to the fingerprinting and signature creating techniques descripted in other sections of this application. In this example, based on information received from the network-connected smart devices, the central server or cloud-computing system 164 stores a list of registered occupants and/or guests of the home. When a person whose fingerprint or signature is not recognized by the central server or cloud-computing system 164 as a registered occupant or guest comes "within range" of, or otherwise interacts with, one of the network-connected smart devices of the home, the central server or cloud-computing system 164 logs that person's presence and, if the security system is armed, activates an alarm indicating the presence of an intruder. Further, the central server or cloud-computing system 164 may reference maps of the smart-home environment and schedules to whether the identified person, animal, or object is permitted to be in a particular area (e.g., room of the house) at a particular time and trigger an alarm accordingly.

In yet another security-related example, occupant-location data (e.g., GPS data, IPS data, etc.) is used to achieve home-security objectives. According to embodiments, the occupants of a home (e.g., the individuals who live in or frequently visit the home) register their respective mobile devices 166 as being associated with the home, and the central server or cloud-computing system 164 tracks the occupants' movement inside and outside of the home based on occupant-location data received from the mobile devices 166. The central server or cloud-computing system 164 uses this tracking information to make inferences regarding the current and future occupancy of the home and/or rooms, and to control the network-connected smart devices inside the home in a corresponding manner. For example, outdoor lights 114 can be turned on when it is determined that an occupant returning home, or the smart doorknobs 122 can be locked and the security system can be armed when the occupant is leaving home. Also for example, the threshold for notifying authorities of an emergency can be adjusted depending on whether an occupant having a registered mobile device 166 is at home. For example, if the register occupant is at home when an alarm condition (e.g., fire, distressed person, home invasion) is detected, a message can be sent to the occupant's mobile device 166 requesting confirmation that everything is okay. The authorities will only be notified if the registered occupant responds confirming that there is an emergency or if the registered occupant does not respond with in a timeout period. On the other hand, if an alarm condition is detected and there are not registered occupants at home, then the authorities are immediately notified and a concurrent message is sent to the mobile devices 166 of the registered occupants.

In some instances the central server or cloud-computing system 164 receives occupant-location data directly from the mobile devices, whereas in other instances the data is received from an intermediary, such as one of the network-connected smart devices in the home. In instances where occupant-location data is received directly from the mobile device, the central server or cloud-computing system 164 can determine if the occupant is "at home" or "away" based on whether the received occupant-location data corresponds with the location of the home. What's more, in some embodiments, the central server or cloud-computing system 164 can use the occupant-location data received directly from the mobile devices to determine the occupant's actual room-location (e.g., bedroom, kitchen, garage, etc.). To do so, for example, the central server or cloud-computing system 164 cross-references the received occupant-location data (e.g., GPS data, IPS data, etc.) with a map of the home. On the other hand, in instances where occupant-location data is received from network-connect smart devices, the central server or cloud-computing system 164 can infer that the occupant is in the room where the network-connected smart device is located. Network-connected smart devices can detect mobile devices via WiFi, Bluetooth, NFC, etc.

It should also be appreciated that passive RFID tags (rather than or in addition to mobile devices) can be used to determine the room-location of occupants (and pets). For example, an RFID is associated with each of the occupants (and pets) of the house, such as by including the tags in wallets, bracelets, wristbands, mobile devices, collars, etc. The network-connected smart devices in the various rooms detect the RFID tags, and send that information to the central server or cloud-computing system 164.

According to an embodiment, the determined room location of an occupant is used determine which user controls to provide to the occupant's mobile device 166 when the occupant uses the mobile device 166 to control the smart-home environment 100. In other words, a different menu is displayed to the occupant depending on the occupant's location in the home. For example, if the occupant is located in the garage, then the displayed menu gives the occupant the option to turn up or down sensitivity of the smart entry detector 112 of the garage door. Also for example, if the occupant is in the kitchen, then the displayed menu gives the occupant the option to adjust the smoke-detection sensitivity of the smart hazard detector 104 in the kitchen. This might enable the occupant to cook without triggering a smoke alarm condition. Further, for example, if the occupant is located in a bedroom, then the displayed menu may give the occupant the option to lock the smart doorknob 122 and arm the alarm system.

In the event all occupants of the smart-home environment 100 register their mobile device 166 as being associated with the home, the central server and cloud-computing systems 164 can infer that strangers are in the home when unknown mobile devices are detected. For example, if the network-connected smart devices detected two people in the home, and both of those people are associated with registered mobile device 166, then it can be inferred that no strangers are in the home. However, if three people are detected in the home, but only two people are associated with registered mobile devices 166, then it can be inferred that there is one stranger in the home. A home may be considered less secure when there are unregistered mobile devices in the home and when there are more occupants than registered devices. For example, a home that is undergoing a remodel and that has dozens of unregistered construction workers with unregistered mobile devices coming and going is less secure than a home where all occupants are associated with registered mobile devices and where there are no unregistered mobile devices in the home.

According to some embodiments, occupants can use their registered mobile devices 166 to access the smart-home environment 100. For example, the smart doorbell 106 and the mobile device 166 may be capable of communicating via near field communication (NFC), BLUETOOTH, or some other short-ranger wireless protocol. To gain access to the home (e.g., cause the smart doorknob 122 to unlock), the mobile device 166 of the user may transmit an access code to the smart doorbell 106, which then verifies with the server 164 that the person is a registered occupant.

Turning to another security-related example, the mesh network can be used to track a person's movement as the person transitions from room to room. As such, the central server or cloud-computing system 164 knows which room in the smart-home environment is occupied and by whom (e.g., using identification technology) at all times. For example, the low-powered and spokesman nodes (e.g., network-connected smart devices 102, 104, 106, 108, 110, 112, and 170) detect the person's movement through the smart-home environment 100 and communicate corresponding messages through the mesh network. Using the messages that indicate which rooms are occupied, the central server or cloud-computing system 164 logs the information for later use and/or instructs various smart devices in the home to perform certain operations, such as turn on and off lights, lock the smart doorknobs 122, sound alarms, notify public safety authorities and the home owner, etc. as the person enters and exits rooms.

According to embodiment, the central server or cloud-computing system 164 can review the logged information about the occupants' movement in the home to detect signature patterns of movement unique to the various occupants. These signature patterns help the central server or cloud-computing system 164 detect strangers in the home. For example, if an individual is quickly moving from room-to-room at a time when occupants typically are not at home and according to a pattern that is not associated with any of the occupants, the central server or cloud-computing system 164 may infer that this individual is a burglary move from room to room searching for valuable items.

In yet another security-related example, some or all of the network-connected smart devices are equipped with WiFi, BLUETOOTH, NFC, and/or other wireless communication capability. Accordingly, in the event one or more burglars enter the home carrying on their person their mobile devices (e.g., smart phones), the network-enabled smart home devices, upon detecting the home-invasion condition, automatically "interrogate" a burglar's mobile device to try and extract as much useful information as possible about the burglar including, but not limited to, the MAC address of their phone, their cell number, and/or anything else that their mobile device will divulge about itself or the burglar. In addition, an alarm message could be sent to the occupant's mobile device 166 and also to a security service (or police, etc.) containing some or all of this information. According to embodiments, the smart-home environment 100 and/or the security service that monitors the smart-home environment can automatically connect with wireless telephone carrier to determine which mobile devices are currently communicating with the cell tower(s) nearest the burglarized home. The wireless telephone carriers could automatically generate a "suspect list" that would necessarily include the burglar's mobile device.

According to embodiments, the smart-home environment includes a small cellular base station, such as a picocell or microcell. Such cellular base stations provide great LTE, 3G, 4G, etc. data rate in the home and, in some cases, could replace or supplement WiFi. This base station could provide a cellular backup to call emergency personnel such as fire/police in the event of an emergency. Also, referring to the scenario above, in the event a burglar is inside the home, the base station could capture all unique IDs (e.g., mac, imei, serial number) from the burglar's mobile device.

In another security-related example, some or all of the network-connected smart devices are equipped with video cameras. In this case, the network-connected smart devices can transmit video to the central server and cloud-computing system 164, which can make the video available to client devices, such as the user device 166, in the form of a live or prerecorded video stream. An occupant, when away from the home, can use their user device 166 to connected to the central server and cloud-computing system 164 to receive live or prerecorded video of activity occurring in the home. In some embodiments, central server and cloud-computing system 164 automatically provides video from the network-connected smart device that is observing the most activity. For example, if there is an intruder in the house, the central server and cloud-computing system 164 can detect which room is experiencing the most activity (e.g., based on noise and motion), and provide video from that room. It should also be appreciated that the central server and cloud-computing system 164 can provide for display on the user device 166 a grid of camera in the home to choose from. In this case the central server and cloud-computing system 164 can highlight which camera is observing the most activity, so that the user knows that camera is likely the best one to select. It should also be appreciated that the network-connected smart devices have a microphone and speaker and that two-way voice communication can be established between the network-connected smart device and the user device 166. For example, the two-way voice communication can be over internet protocol. This allows users to see and talk to home occupants when the user is away from home.

According to an embodiment, in moments of distress, the network-connected smart devices can broadcast live video stream to nearby emergency personal such as police and fire departments. For example, upon detecting an intruder or some other emergency occurring the home or upon someone pressing a panic button in the home, live video can be broadcast to nearby emergency personnel, such as police, fire, medical, and other first responders. The video, for example, is transmitted from the room where the most activity is occurring or where the button was pressed. In some cases, the video is transmitted directly to the police car that is responding to the call (e.g. the closest police car). It should be appreciated that, rather than broadcast, the video may be provided via a secure stream using secure sockets layer (SSL). It should also be appreciated that the security score of the home may be adjusted based on whether the home has the requisite SSL certificates in place to support the secure video stream to emergency personnel.

According to an embodiment, the network-connected smart devices function as "nanny cams". In one example, when the nearest network-connected smart device detects that a sleeping child has woken, it will turn on its camera and microphone/speaker. The network-connected smart device will then send a message to the user device 166 of the parent/home occupant, who can accept the message to establish live video of the child and two-way audio communication. It should be appreciated that live two-way video communication can also be established. In the case the network-connected smart device can project a video of the user, include a video screen for display video of the parent, and/or control a nearby television or monitor to display video of the user. The network-connected smart device can detect when the child goes back to sleep, and can automatically shut down the video and/or audio.

According to embodiments, some or all of the network-connected devices are equipped with pressure sensors, such as digital air pressure sensors, digital barometric pressure sensors, etc. These pressure sensors may be, for example, resonant types that measure changes in air density, thermal types that measure changes in thermal conductivity of air, ionization types that measure changes in the flow of ions in air, force collector types (e.g., bellow, diaphragm, piston) that measure deflection. One example security-related application for these pressure sensors to detect opening and closing of doors as well as occupant movement in the house by sensing pressure variation patterns associated with such activities. For example, when a door opens or closes, the pressure sensors of the network-connected smart devices would record the associated pressure variation. The central server and cloud-computing system 164, upon reviewing the recorded pressure variation, can determine the activity associated with the pressure variation. For example, pressure variation in a first range may indicated that an adult occupant walked through a doorway while transitioning from one room to another, while pressure in a second range may indicate that a particular door, internal or external, opened or closed.

According to embodiments, the smart-home environment 100 learns over time what activity corresponds with particular pressure variations detected by particular network-connected smart devices in the home. For example, a smart hazard detector 104 located in a foyer near the front door of a home can learn that it is located near an external door. For example, during initial installation, the smart hazard detector 104 can ask the installing user to indicate the room (e.g., kitchen, den, foyer, hallway, etc.) in which it is being install and whether it is proximate to an external door. Later, when it senses a pressure variation, a message can be sent to an occupant's user device 166 asking, "Was the external door near the foyer just opened? [Yes/No]", "Did an occupant just walk through the foyer? [Yes/No]". After the smart hazard detector 104 "learns" which pressure differentials are associate with which activities, it can contribute to home security. For example, the smart-home environment 100 automatically goes into security mode when it determines that all occupants are in bed for the night or that all occupants are away from the home. When in this security mode, if the smart hazard detector 104 in the foyer senses a pressure differential that indicates the external door has just been opened, it triggers the alarm.

According to embodiments, the occupants of the home can pre-program the smart-home environment 100 to broadcast specific alarms in response to specific detected conditions. For example, in the event of smoke detection, the smart-home environment 100 can broadcast via the network-connected smart devices and/or the home appliances, such as television and stereos, a pre-recorded message from the occupant notifying the occupants of a possible fire and providing emergency exit instructions. In another example, in case of detected home invasion, the smart-home environment 100 can broadcast a message to the intruders, notifying them that their presence has been detected, that the occupants possess and are trained to use firearms to protect their home, that the police have been notified, etc.

According to embodiments, the thresholds for triggering these alarms can be varied based on activities occurring in the home. More particularly, technologies including the sensors of the network-enabled smart devices in combination with rules-based inference engines or artificial intelligence provided the central server and cloud-computer system 164 are used to vary alarm thresholds based on the occupants' activities. Inferences about the occupants' activities can be learned based on data received over time. For example, if the smart hazard detector 104 located in the kitchen observes increased temperature, humidity, and motion in the kitchen, then an inference can be made that one or more of the occupants are cooking ("cooking inference"). These data inputs can be considered on a sliding scale based on time of day and day of week. For example, only slight increases temperature and humidity may invoke the cooking inference at 5 pm on weekdays, when history shows that when the occupants typically cook. However, much larger increases are required to invoke the cooking inference at 10 am on a weekday, when the occupants are typically away at that time. In some embodiments, the smoke-alarm threshold is varied when the cooking inference is made. For example, the smart hazard detector 104 in the kitchen becomes less sensitive when one of the occupants is cooking, whereas the hazard detectors 104 in other room remain in normal operation.

In other embodiments, alarm thresholds are varied based on human population in the home. Inferences about human population in the home can be made based on sensed changes in motion, temperature, CO, noise, air pressure differentials, frequency of door openings and closings, etc. According to one example, in the event of detecting a concurrent increase in temperature, motion, noise, and CO, an inference can be made than there is a higher than normal human population in the home ("high population inference"). Certain alarm thresholds may be adjusted when a high population inference is made. For example, the alarm threshold for CO can be increased to account for the high number of CO-emitting humans in the home and to avoid triggering a false CO alarm. In another example, the security system can be disarmed so that guest can freely transition from room to room and in and out of external doors without triggering the alarm. On the other hand, the alarm threshold for smoke detection can be decreased so that the smoke detectors are more sensitive than usual. This is to protect the large number of people in the home from fire. In other examples, the network-connected thermostat may adjust the temperature of the home to a standard temperature that is comfortable for most people. For example, if the occupants like the house to be cool and "teach" the network-connected thermostat to maintain the home at a cooler temperature, then, in the event of a high-occupancy inference, the network-connected thermostat can adjust up to a temperature that is comfortable for most people. Similarly, for example, if the occupants like the house to be warm and "teach" the network-connected thermostat to maintain the home at a warmer temperature, then, in the event of a high-occupancy inference, the network-connected thermostat can adjust down to a temperature that is comfortable for most people.

According to embodiments, alarm thresholds can be varied based on proximity of law enforcement and other emergency personnel. For example, if a law enforcement office is nearby the threshold for the home invasion alarm condition can be increased. This may be applicable in apartments of buildings that have private security, including a doorman.

According to some embodiments, an "occupancy emulator" can be provided to emulate the occupants of a smart-home environment 100 when the occupants are away, such as on vacation. For example, the smart wall switches 108 and/or the smart wall plugs 110 can function as an "occupancy emulator" by learning the occupants' patterns of turning on and off lights, appliances, etc. and mimicking those patterns when the occupants are away.

According to embodiments, the central server or cloud-computing system 164 processes artificial intelligence algorithms capable of making rules-based or learning-based inferences based on sensed patterns of user control of network-connected smart devices, optionally in conjunction with sensed home conditions or other sensed user behaviors. By way of example, for one embodiment, one or more of the smart wall switches 108 is configured to process information acquired by home occupancy sensing devices in conjunction with information from light-switch-control behaviors of the user to produce a result in which the smart wall switches 108 are automatically self-programmed to help the user turn off and on lights according to a preferred schedule, and to mimic the user's patterns when the user is away. This automatic self-programming can also be applied to smart wall plugs 110, which can learn when to turn on and off lamps 118 as well as appliances such as televisions and stereos. Further, it should be appreciated that all network-connected smart devices can automatically self-program.

In one example, the artificial intelligence algorithms can be configured to sense whether there have been a threshold number of days over the past month (or other evaluation period) for which, at roughly the same time of day ("X o'clock"), the user has turned on or off the same or roughly the same set of smart wall switches 108 and/or smart wall plugs 110 to turn on or off the same or roughly the same lights and/or appliances in the home. If such pattern has been detected, the user can be sent a message on their smartphone 166 allowing them to opt-in to a setting in which one or more the relevant smart wall switches 108 and/or smart wall plugs 110 will be automatically turned on or off so as to turn on or off the relevant lights and/or appliances at about X-o'clock. It should be appreciated that the smart-home environment could learn and emulate other patterns. For example, it could learn when the dog barks, such as when a person is within 100 feet of the home or when an occupant returns home from work at about X o'clock, and then record and play back barking sounds at appropriate times. It should also learn when to open and close the garage door to give the appearance that the occupant is going and coming to and from the home.

By way of example, the opt-in message can say, "When you are not at home, I can emulate your presence by automatically turning on the lights and television in the den at about X o'clock on weekdays for about two hours, and at about Y o'clock on weekends for about three hours. It might better secure your home by deterring home invasions! Would you like me to do this for you? '[YES/NO]' The user can then opt in to this functionality and/or modify the schedule and opt in to the modified schedule. If the user's schedule changes and the artificial intelligence algorithms can learn the new schedule and make the proper adjustments. Thus, in accordance with the described embodiment, the collection of smart-home sensors is configured to automatically learn selected user behaviors, to emulate the user's patterns when the user is away, and to automatically learn changes in the user's schedule and make corresponding adjustments.

According to some embodiments, security of the smart-home environment can be further enhanced predicting through inferences when the user intends to leave the home and raising away preparedness measures. To accomplish this, artificial intelligence algorithms capable of making rules-based or learning-based inferences about when the user intends to leave the home based on sensed patterns of user control of smart-home devices, optionally in conjunction with sensed home conditions or other sensed user behaviors. By way of example, for one embodiment, one or more of the light switches is configured to process information acquired by home occupancy sensing devices in conjunction with information from light switch control behaviors of the user to predict when the user intends to leave the home. More particularly, the artificial intelligence algorithms can be configured to sense whether there have been a threshold number of weekdays over the past month (or other evaluation period) for which, at roughly the same time of day ("X o'clock"), (i) the user has turned off a same or roughly same set of active light switches in the home, including the front door light switch, over a five-minute period (or other pre-departure period), and (ii) this event was followed by an extended period of non-occupancy, such as at least one hour of non-occupancy. If such pattern has been detected, the central server and cloud-computing system 164 makes an infers that the user intends to leave the home soon. Response to this inference, the sensitivity of the network-connected smart devices can be increased in anticipation of the user's imminent departure from the home. For example, the threshold for triggering an alarm indicating a home invasion can be reduced. It should be appreciated that the pattern of turning off lights is merely an example, and that other patterns exist on which imminent-departure inferences can be made.

According to embodiments, technologies including the sensors of the smart devices located in the mesh network of the smart-home environment in combination with rules-based inference engines or artificial intelligence provided at the central server or cloud-computing system 164 are used to provide a personal "smart alarm clock" for individual occupants of the home. According to embodiments, the smart alarm clock is capable of monitoring weather and traffic data, and adjust the user's wakeup time to account for delays that could be caused by bad traffic and weather. For example, user-occupants can communicate with the central server or cloud-computing system 164 via their mobile devices 166 to access an interface for the smart alarm clock. There, occupants can turn on their "smart alarm clock" and input a wake time for the next day and/or for additional days. In some embodiments, the occupant may have the option of setting a specific time at which the user would like to arrive at a particular destination. The user may input information about the destination and its location, such as its address. Artificial intelligence will be used to determine how long it typically takes the occupant to wake up and get ready to leave the home. This information will be considered in combination with traffic on the route to the occupant's specified destination and weather conditions to determine what time to wake the occupant so that the occupant will arrive at the destination at the specified time.

According to embodiments, the network-connected smart device in the smart-home environment 100 that happens to be closest to the occupant when the occupant falls asleep will be the device that transmits messages regarding when the occupant stopped moving. This closest network-connected smart device will be the device that sounds the alarm to wake the occupant in time to arrive at the specified destination, accounting for traffic and weather conditions and how long it typically takes the occupant to get ready in the mornings. In this manner, the "smart alarm clock" will follow the occupant throughout the house, by tracking the individual occupants based on their "unique signature", which is determined based on data obtained from sensors located in the smart devices. For example, the sensors include ultrasonic sensors, passive IR sensors, and the like. The unique signature is based on a combination of walking gate, patterns of movement, voice, height, size, etc. It should be appreciated that facial recognition may also be used.

According to embodiments, in the event of bad weather, such as rain, snow, sleet, ice, etc., the smart alarm clock can communicate via the central server and/or could computing system 164 with the occupants automobile and thereby instruct the automobile to automatically shift into all-wheel drive when the user starts up the automobile to drive to the destination. It should also be appreciated that, in cold, winter conditions, the smart-home environment can instruct the automobile to "warm up" and defrost while the occupant is getting ready for work or to leave the home.

"Mapping" the smart-home environment 100 provides a number of advantages. For example, informed by a map of the smart-home environment 100, the central server and cloud-computing system 164 can determine a distressed occupant's or an intruder's location in the home and notify emergency personnel regard the same. This enables emergency personnel to quickly find distressed people or intruders upon entering the home. In other examples, the central server and cloud-computer system 164 determines an emergency exit route for each room of the home. In the event an alarm is activated (e.g., when one or more of the smart hazard detectors 104 detects smoke and activates an alarm), the central server or cloud-computing system 164 uses occupancy information obtained from the network-connected smart devices in the home to determine which rooms are occupied and then turns on lights (e.g., nightlights 170, wall switches 108, wall plugs 110 that power lamps, etc.) along exit routes from the occupied rooms so as to provide emergency exit lighting. These are just a few of example advantages of mapping the home, and it should be appreciated that there are an unlimited number of advantages.

According to embodiments, mapping of the home can be done automatically. For example, a map generated based on positional information obtained from the nodes of the mesh network (e.g., positional information from the network-connected smart devices is used to construct a map of the house). According to this example, the individual network-smart devices obtain or determine their location upon being installed or at some other time, and send the location information to the central server or cloud computing system 164 or to a mapping application on the mobile device 166 of a user. For example, when installed, a network-connected smart device can ask the user (by 2D LCD display, 2D/3D holographic projection, voice interaction, etc.) a few simple questions such as, "Where am I" and the user can select "bedroom" or "living room" and so forth. In other examples, smart device can provide the user with instructions, such as "Press button once if I am in the kitchen, press twice if I am in the den, etc." Also, for example, the smart devices may be capable of determining their GPS coordinates and/or transmitting WiFi location or cellphone tower location information. The central server or cloud computing system 164 or the mapping application on the mobile device 166 uses this information to automatically construct a map of the home. In some examples, a robot 162 (discussed below in detail) 'roams' free in the house and sends mapping information to the application on the mobile device 166 or to the central server or cloud-computing system 164, which uses the mapping information to construct a map of the home. For example, the robot 162 could be put into a 'mapping' mode where it obtains location data as it moves along the walls of each room in the house, and then sends the location data to the application on the mobile device 166 or to the central server or cloud-computing system 164, which uses the mapping information to construct a map of the home.

According to other embodiments, an indoor positioning system (IPS) could be used to map the smart-home environment 100. For example, a user could launch a mapping application on the mobile device 166 that uses IPS to create a map of home. In this case the user would walk along the walls of the home and the mobile device would collect location information using IPS and/or other indoor localization techniques, and use that information to construct a map of the home or send the collected information to the central server or could-computer system 164, which creates the map. It should be appreciated that instead of or in addition to using IPS and/or other indoor localization techniques, the application on the mobile device 166 could use the mobile device's gyroscope, magnetometer, accelerometer, and altimeter to obtain location information.

According to still other embodiments, RFID tags are used to map the smart-home environment 100. For example, RFID tags are placed throughout the home. Upon placing the tag, the user could scan the tag using the mobile device 166, which would launch an application, instructing the user to input location information. Also for example, instead of instructing the user to input location information, the mobile device could determine its own location (e.g., using any techniques know to those having skill in the art, such as GPS, at the time of the scan, and associate that location information with the tag.

According to embodiments, in the event of an alarm condition, a map of the smart-home environment 100 is sent to emergency responders. For example, upon detecting the emergency event, such as an intruder or a distressed occupant, the central server and cloud-computing services 164 sends a map (e.g. a map created as described above) of the smart-home environment 100, along with an indication of where on the map the emergency event is occurring. This map can be displayed in the vehicles or on mobile devices of emergency responders, so that they can review the map in advance of entering the home. This will enable them to quickly find the appropriate location upon entering the home.

According to embodiments, smart-home environments can be grouped into "neighborhood security networks" and information can be shared among smart-homes environments in the same "neighborhood." For example, in the event one smart-home environment experiences a fire, an intrusion, a missing child, a medical emergency or some other type of emergency or notable event, notification is sent to other smart-home environments in the same neighborhood. Such neighborhood security networks enable smart-home environments to communicate with one another in real time, or near real time, about emergencies and other important events happening in the neighborhood. This real time communication enables network-connected smart devices in non-affected smart-home environments to make appropriate security- and safety-related responses that minimize or eliminate impact from the emergency event, such as lock the smart doorknob 122, arming security systems, turning on outdoor and indoor lights to deter home invasion, sounding alarms to wake up and warn sleeping occupants of a nearby fire, etc. In some cases, these responses can even resolve or help resolve emergency events, such as by using identification technology to locate a missing child or turning on outdoor lighting so that law enforcement can locate and apprehend fleeing criminals.

A number of different techniques may be used to create neighborhood security networks. According to some embodiments, the central server or cloud-computing architecture 164 automatically creates the "neighborhoods" based on a combination of "neighborhood criteria information", such as geographic location of the homes, demographic information about occupants of the homes, and "opt-in" information about which types of alerts the homes wish to receive. Geographic location information may include home address, ZIP code, GPS coordinates, WiFi location information, cellular tower location information etc. Demographic information about the occupants may include age, gender, health, special needs, etc. Opt-in information may include fire alerts, home invasion alerts, missing children alerts, missing pets alerts, missing property alerts, earthquake alerts, etc. According to embodiments, the network-connected smart devices of smart-home environments 100 provide the "neighborhood criteria information" to the central server or cloud-computing architecture 164 upon registration and/or during ongoing use, and the central server or cloud-computing architecture 164 logs and stores the neighborhood criteria information the home data 202, the derived home data 208, and/or another data.

According to some embodiments, the central server or cloud-computer architecture 164 correlates network-connected smart devices using the geographic location information and therefore creates the "neighborhoods" based on geo-proximity, such that home in close proximity to one another are grouped into the same neighborhood. It is possible that each smart-home environment has its own neighborhood that includes other homes with in a predefined radius. This way, each home is in the middle of its neighborhood and benefits from being surrounded by neighbors, rather than being on the edge of a neighborhood. The geographic reach of the neighborhood may vary based on the type of event or emergency in question. For example, in the event a home experiences a fire, the central server or cloud-computer architecture 164 creates a neighborhood that includes all homes within one-mile radius, whereas if a child goes missing then the neighborhood can include all homes within a ten-mile radius or all homes in a particular ZIP code, city, county, etc.

According to some embodiments, the central server or cloud-computer architecture 164 creates neighborhoods based on demographic information. For example, in the event a teenage child of one smart-home environment is out past his or her curfew, the created neighborhood consists of nearby homes where teenagers are members of the household. This way, notice that the teenager is out past his or her curfew is sent to the homes of the neighborhood, and the teenager can be located if he or she is out visiting another teenager whose home is in the same "neighborhood". In another example, in the event an occupant of a particular home contracts the flu or some other communicable illness, the created neighborhood consists of nearby homes where small children or elderly adults live. In this example, a notice is sent to the other homes in the neighborhood so that precautionary measure can be taken to help prevent the young children and elderly adults from contracting the illness.

According to embodiments, the central server or cloud-computing architecture 164 automatically identifies smart homes within a radius of the home experiencing the emergency or event and sends an alarm to the identified homes. In such instances, the other homes in the "neighborhood" do not have to sign up for or register to be a part of a safety network, but instead are notified of emergency or event based on their proximity to the location of the emergency or event. This creates robust and evolving neighborhood security watch networks, such that if one person's home is getting broken into, an alarm can be sent to nearby homes, such as by audio announcements via the smart devices located in those homes.

However, it should be appreciated the "neighborhood security networks" can be "opt-in" services and that, in addition to or instead of the central server or cloud-computing architecture 164 selecting which homes to send alerts to, individuals can subscribe to participate in such networks and individuals can specify which homes they want to receive alerts from and the types of alerts to be received. This can include, for example, the homes of family members who live in different cities, such that individuals can receive alerts when their loved ones in other locations are experiencing an emergency or other types events. In some examples, that homes where having children can subscribe or "opt in" to be a part of a "neighborhood" that sends alerts when children are missing or out past curfew. Further, homes having elderly people may can subscribe or "opt in" to be a part of a "neighborhood" that sends alerts regarding their elderly peers and attempt to form a community that looks out for the security, safety, and health of its members.

According to embodiments, before a smart-home environment 100 is included in a neighborhood security network, an opt-in message is sent to the home owner, such as via the home owner's mobile device 166. The home owner is provided with information about the other homes in the "neighborhood", the basis on which the neighborhood security network was form (e.g., geographic location, family relationships, demographic information, etc.), the types of information that will be shared with other homes in the neighborhood security network (e.g., occupants away on vacation, potential invasion, missing child, etc.).

As discussed, notification of an emergency or event occurring in one home can trigger responses in other homes in the "neighborhood.". For example, in the event of a burglary in one home, the central server or cloud-computing architecture 164 instructions the network-connected smart devices of the other smart-home environments 100 in the neighborhood to turn on outside lights, to lock the smart doorknob 122 and window latches, to arm the security system. Also, for example, in the event smoke is detected in one home in the neighborhood, the central server or cloud-computing architecture 164 can increase the sensitivity of the smoke-detecting components of other smart hazard detectors 104 in the neighborhood. In this example, the neighborhood may include all units in the same apartment or condominium building. Further, for example, in the event a dog goes missing in one home, the network-connected smart devices of other homes in the neighborhood can be tuned to detect motions that indicate a dog. In this example, if a dog is detected by an outdoor network-connected smart device that does not typically detect dogs, then a message can be send to the home of the missing dog indicated that a stray dog was detected and providing the location of the detection. Further, in some examples, the a RFID tag may be provided on the dog's collar, and the network-connected smart device of the other homes in the neighborhood may located the dog by "reading" the RFID tag and give the location of the dog upon request. RFID tags may be placed on other property, too, such as bicycles such that other property may be located in a similar manner.

According to embodiments, individuals may manually broadcast messages to other homes in the "neighborhood". For example, when a family is leaving for vacation, they can cause the central server and cloud-computing system 164 to send a notification to a network of trusted neighbors. This network can be manually defined or inferred.

According to embodiments, the central server or cloud-computing system 164 may obtain and store identifying information, such as facial recognition data, for the occupants of the smart-home environments 100. In this case, when "recognized" an individual who is an occupant of one of the smart-home environments 100 is approaching an external door, such as the front door, of another smart-home environment, the smart doorbell 106, via the processing capabilities of the central server or cloud-computing system 164, is able to recognize the approaching individual and announce his presence. For example, the approaching individual's name and/or status as being a neighbor may be announced, a video of him approaching may be displayed, and/or his image (such as a photograph taken from his social networking account) may be displayed inside the smart-home environment 100.

Figure 11:
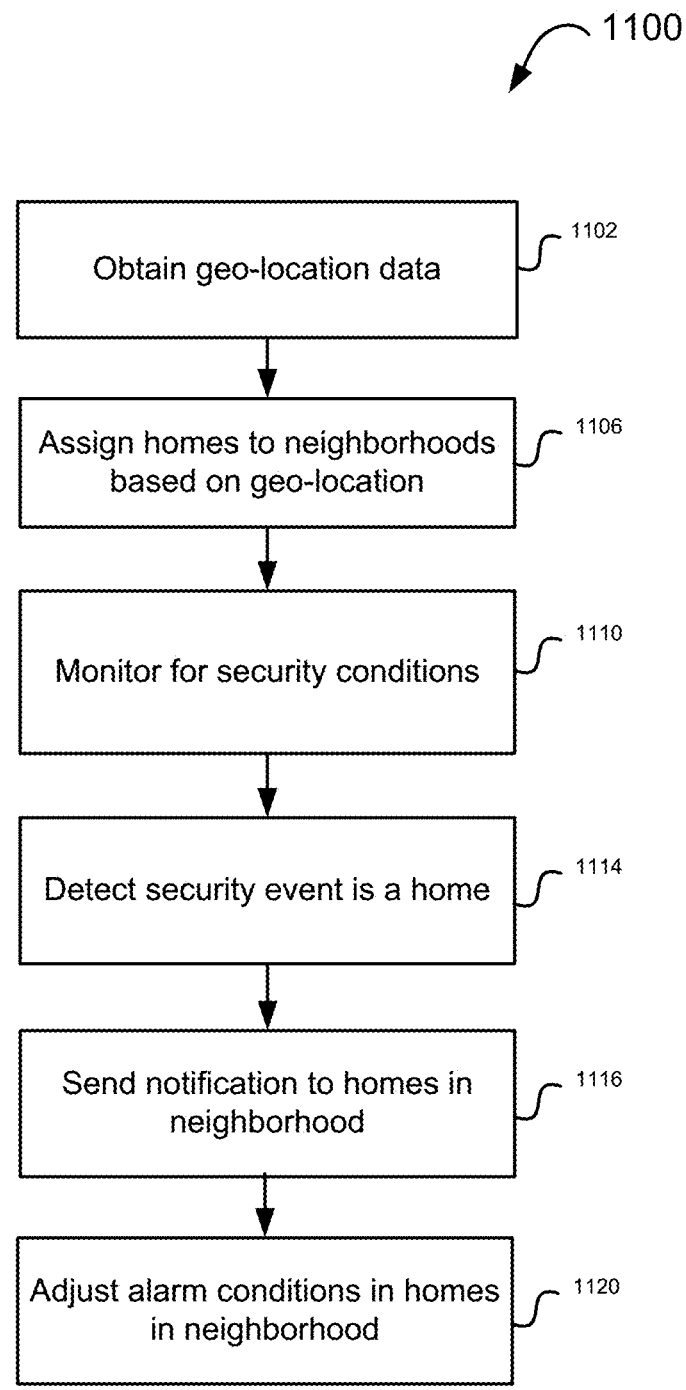
FIG. 11 is a block diagram of an example process for creating neighborhood security networks ("neighborhoods") and sending security-related notifications to homes in the created neighborhoods, according to at least one embodiment.

FIG. 11 provides an example process 1100 for creating neighborhood security networks ("neighborhoods") and sending security-related notifications to homes in the created neighborhoods, according to at least one embodiment. At 1102, the process 1100 generally begins when the central server and cloud-computing system 164 obtains geographic location data for a plurality of smart-home environments. In one example, the geographic location data is obtained from the home data 202. At 1106, the central server and cloud-computing system 164 assigns the smart-home environments into neighborhood security networks based at least in part on the geographic locations of the homes. For example, homes in close proximity are grouped into the same "neighborhood". In some embodiments, when a home is assigned to a neighborhood, an "opt out" or "opt in" message can be sent to the home, giving its occupants the option of not participating in the neighborhood or giving them the option of participating. At 1110, the central server and cloud-computing system 164 monitors for security-related conditions. For example, the central server and cloud-computing system 164 analyzes data received from the network-connected smart devices of a plurality of smart-home environments 100. For example, the security services 205 applies security-related algorithms, logic, and artificial intelligence to review data received from network-connected smart devices to detect security related events, such as home invasions. At 1114, the central server and cloud-computing system 164 detects a security-related condition in one of the smart-home environments. For example, the central server and cloud-computing system 164 may receive data from an entry detector 112 of a smart home environment 100 that a window 182 has been opened while the occupants are asleep and the home's security system is armed. At 1116, the central server and cloud-computing system 164 sends a security-condition notice to network-connected smart devices in other homes in the same neighborhood. For example, if the central server and cloud-computing system 164 infers that the opened window 182 indicates that a home invasion is occurring, it sends a home-invasion alarm to the other houses in the neighborhood. At 1120, responsive to detecting the security-related event in the one of the homes and/or responsive to sending the security-related notifications, the central server and cloud-processing system 116 adjusts one or more alarm conditions in the other homes in the neighborhood and/or invokes precautionary responses in the other homes in the neighborhoods. For example, the alarm conditions are adjusted to increase sensitivity for detecting conditions related to the security notification. In one example, the security notification relates to a home invasion in one home in the neighborhood, the central server and cloud-computing system 164 increases the sensitivity of the smart entry detectors 112, turns on the lighting systems 116, and locks the smart doorknobs 122 of other houses in the neighborhood.

Figure 12:
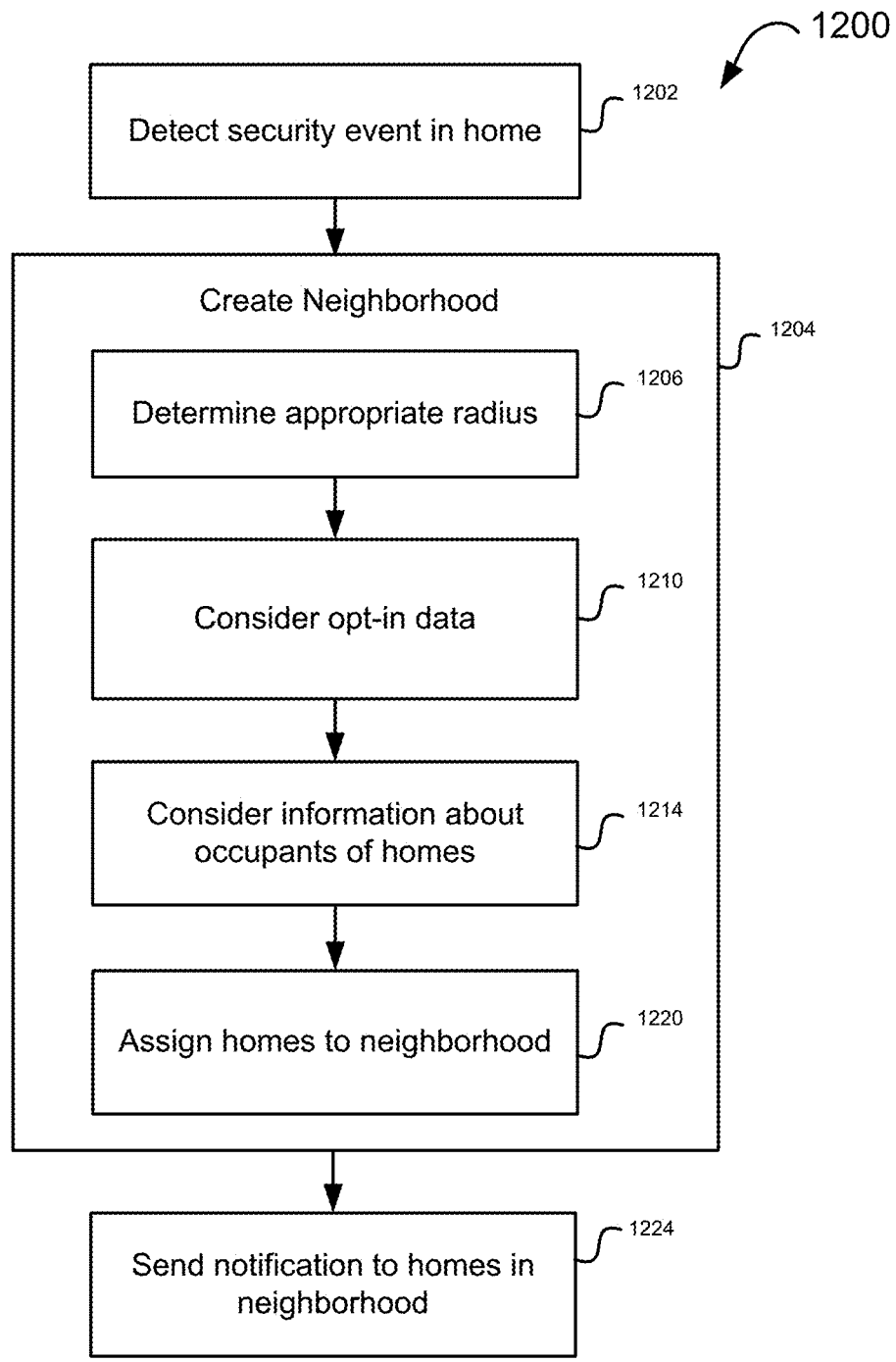
FIG. 12 is a block diagram of another example process for creating neighborhood security networks ("neighborhoods") and sending security-related notifications to homes in the created neighborhoods, according to at least one embodiment.

FIG. 12 provides another example process 1200 for creating neighborhood security networks ("neighborhoods") and sending security-related notifications to homes in the created neighborhoods, according to at least one embodiment. At 1202, the process 1200 generally begins by detecting a security event in a smart-home environment 100. For example, the central server and cloud-computing system 164 could detect a home invasion or fire or that a teenager is out past curfew. In other examples, at 1202, the central server and cloud-computing system 164 may receive notice of a security event (rather than detect) in one of the homes. An example could be receiving notice that a child has gone missing. At 1204, the process 1200 involves creating a neighborhood security network consisting of homes that would benefit from receiving notification of the security event. At 1206, as part of creating the neighborhood, an appropriate radius for the neighborhood is determined based on the detected security event. For example, in the event of a fire, the radius of the neighborhood can be fairly small, such as one mile or less. In this case, homes within a one-mile radius of the fire will be notified. Homes farther than one mile from the fire are not at risk and therefore do not need to be notified. However, in the case of a missing child, the radius of the neighborhood can be much larger. This increases the likelihood that the child will be located. At 1210, opt-in information is considered. As mentioned above, individual homes can opt-in to receive security-condition notifications. Thus, at 1210, the central server and cloud-computing system 164 determines which home have opted to receive the particular notice. At 1214, information about the occupants of the homes is considered. For example, in the event the notice relates to a teenager who is out past his or her curfew, the central server and cloud-computing system 164 will identify other homes where teenagers live. In other example, if the notice related to a contractible illness that is dangerous for young children and elderly adults, then the central server and cloud-computing system 164 will identify home where young children and elderly adults live. At 1220, homes are assigns to the neighborhood. For example, at 1220, the central server and cloud-computing system 164 identifies the homes that are within the radius, have opt-in to receives the relevant type of notification, and have occupants who would benefit from receiving the notification. At 1224, the process 1200 involves sending the notification to the homes that were assigned to the neighborhood.

According to embodiments, a security score may be calculated for a smart-home environment. In some examples, a security score for a home is calculated by comparing the security features of the home against a list of security criterions to determine how many of the security criterions are satisfied. Higher scores indicate that a home satisfies a high number of security criterions and is therefore relatively secure, whereas lower scores indicate the home fails to satisfy many of the criterions. According to embodiments, security scores can be normalized and scaled so that occupants of a home can compare the security of their home to other homes. For example, a score of 0 to 100 can be used, where 0 is the lowest possible score and 100 is the highest possible score. Further, for example, the central server or cloud-computing system 164 may generate a report or log that lists the security criterions and provides an indication of whether the home satisfies each of the criterions. Occupants can review this list to determine which criterions are not satisfied and then make the appropriate improvements to the home so as to include the home's security score. Additionally, the central server or cloud-computing system 164 can use this log to generate a list of suggestions for improving the home. It can prioritize the list based on which criterions are associated with the most points, indicate which creation can be easily and cheaply satisfied with only minor improvement, and indicate which unsatisfied criterions are typically satisfied in other homes. For example, the central server or cloud-computing system 164 can send the following message to an occupant's electronic device 166: "We notice that you often leave the front door unlocked. Most homes in your neighborhood keep the front door locked at all times. Locking your front door at night is an easy and inexpensive way to improve your home's security and to improve your security score." Example security criterions for assesses the security of and calculating a security score are discussed below. However, it should be appreciated that any number and combination of security criterions can be used when assessing security and calculating a security score for a home.

One example security criterion is whether the home has a requisite number of network-connected smart devices, such as smart hazard detectors 104, smart entry detectors 112, etc. The requisite number can be determined based on the size of the home, the number of bedrooms in the home, the configuration of the home (single story, two-story), the number of occupants living in the home, the laws, rules, and regulations of the jurisdiction(s) where the home is located, etc. In some cases, this information can be automatically obtained from public real estate databases. For example, the central server and/or cloud-computing services 164 can access a public real estate database(s) to obtain the size, location, configuration, number of bedrooms/bathrooms, etc. The central server the central server and/or cloud-computing services 164 can also access the home data 202 to determine how many network-connected smart devices are located in the home, and compare that number to the requisite number to determine whether the criterion is satisfied.

Another example security criterion is whether the various types of network-connected smart devices are properly located in the home. For example, for this criterion, the central server and/or cloud-computing services 164 determine whether a smart-entry detector 112 is located at each window 182 and external door 186, whether a smart hazard detector 104 with smoke and motion detecting capabilities is located in all of the appropriate locations, such one in the kitchen and at least one on each floor of the home, whether the doorbell of the home is a smart doorbell 106 with the security capabilities described herein, whether the wall switches are smart wall switches 108, whether the wall plugs are smart-wall plugs 110, etc. The central server and/or cloud-computing services 164 can make these determines by reviewing the home data 202 to obtain information about the location and capabilities of the various network-connected smart devices in the home and comparing that information against a map of the home. The map can be generated according to the example techniques described herein.

In some embodiments, a security criterion is whether the house has been "mapped". As discussed elsewhere herein, maps of the homes can be created and stored in the home data 202. Mapping improves security not only because it enables the central server and/or cloud-computing services 164 to determine whether the home has an adequate number of appropriate located network-connected smart devices, but it also enables the central server and/or cloud-computing services 164 to pinpoint within the home where a security event is taking place and to provide that information for emergency responders. Another example security criterion is the average amount of time it takes first responders to get to the home after an alarm has been triggers. This information can be average based on data from nearby homes. If the response time is fast, then the security score of the home is increased.

Other example security criteria related to the capabilities and configurations of the respective network-connected smart devices in the home. For example, the central server and/or cloud-computing services 164 can access and review the home data 202 to determine whether the network-connected smart devices are wired (rather than battery operated), whether the batteries are sufficiently charged, whether they are WiFi enabled and connected to a strong and reliable WiFi network, whether the CO date codes of the smart hazard detectors 104 are up-to-date, whether there is cellular backup in the event WiFi goes down, etc. Another example, criterion is whether the hub spokesman node in the home is wired (rather than battery operated).

In some embodiments, the central server and/or cloud-computing services 164 can review the security logs for the house provided in the home data to assess whether the occupants are keeping the home secure. For example, one security criterion that can be considered during this review is whether a door or window was left unlocked overnight. Another example, criterion is the number of strangers that visit the house on a regular basis. This can be determined, per the discussion above, by detecting strangers based on the number of unregistered mobile device 166 and/or occupants in the home. The more strangers that visit, the less secure the home and the lower the security score. On the other hand, if the home occupants regularly consist of just registered occupants, then the more secure the home and the higher the security score. Another example security criterion is the number of unregistered mobile devices that come into contact with the home on a regular basis. This can be particular relevant for apartments, condos, and homes in densely populated areas where strangers are frequently nearby. One way the central server and/or cloud-computing services 164 can make this determination is by reviewing the number of unrecognized mac addresses that contact the router of the home's WiFi network. In some examples, for those homes located in apartment and condo buildings and in densely populated areas, the mac addresses of the neighbors' mobile device's can be factored out over time. For example, if the same mac address is seen on a regular basis, then it can be assumed that that device is associated with a neighbor and will not be used to lower the security score of the home.

Other example security criteria involve how readily the occupants, or non-resident individuals who are in a position to confirm whether an alarm condition is false, can be contacted in the event of an alarm condition. Here, for example, the central server and/or cloud-computing services 164 considers whether the occupants of the home have verified their contact information. For example, this may include determine whether and which of the occupants have provided their emergency contact information (e.g., mobile telephone number) to the central server and/or cloud-computing services 164. The security score increases if the occupants have verified their contact information because, in the event of an alarm condition, the occupants can be contacted verify whether the alarm is false and if not they can help resolve or otherwise address the emergency. The security score increases even more if every occupant of the home verifies their contact information.

Another example security criterion is the quality of "coverage" in the home. For example, the central server and/or cloud-computing services 164 determines whether the home has a comprehensive mesh network of nodes that are capable of sensing conditions at all locations within the home and communicated data regarding the sensed conditions through the mesh network and to the central server and/or cloud-computing services 164. According to one embodiment, to determine whether the home has a comprehensive mesh network, the central server and/or cloud-computing services 164 tracks an occupant's movement through the home to identify "black spots", which are areas in the home where the central server and/or cloud-computing services 164 was unable to detect the occupant. The security score can be adjusted based on the extent of the black spots in the home.

Figure 13:
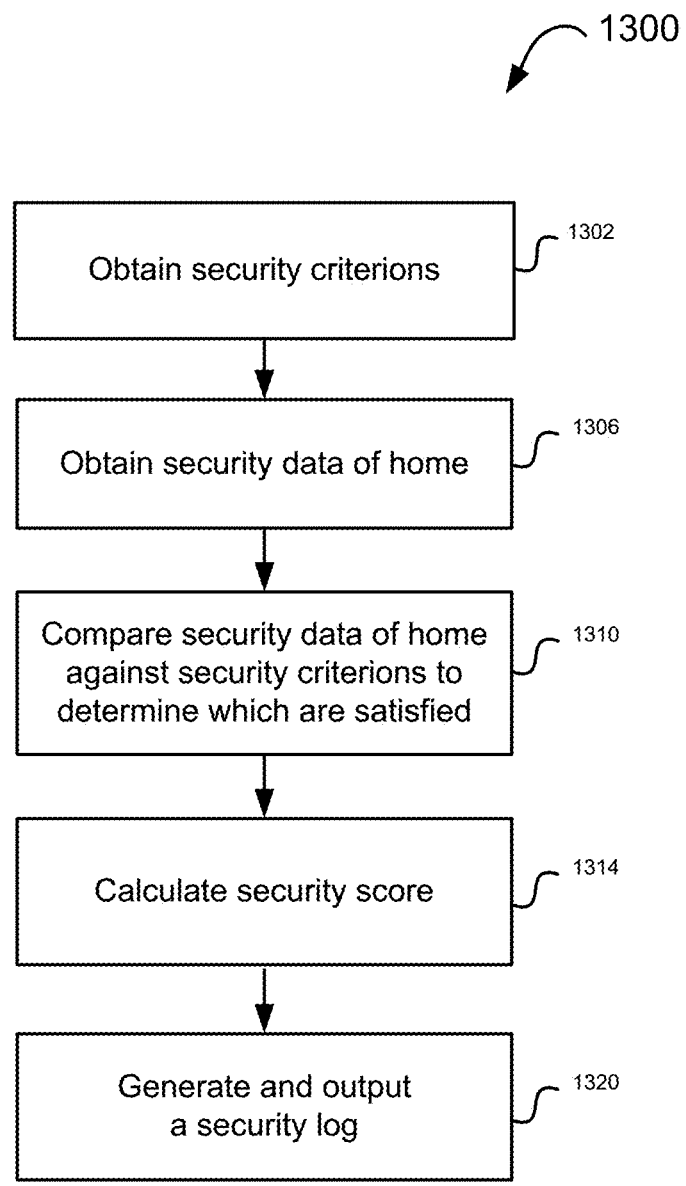
FIG. 13 provides an example process for calculating and reporting a security score for a smart-home environment, according to at least one embodiment.

FIG. 13 provides an example process 1300 for calculating and reporting a security score for a smart-home environment, according to at least one embodiment. At 1302, the process 1300 generally begins by obtaining security criterions. For example, the central server and/or cloud-computing service 164 obtains a list of security criterions from a database. The list of security criterions may include all of some of the example criterions discussed above. As discussed above security criterions are used to assess the security of the home. For example, when a home satisfies a high number of applicable security criterions that home has a correspondingly high security score, and there is a higher probability that the home is indeed secure. At 1306, the process 1300 involves obtaining security data from the home. For example, the central server and/or cloud-computing service 164 obtain sensor data and other data from and related to the network-connected smart devices of the home. Such data may be included in the home data 202.

At 1310, the process 1300 involves comparing the security data of the home against the obtained security criterions to determine which of the security criterions are satisfied. Here, according to an embodiment, the central server and/or cloud-computing service 164 processes the obtained home data against the list of security criterions to determine which of the security criterions are satisfied. At 1314, the security score is calculated. To do so, for example, the central server and/or cloud-computing service 164 determines a security score for the home based on the number of security criterion that were satisfied. The higher the number of satisfied criterion, the higher the security score. At 1320, a security log is generated. For example, the central server and/or cloud-computing service 164 generates a log that lists each of the security criterions and corresponding indications of whether the respective criterions were satisfied. This log can be outputted, for example, by sending the log to the electronic devices 166 of the occupants. In some embodiments, the log includes a written description for each of the security criterions so that occupants can review the descriptions of the unsatisfied criterions to determine what they can do to improve the security of their home. In some examples, the corresponding the corresponding indications of whether the respective criterions are satisfied are binary indicators, whereas in other examples the corresponding indications are values indicative of a degree of compliance. For example, if the home has fifty percent of the requisite number of smart hazard devices 104, then the indication corresponding to that criterion can indicate that it is fifty percent satisfied. As discussed above, the security criterions can include a "proper sensor location: criterion, a "low sensor battery" criterion, a "low WiFi signal" criterion, a "door open" criterion, a "door closed" criterion, a "door locked" criterion, a "window open" criterion, and a "window locked" criterion.

According to some embodiments, "pre-alarm condition trend detection and notification" services are provided to warn users of potential dangerous conditions. More particularly, technologies including the sensors of the network-enabled smart devices in combination with rules-based inference engines or artificial intelligence provided the central server and cloud-computer system 164 are used to make inferences about potential security conditions in the home. This may occur in situations where the sensor data is not "strong" enough to support an actual alarm condition, but it is enough to cause an inference that potentially dangerous activity may occurring in the home and that it is worth investigating whether such activity is indeed occurring.

For example, as discussed above the central server or cloud-computing system 164 can review the logged information about occupants' movement in the home to detect signature patterns of movement unique to the individual occupants of the home. These signature patterns help the central server or cloud-computing system 164 detect strangers in the home. For example, if an individual is quickly moving from room to room at a time when occupants typically are not at home and in a pattern that is not a signature pattern of any of the occupants, the central server or cloud-computing system 164 may infer that this individual is potentially a robber moving from room to room searching for valuable items. While this inference may not rise to the level of a home-invasion alarm condition, it may be worth investigating. Thus, the central server or cloud-computing system 164 sends a "pre-alarm" alert message to the registered occupants' mobile device 166, information the occupants of the detected pattern that there may be suspicious activity occurring in the home. The message may include an indication of where in the house suspicious activity is occurring. The message may also request that the occupant verify that this is a false alert or that an actual home-invasion-condition exists.

In another example, the smart doorbell 106 may observe the same car parked on a street out front of the smart-home environment 100 over the course of several days. In particular, the smart doorbell 106, in combination with rules-based inference engines or artificial intelligence provided the central server and cloud-computer system 164, may infer that the comings and goings of the car are consisting with burglars "casing" the home. Upon making this inference, rather than triggering an alarm condition, the central server and cloud-computer system 164 may send a "pre-alarm" message to the occupants' mobile devices 166 and/or to local law enforcement, alerting them to the potential casing and including a description of the car.

According to other embodiments, the pre-alarm condition trend detection and notification can be applied to detect evaluated levels of potentially dangerous substances (e.g., CO, smoke, etc.) in the smart-home environment 100. For example, an alarm condition may be established based at least in part on a predetermined amount of a substance in an environment. The alarm condition may be stored locally by a smart hazard detector or remotely by the central server and cloud-computer system 164. For example, once the concentration level of CO in the air reaches a certain level, an alarm condition will be triggered. Additionally, a "pre-alarm condition" is established based at least in part on a predetermined trend in the amount of the substance in the environment. For example, the pre-determined trend can be at least a twenty-percent increase in the amount of the substance over at least a two-week period. After establishing the alarm and the pre-alarm conditions, the central server and cloud-computer system 164, the smart hazard detector and/or other smart home devices receives sensor data indicating that the amount of the substance in the environment and analyzes the sensor data to detect the presence of either the alarm or pre-alarm condition. Responsive to detecting the pre-alarm condition but not the alarm condition, the central server and cloud-computer system 164, the smart hazard detector and/or other smart home devices provides a notification of the pre-alarm condition. For example, the central server and cloud-computer system 164 may send a message to the mobile device 166 of the occupant stating, "The CO level in your home has increased twenty-percent in the last two weeks. You might consider having an expert inspect your home to determine the cause." Also for example, the smart hazard detector and/or other devices in the home may make a similar audile announcement or display a similar written message.

Additionally, the pre-alarm message may be sent to a repair contractor or a public safety agency, so that they can respond directly. For example, the repair contractor may call the owner to notify the owner of the problem and prepare a plan to repair the problem. According to embodiments, the pre-alarm message giving notification of the pre-alarm condition is sent to a centralized bidding system that solicits bids from repair contractors and selects one of the repair contractors to resolve the problem.

According to some embodiments, sound, vibration, and/or motion sensing components of the smart devices are used to detect sound, vibration, and/or motion created by running water. Based on the detected sound, vibration, and/or motion, the central server or cloud-computing architecture 164 makes inferences about water usage in the home and provides related services. For example, the central server or cloud-computing architecture 164 can run programs/algorithms that recognize what water sounds like and when it is running in the home. According to one embodiment, to map the various water sources of the home, upon detecting running water, the central server or cloud-computing architecture 164 sends a message an occupant's mobile device asking if water is currently running or if water has been recently run in the home and, if so, which room and which water-consumption appliance (e.g, sink, shower, toilet, etc.) was the source of the water. This enables the central server or cloud-computing architecture 164 to determine the "signature" or "fingerprint" of each water source in the home. This is sometimes referred to herein as "audio fingerprinting water usage."

In one illustrative example, the central server or cloud-computing architecture 164 creates a signature for the toilet in the master bathroom, and whenever that toilet is flushed, the central server or cloud-computing architecture 164 will know that the water usage at that time is associated with that toilet. Thus, the central server or cloud-computing architecture 164 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices are used to detect sound, vibration, and/or motion created by mice and other rodents as well as by termites, cockroaches, and other insects (collectively referred to as "pests"). Based on the detected sound, vibration, and/or motion, the central server or cloud-computing architecture 164 makes inferences about pest-detection in the home and provides related services. For example, the central server or cloud-computing architecture 164 can run programs/algorithms that recognize what certain pests sound like, how they move, and/or the vibration they create, individually and/or collectively. According to one embodiment, the central server or cloud-computing architecture 164 can determine the "signatures" of particular types of pests.

For example, in the event the central server or cloud-computing architecture 164 detects sounds that may be associated with pests, it notifies the occupants of such sounds and suggests hiring a pest control company. If it is confirmed that pests are indeed present, the occupants input to the central server or cloud-computing architecture 164 confirmation that its detection was correct, along with details regarding the identified pests, such as name, type, description, location, quantity, etc. This enables the central server or cloud-computing architecture 164 to "tune" itself for better detection and create "signatures" or "fingerprints" for specific types of pests. For example, the central server or cloud-computing architecture 164 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 164 can make inferences that nearby homes may also have such problems or may be susceptible to having such problems, and it can send warning messages to those home to help facilitate early detection and prevention.

According to some embodiments, sound, vibration, and/or motion sensing components of the smart devices are used to detect sound, vibration, and/or motion created by intruders impermissibly entering the home. Based on the detected sound, vibration, and/or motion, the central server or cloud-computing architecture 164 makes inferences about home invasion and provides related services. For example, the central server or cloud-computing architecture 164 can run programs/algorithms that assess detected sounds, vibrations, and movement in view of whether the home occupants are home or way, sleeping or awake, etc.

For example, in the event the central server or cloud-computing architecture 164 detects sounds proximate to windows, doors, and other external entryways while concurrently receiving information that all registered occupants are away from the home or are accounted for and asleep in their respective rooms, the central server or cloud-computing architecture 164 alerts the occupants to the possible invasion and/or deters the intruders by turning on nearby lights, sounding audible warnings, etc. For example, the audible announcement could be an indication that an intrusion is occurring. This will alert the occupants and hopefully scare away the intruder.

According to some embodiments, sound, vibration, and/or motion sensing components of the smart devices are used to detect sound, vibration, and/or motion created when an occupant of the home is under distress, such as when an individual falls and cannot get up. Based on the detected sound, vibration, and/or motion, the central server or cloud-computing architecture 164 makes inferences about the respective occupants of the home and their patterns of movement. These inferences may be enhanced by providing the central server or cloud-computing architecture 164 with age, health, and other information about the individual occupants. For example, the central server or cloud-computing architecture 164 can identify and track the movement through the home of the respective occupants using techniques described herein, such as based on their "signature" or signals emitted from their tracking devices (e.g., mobile phones), and activate a distress alarm when an occupant's movement indicates distress. For example, an elderly occupant may be in distress immediately after making a very swift movement or causes a strong vibration that an elderly person would be incapable of making unless that person were falling. A distress alarm may also be activated when an occupant remains in one position, such as in bed or in a bath, for a period that exceeds a threshold. Further, a distress alarm may be activated upon receiving a verbal command, such as "help", from an occupant.

For example, in the event the central server or cloud-computing architecture 164 detects sounds proximate to windows, doors, and other external entryways while concurrently receiving information that all registered occupants are away from the home or are accounted for and asleep in their respective rooms, the central server or cloud-computing architecture 164 alerts the occupants to the possible invasion and/or deters the intruders by turning on nearby lights, sounding audible warnings, etc.

Turning now to FIGS. 4A-C, illustrations are provided of exemplary embodiments of the smart wall switch 108. According to embodiments, the wall switches 108 enhance the smart-home environment 100 by providing a retrofit wall light switch that, in addition to maintaining the basic character and purpose of a light switch, incorporates a host of host of sensing, interface, and communications capabilities for enhancing occupant comfort, convenience, and safety.

By virtue of being mounting in place of traditional wall switches, the wall switch 108 has access to plentiful electrical operating power, such as by connecting to wiring (e.g., to 120V "hot" line voltage wires) that is behind the walls 154 of the smart-home environment 100 and that is present at virtually all standard home wall light switches. This essentially unlimited power budget, the near-ubiquity of excellent installation locations throughout the home, and the reasonably ample physical space on its face plate and in its housing to fit the necessary components, combine to enable the wall switch 108 to accommodate a rich and wide variety of sensing, interface, and communications capabilities for the smart-home environment 100, as well as a general platform for the provision of even newer sensing, interface, and communications hardware as it becomes available over the coming decades.

A rich variety of new interactions are made possible between wall switch 108 and other devices of the smart-home environment 100. Occupancy sensing, for example, can be significantly enhanced by virtue of the great locations (usually right next to room doorways) of most wall light switches, allowing for easy tracking of occupants as they transition between rooms, predictive occupancy algorithms, and so forth.

FIGS. 4A-C illustrate exemplary user interfaces and hardware features of the wall switch 108. According to embodiments, at the core of the wall switch 108 is powering circuitry, including a rechargeable battery, for extracting power as needed from the 120V "hot" line voltage wire. The rechargeable battery can either be used as a conventional back-up source or as a reservoir to supply excess DC power if needed for short periods.

As illustrated in FIG. 4A, according to some embodiments, the wall switch 108 is split into two parts: a head unit 404 and a backplate 408. This bifurcation can increase the success and commercial longevity of the wall switches 108 by making them a modular platform consisting of two basic components. According to some embodiments, the backplate 408 is a permanent interface box (sometimes referred to herein as "docking station 408") that serves as a physical connection into the wall and to the 120V line voltage wires or other wiring of the smart-home environment 100, and that contains a AC-to-DC powering circuitry 410. When installed, the docking station 408 may resemble a conventional one-gang or two-gang wall box, except no dangerous high-voltage wires are exposed to the user. According to some embodiments, docking station 408 also includes a cellular wireless interface.

According to some embodiments, the head unit 404 (sometimes referred to herein as "replacement module 404") actually contains all of the sensors, processors, user interfaces, the rechargeable battery, and so forth. Users can plug and unplug the unit 404 in and out of the docking station 408. Many different commercial and functional possibilities for provisioning, maintenance, and upgrade are possible. For example, after years of using any particular head unit 404, a user will be able to buy a new version of the head unit 404 and simply plug it into the docking station 408. There are also many different versions for the head unit 404, such as an extremely low-cost version that is nothing but a motion/occupancy detector and light switch, and then a progression of increasingly-capable version, up to and including extremely fancy head unit 404 with small OLED televisions and high-fidelity mini-speakers. Thus, it should be appreciated that the various versions of the head units 404 can all be interchangeable, with any of them working when placed into any docking station 408. This can advantageously encourage sharing and re-deployment of old head units 404—for example, when an important high-capability head unit 404 (for the kitchen or living room, for example) can replaced by a great new version of the head unit 404, then the old head unit 404 can be re-deployed in a bedroom or a basement, etc. When first plugged into a docking station 408, the head unit 404 can ask the user (by 2D LCD display, 2D/3D holographic projection, voice interaction, etc.) a few simple questions such as, "Where am I" and the user can select "bedroom" or "living room" and so forth. In other examples, the head unit 404 can provide instructions, such as "Press button once if I am in the kitchen, press twice if I am in the den, etc."

According to some embodiments, the head unit 404 contains a main processor 412, storage 416, display and user interface 424, audio speaker 436, microphone 444, power converter 440, GPS receiver 450, RFID locater 454, and general physical module receiver 458. The head unit 404 further contains wireless and wired networking 462. In view of the ample power availability, a variety of communications capabilities can be provided, including Wi-Fi, ZigBee, 3G/4G wireless, CAT6 wired Ethernet, and even optical fiber from the curb. Furthermore, because the wall switch 108 can be connected to the home 120V system, a Home-Plug or other powerline-communications capability can be provided.

Also included are sensors 428 such as temperature, humidity, occupancy, ambient light, fire, smoke, carbon monoxide, active proximity, passive infrared motion, ultrasound, CCD/video camera, etc. A rechargeable battery 432 is also included (or equivalently capable onboard power storage medium). For example, the battery 432 can be rechargeable Lithium-Ion battery. In operation, the wall switch 108 charges the battery 432 during time intervals in which the hardware power usage is less than what power stealing can safely provide, and that will discharge to provide the needed extra electrical power during time intervals in which the hardware power usage is greater than what power stealing can safely provide.

The user interface 424 can include one or more visual displays (TFT, OLED, etc.), touchscreen and/or button input capabilities, the audio speaker 436, and so forth. According to the embodiment illustrated in FIG. 4B, the module head unit 404 of smart wall switch 108 has a click-and-rotate annular ring input 460. According to this embodiment, the click-and-rotate annular ring input 460 of the wall switch 108 can be used as a dimming light switch. Further, the click-and-rotate annular ring input 460 can provide menu-driven interfaces for user governance of all its various capabilities. As illustrated in FIG. 4C, an optional 2D image and/or 3D holographic image projector 470, can also be provided so that the effective dimension of the display is not just limited to the physical size of the wall light switch. For example, in smart-home environments 100 that also include smart doorbells 106, the combination of the smart wall switches 108 and the smart doorbells 106 can bring about new features. For example, if a visitor approaches the front door or rings the doorbell 106, the camera in the doorbell 106 can transmit their image to the smart wall switches 108, which can instantly show the image on the dial of the light switch, or project the image in 2D or 3D (holographic) form. Further, for example, the image of the arriving visitor at the front door can be projected only from the smart wall switches 108 of those rooms where occupancy is sensed.

According to one embodiment that is particularly appealing for a lighting control functionality of the described the wall switches 108, which are temporarily simply termed 'light switches' for this lighting-control-related embodiment. The light switches in the home, such as the smart-home environment 100, are configured such that at least one of them can be used to control (a) all of the light switches in the home, (b) a single selectable one of the other light switches in the home, and/or (c) one or more selectable groups or sub-groups of the other light switches in the home. This can be particularly convenient, for example, for a light switch that is near the front door (or other entryway commonly used for ingress and egress) of the home. For such exemplary scenario, an occupant who is the last person to leave the home can simply turn off all lights at once by controlling the single light switch nearest the door. Similarly, a returning occupant can turn on a particular subset of lights (for example, the lights corresponding to a pathway from the front door to the kitchen) all at once by controlling that single light switch. As another advantageous example, a light switch that is in an upstairs master bedroom of the home can be used by the parents to control (a) the lights in all downstairs rooms in the home, (b) the lights leading between the master bedroom and the kitchen, and/or (c) the lights in each of the children's bedrooms.

The above-described provision for mutually controllable or selectively mutually controllable light switches can be extended in other embodiments to similar mutual or selectively mutual control of any population of smart-home controllers that are so amenable. Examples can include mutual or selectively mutual control of irrigation controllers, door opening/closing actuating controllers, entertainment device controllers, computing device controllers, portable plug-in heater controllers, window opening/closing controllers, and so on.

In some embodiments a network-connected smart keypad is provided in the smart home environment 100. According to embodiments, an important underlying functionality of the smart keypad is to control the functionality of security features of the smart-home environment 100. It should be appreciated that the smart keypad is enhanced with a variety of multi-sensing capabilities that, while indeed enhancing home safety and security in many ways, can provide additional functionalities relating to controlling the other smart devices in the home, HVAC control, home energy conservation, intra-home communications, entertainment, etc.

According to embodiments, smart keypad includes powering circuitry, including a rechargeable battery, for extracting power as needed from the 120V "hot" line voltage wire. The rechargeable battery can either be used as a conventional back-up source or as a reservoir to supply excess DC power if needed for short periods.

According to some embodiments, like other smart home devices described here, the smart keypad is split into two parts: a head unit and a backplate. This bifurcation can increase the success and commercial longevity of the smart keypads by making them a modular platform consisting of two basic components. According to some embodiments, the backplate is a permanent interface box (sometimes referred to herein as "docking station") that serves as a physical connection into the wall and to the 120V line voltage wires or other wiring of the smart-home environment 100, and that contains AC-to-DC powering circuitry. When installed, the docking station may resemble a conventional one-gang or two-gang wall box, except no dangerous high-voltage wires are exposed to the user. According to some embodiments, docking station also includes a cellular wireless interface.

According to some embodiments, the head unit (sometimes referred to herein as "replacement module") actually contains all of the sensors, processors, user interfaces, the rechargeable battery, and so forth. Users can plug in and unplug the unit in and out of the docking station. Many different commercial and functional possibilities for provisioning, maintenance, and upgrade are possible. For example, after years of using any particular head unit, a user will be able to buy a new version of the head unit and simply plug it into the docking station. There are also many different versions for the head unit, such as an extremely low-cost version that is nothing but a user interface, and then a progression of increasingly-capable version, up to and including extremely fancy head unit with small OLED televisions and high-fidelity mini-speakers. Thus, it should be appreciated that the various versions of the head units of the smart keypads and other smart devices can all be interchangeable, with any of them working when placed into any docking station. This can advantageously encourage sharing and re-deployment of old head units—for example, when an important high-capability head unit (for the kitchen or living room, for example) can replaced by a great new version of the head unit, then the old head unit can be re-deployed in a bedroom or a basement, etc. When first plugged into a docking station, the head unit can ask the user (by 2D LCD display, 2D/3D holographic projection, voice interaction, etc.) a few simple questions such as, "Where am I" and the user can select "bedroom" or "living room" and so forth. In other examples, the head unit can provide instructions, such as "Press button once if I am in the kitchen, press twice if I am in the den, etc."

According to some embodiments, the smart keypad contains a main processor, storage, display and user interface, audio speaker, microphone, power converter, GPS receiver, RFID locater, and general physical module receiver. The smart keypad further contains wireless and wired networking. In view of the ample power availability, a variety of communications capabilities can be provided, including Wi-Fi, ZigBee, 3G/4G wireless, CAT6 wired Ethernet, and even optical fiber from the curb. Furthermore, because the smart keypad can be connected to the home 120V system, a HomePlug or other powerline-communications capability can be provided. Accordingly, the smart keypad can be connected to and communicate with the other smart home devices of the smart-home environment 100 and to the central server or cloud-computing system 164.

The smart keypad can include any of the components (e.g., temperature sensor, humidity sensor, occupancy sensor, ambient light sensor, communication equipment, processors, memory, etc.) that are included in any of the other smart home devices (e.g., smart doorbells 106, smart thermostats 102, smart wall switches 108, smart wall plugs 110, etc.) described herein. In some embodiments, the smart keypad is hardwired with a battery backup. In some embodiments, the smart keypad is incorporated into the wall switch 108, whereas in other embodiments the smart keypad can be its own device.

The smart keypad also includes sensors such as temperature, humidity, occupancy, ambient light, fire, smoke, carbon monoxide, active proximity, passive infrared motion, ultrasound, CCD/video camera, etc. As mentioned above, a rechargeable battery is also included (or equivalently capable onboard power storage medium). For example, the battery can be rechargeable Lithium-Ion battery. In operation, the smart keypad charges the battery during time intervals in which the hardware power usage is less than what power stealing can safely provide, and that will discharge to provide the needed extra electrical power during time intervals in which the hardware power usage is greater than what power stealing can safely provide.

The user interface of the smart keypad can include one or more visual displays (TFT, OLED, etc.), touchscreen and/or button input capabilities, the audio speaker, and so forth. According to embodiments, an optional 2D image and/or 3D holographic image projector, can also be provided so that the effective dimension of the display is not just limited to the physical size of the smart keypad. The user interface can be user customized by the home occupants.

The smart keypad can be secured by a user-determined passcode. In some embodiments, the passcode can be a PIN comprising any number and combination of letters and/or numbers. In other embodiments, the passcode can be a phrase. In yet other embodiments, the passcode can be a gesture, which the smart keypad senses using ultrasonic sensors, PIR sensors, etc. In still other embodiments, the passcode is in the form of a unique connect-the-dot pattern, where the user interface displays a plurality of dots (e.g., a grid of dots) and the user moves his or her finger from dot to dot in a unique pattern. Any one of these forms of the passcode, including the gesture and the connect-the-dots pattern, can provide users with a quick and easy way to arm and disarm the alarm system of the home. For example when leaving the home, the user can walk up to the smart keypad and make the unique gesture or input the connect-the-dots pattern to arm the alarm. According to some embodiments, the smart keypad manages a user list, which includes a list of users and corresponding times they can control the keypad to arm/disarm the security system and to control other functions of the smart home. In some cases, the various users may identify themselves to the smart keypad using unique identification numbers and access codes, including the passcodes described above. Further, in some cases, the smart keypad may be capable of recognizing a user based on the user's "digital fingerprint", such as by wirelessly identifying the user's mobile electronic device 166.

According to embodiments, the smart keypad includes a "light your path" feature, whereby the smart keypad activates a light when it senses that a user is approaching in darkness or near darkness. For example, in the event the user approaches the smart keypad in the middle of the night, the smart keypad may activate nearby lights in the home or a light incorporated in the smart keypad itself (e.g., LED) to provide a lighted pathway for the user. In one example, the smart keypad is incorporated in a wall light switch, and the smart keypad activates the light associated with the wall switch when a user is approaching the smart keypad. In some examples, upon detecting an approaching user when the security system is armed, the smart keypad or other devices of the home or the server 164 can send notification to the occupants' mobile devices or other electronic devices. Also, for example, the smart keypad can send a notification message to the occupants' mobile devices any time the alarm system is armed or disarmed by a user.

According to embodiments, the smart keypad is "smash and bash" resistant. For example, in the event the home's alarm system is armed and the smart keypad is smash (e.g., by an intruder attempting to disarm the alarm by bashing the keypad), the alarm remains armed. In some cases, upon being smashed, the smart keypad triggers the alarm and executes pre-configured actions, such as notifying police and/or other emergency personnel.

According to embodiments, the smart keypad or other devices in the home are capable of assigning user-defined gestures to actions or sets of actions. For example, the user may program the smart keypad with a "panic gesture" that causes the smart keypad, other devices in the smart home, or the server 164 to notify authorities, such as by calling or otherwise notifying medical, police, etc. Such a panic gesture may be, for example, the user quickly waving his or her hands in the air. The user may also program the smart keypad or other devices in the home with an audible panic command. For example, when the user yells "help", then medical, police, etc. may be called or otherwise notified. In other examples, the smart keypad can include a panic button that the user can press to call the police, medical, etc.

According to embodiments, the smart keypad or any of the other smart-home devices have the ability to display customer messages, such as via a display on the device itself or by projection. For example, in the event a child is sleeping, the smart doorbell 106 may display, "Baby is sleeping. Do not ring." In other embodiments, the smart keypads and other devices are capable of projecting or displaying messages. For example, when a person is at the front door, the keypads may project a message, such as "Someone's at the door". This would be good for situations where the users have deactivated, or the smart home has automatically deactivated, the doorbell and/or other audible notifications because some or all of the occupants are sleeping. These messages would also be useful for hearing impaired occupants. The smart keypads and other devices could also project or display warning messages, such as "Evacuate" due to possible intruder, fire, CO, etc. The message could be projected in large font on walls, floors, ceilings, etc. And the message could provide additional information. For example, the message could be "Intruder detected in den", "Fire detected in kitchen", etc.

According to embodiments, the smart keypad and the other smart devices are used as platform for running home applications. For example, the smart keypad has the capability of downloading and/or executing applications that enable users to control their smart homes. For example, the user could install a "thermostat" app that can be accessed and controlled from any of the smart devices in the home, including the smart keypads, to control the home's HVAC. The user could also install a "security" app, for example. It should be appreciated that the number and type of apps that could be download and installed are endless.

Figure 5:
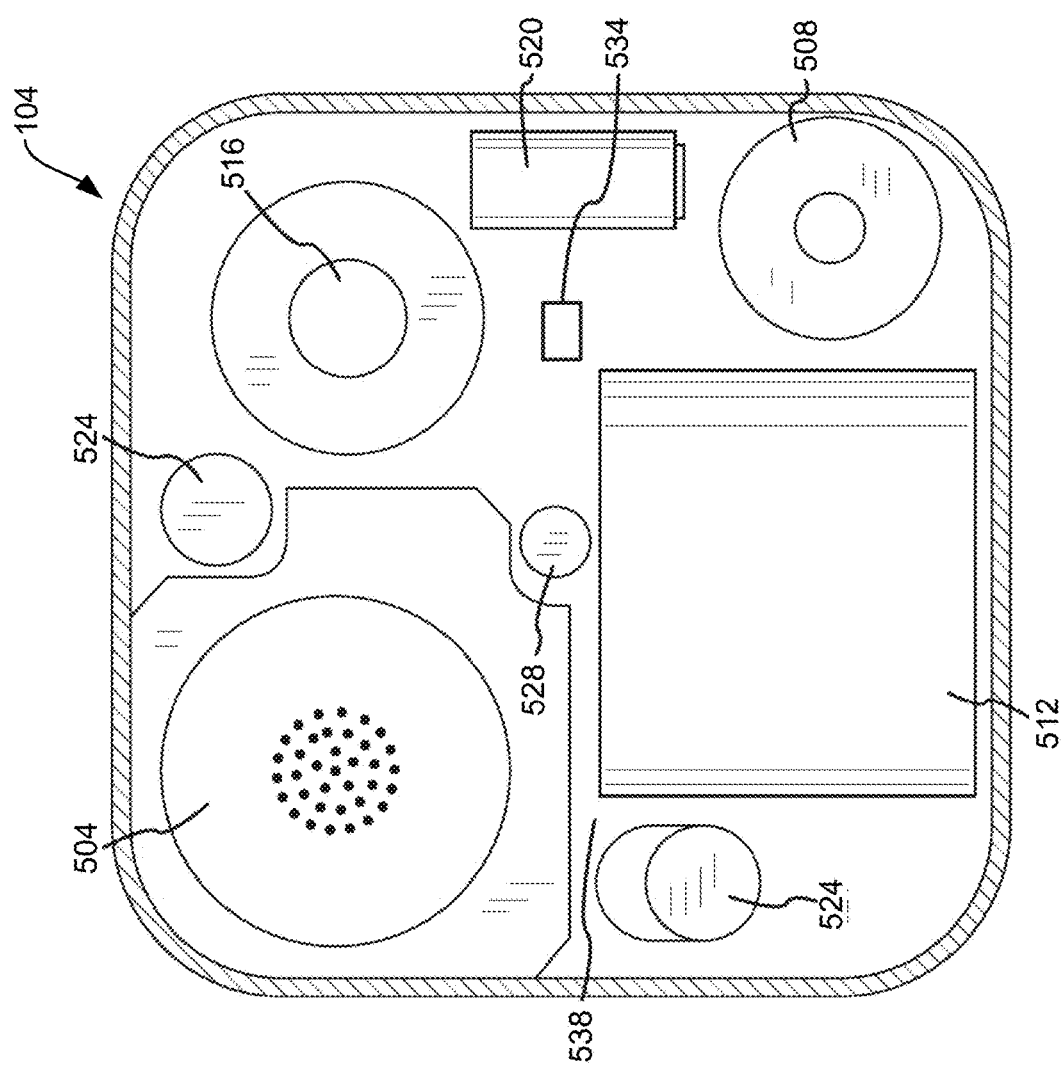
FIG. 5 is a simplified block diagram illustrating components of an intelligent, multi-sensing, network-connected hazard detector, according to an embodiment.

Turning now to FIG. 5, an illustration is provided of an exemplary embodiment of the smart hazard detector 104. According to embodiments, an important underlying functionality of each smart hazard detector 104 is for smoke detection, fire detection, and carbon monoxide detection (more generally, "hazard detection") and associated audible alarming, via a speaker 504 and a buzzer 508. However, it should be appreciated that the smart hazard detector 104 is further enhanced with network-connectedness and a variety of multi-sensing capabilities that, while indeed enhancing home safety and security in many ways, can provide additional functionalities relating to HVAC control, home energy conservation, intra-home communications, and entertainment. In some embodiments, the smart hazard detector 104 complies with the standards as required by Underwriter Laboratories (UL) for detecting smoke, heat, and carbon monoxide. For example, the smart hazard detector meets the alarm response time requirements of UL standard 2034, which are as follows: at 70 PPM, the detector 104 must alarm within 60-240 minutes; at 150 PPM, the detector 104 must alarm within 10-50 minutes; and at 400 PPM, the detector 104 must alarm within 4 to 15 minutes.

According to embodiments, the smart hazard detector 104 is a retrofit designed to replace older hazard detectors. Although not shown in the figures, the smart hazard detector 104 may comprise two primary components: a head unit 404 and a backplate or docking station 408. The head unit comprises the sensors, battery, processor, storage, and other components, while the docking station serves as a physical connection into the wall and, if applicable, to the 120V line voltage wires or other wiring of the smart-home environment 100. When installed, the docking station may resemble a conventional backplate for a tradition hazard detector. Users can plug and unplug the head unit in and out of the docking station. Thus, many different commercial and functional possibilities for provisioning, maintenance, and upgrade are possible. For example, after years of using any particular head unit, a user will be able to buy a new version of the head unit and simply plug it into the docking station. There are also many different versions for the head unit 404, such as an extremely low-cost version that is nothing but a smoke detector, and then a progression of increasingly-capable version, up to and including extremely fancy head units. Thus, it should be appreciated that the various versions of the head units can all be interchangeable, with any of them working when placed into any docking station. This can advantageously encourage sharing and re-deployment of old head units—for example, when an important high-capability head unit (for detecting hazards in the kitchen, for example) can replaced by a newer version, then the old head unit can be re-deployed in a bedroom or a basement, etc. When first plugged into a docking station, the head unit can ask the user (by 2D LCD display, 2D/3D holographic projection, voice interaction, etc.) a few simple questions such as, "Where am I" and the user can select "bedroom" or "living room" and so forth.

There can be substantial overlap between the smart hazard detector 104 and the wall switch 108, as well as the other devices of the smart-home environment 100 with respect to processing, sensing, user interface, and communications capabilities. The smart hazard detector 104 may be a low-power consuming device that is powered by battery 512 and that includes a low-power communication chip (such as a ZigBee chip) and may participate as a low-power node in the mesh network of the smart-home environment 100 by generating and transmitting messages, relay messages from other devices, as well as by "listen" and sometime making a corresponding response. However, it should be appreciated that instead of or in addition to being battery powered, the smart hazard detector 104 may be powered by AC voltage from the home. In some embodiments, the smart hazard detector 104 includes a WiFi chipset that enable it to communicate its status to other devices in the smart-home environment 100, to user mobile devices 166, to the central server or cloud-computing system 164, as well as to external managed security services. It should be appreciated that smart hazard detector 104 is microprocessor driven and that the WiFi chip may contain extra processing capacity for controlling all or some operations of the smart hazard detector 104. In some embodiments, a separate processor is provided.

According to the illustrated embodiment, the smart hazard detector 104 includes a smoke detector 516, which comprising a smoke photodiode, a detector, and a smoke chamber. The smoke photodiode may be, for example, an IR LED. Alternatively, instead of IR, a visible light LED or a laser may be provided. In some embodiments, the detector may be a photon silicon photomultiplier chip. The smoke photodiode and the detector may be programmed to execute a duty cycle every ten seconds, or so. For example, every ten seconds the photodiode and the detector will do an X-axes microsecond smoke test. The photodiode and the detector also execute self-calibration tests at predetermined intervals.

Further, the smart hazard detector 104 includes a carbon monoxide sensor 520, which can be either an electrochemical sensor or a metal oxide semiconductor. Additionally, the smart hazard detector 104 may include a temperature sensor, a humidity sensor for reducing false alarms associated with showering and cooking, and an ambient light sensor, such as a single pixel that measures the brightness of the room.

The smart hazard detector 104 may be provided with occupancy detecting capabilities. According to an embodiment, one or more ultrasonic sensors 524 are provided for motion detecting. However, it should be appreciated that in addition to or instead of the ultrasonic sensors 524, one or more passive IR sensors 528 are provided for occupancy sensing. Having multiple ultrasonic sensor 524 and/or passive IR sensors 528 enhance the occupancy sensing capabilities of the detector. Because they are typical mounted in unobstructed locations, high on walls of often-occupied rooms, smart hazard detectors 104 are particularly well suited for occupancy detection, such as by the use of RFID, ultrasonic sensors, etc. The smart hazard detector 104 may also include a thermopile 534 for flame-heat detection. As it is well known in the art, the thermopile or thermo-camera 534 is a group of thermo couples that take infrared light and correlate that to flame heat. In some instances, this is advantageous because the thermo-camera looks into the room and gives advanced warning of heat. Thus, the thermo-camera 534 is able to "see" heat before the heat actually makes its way to the smart hazard detector 104.

In some embodiments, the smart hazard detector 104 is equipped with one or more air quality sensors 538. For example, the air quality sensors 538 may "sniff" for volatile organic compounds (VOCs) that may present in the house. Thus, the smart hazard detector 104 can warn users when there are toxins in the user's home, such as when the user is burning a paraffin wax candle. Paraffin is a by-product of petroleum has been shown to release an alarming range of (VOCs), such as such as toluene and benzene. Also, for example, the air quality sensors 538 can "sniff" for gas leaks in the house, such as by detecting methane, which is commonly added to natural gas so as to make natural gas detectable. This "sniffing" capability is not only good for houses, but also for schools and hospitals. Individual will find peace of mind knowing such detection is in widespread use. Further, as houses get more and more sealed, air quality detection will grow in importance. Further, the air quality sensors 538 can measure levels of particulate, dust, pollen, mold, etc. detection.

In addition to measuring air quality and detecting harmful VOCs, the smart hazard detector 104 is capable of transmitting this information to the other devices in the home as well as the central server or cloud-computing system 164. For example, in some embodiments, when there are elevate levels of patent harmful gases, particulate, dust, pollen, mold, etc. in the home, the smart hazard detector 104 can transmit this information to the central server or cloud-computing system 164, which communicates with other nodes in the home and just outside of the home, such as the smart doorbell 106, and assess whether the inside air or the outside air is purer. If the outside air is purer, then the central server or cloud-computing system 164 instructs the smart thermostat 102 to open a vent to permit fresh air into the home, otherwise it instructs the thermostat 102 to recirculate air in the home and to not draw in outside air. Furthermore, the central server or cloud-computing system 164, upon receiving the air quality information from the hazard device 104, can send detailed information about the air quality to the mobile device 166 of user. For example, the air quality information may identify the specific types of toxins, particulate, dust, pollen, mold, etc. in the air. This can help the user identify which pollen, etc. the user is allergic to. Further, the central server or cloud-computing system 164 can use the air quality information to provide the user with medication recommendations (e.g., be sure to take you allergy pills today). Furthermore, the central server or cloud-computing system 164 can aggregate data received from multiple home in various geographic locations and provide, for example, smog alerts, pollen warnings, etc.

According to some embodiments, the smart hazard detector 104 may include a carbon dioxide ($CO_2$) sensor for fire detection, where detector includes a passive IR detector from lead selenide. Fire produces CO, $CO_2$, and infrared light. The intensity of the infrared light emitted by the flame is pretty constant, until it passes through the layer of $CO_2$ produced by the fire. However, the frequency of light having a wavelength of $4.26\mu$ excites $CO_2$ molecules when the light contacts the $CO_2$. In response, the $CO_2$ absorbs the infrared light having a wavelength of $4.26\mu$, thereby decreasing the intensity of the light at this wavelength. Thus, to detect fire, a narrow optical bandpass filter is placed in front of the lead selenide IR detector to permit only light having a wavelength $4.26\mu$ to pass through to the lead selenide IR detector. In the event of fire, the lead selenide detects the decrease in intensity of light at a wavelength of $4.26\mu$ and triggers the fire alarm.

According to embodiments, technologies including the sensors of the smart hazard detector 104 in combination with rules-based inference engines or artificial intelligence provided at a central server such as 164 are used to warn occupants of dangerous conditions in the home. For example, an inference can be made that an occupant is burning a candle based of the qualities (e.g., intensity, wavelength, frequency, etc.) of the light and/or the toxins begin released into the air. Further, an inference can be made that the occupant in the room has fallen asleep when the occupant is in the room and has not moved for a predetermined period of time. In situations where a candle is burning and the occupant has fallen asleep, the smart hazard detector 104 in that room will sound an alarm to wake up the occupant. In other example, the smart hazard detector 104 can sound an alarm or send an alert text or email message when it detects dangerous conditions in unoccupied rooms, such as when the stove is left on in the kitchen.

In the event a fire does occur in the home, technologies including the sensors of the hazard detectors 104 in combination with rules-based inference engines or artificial intelligence provided at a central server such as 164 are used to determine the cause. For example, the smart hazard detector 104 can detect that the fire started in the kitchen, and the smart hazard detector 104 can detect an active stove, candle, etc. was left unattended in the kitchen just before the fire started. Additionally, a central server such as 164 can aggregate data from multiple homes that experienced a fire, analyze the data to find patterns and reconstruct what caused the fires, and share this information with fire departments.

In some embodiments, the smart hazard detector 104 is mounted in a location that is out-of-reach of the occupants, such as high on a wall or on a ceiling. Thus, in the event of a false alarm, the occupants cannot reach the smart hazard detector 104 to press a button that deactivates the alarm. Accordingly, embodiments of the smart hazard detector 104 allow for occupants to deactivate the alarm using "silence gestures". For example, the smart hazard detector 104 detects a particular "silence gesture" from one of the occupants and, in response, deactivates the alarm.

According to embodiments, the one or more ultrasonic sensors 524 of the smart hazard detector 104 are used to detect the "silence gesture" of the occupant. In some embodiments, each of the ultrasonic sensors 524 may contain multiple piezos so as to make the sensor "omnidirectional" and to make it easier to detect when an occupant is making a silence gesture. Using ultrasonic sensors 524 in battery-powered versions of the smart hazard detector 104 is particularly advantageous because ultrasonic sensors 524 consumer very little power. The ultrasonic sensors 524 work by sending out pulses and then calculating the time interval between sending the pulse and receiving the echo to determine the distance to an object. In some embodiments, a single piezo of the ultrasonic sensor sends the pulse and receives the echo. In other embodiments, separate piezos send pulses and receive echoes.

During normal operation, the ultrasonic sensors 524 of the smart hazard detector 104 are merely performing occupancy sensing functions. For example, they are determining whether the room is occupied. When performing this function, the ultrasonic sensors 524 have a ping rate of about one hertz. This low ping rate is designed to preserve battery power, while still effectively perform occupancy detection. However, when one of the other sensors, such as the smoke, fire, or carbon monoxide sensors, activates the alarm, the smart hazard detector 104 increases the ping rate, such as up to twenty hertz. The increased ping rate better enables detection of "silence gestures", which are only made when the alarm is activated. When detecting a "silence gesture", the ultrasonic sensors 524 are "looking for" an object, such as a human hand, to remain within in a predefined distance from the smart hazard detector 104 for a specified period.

Figure 6:
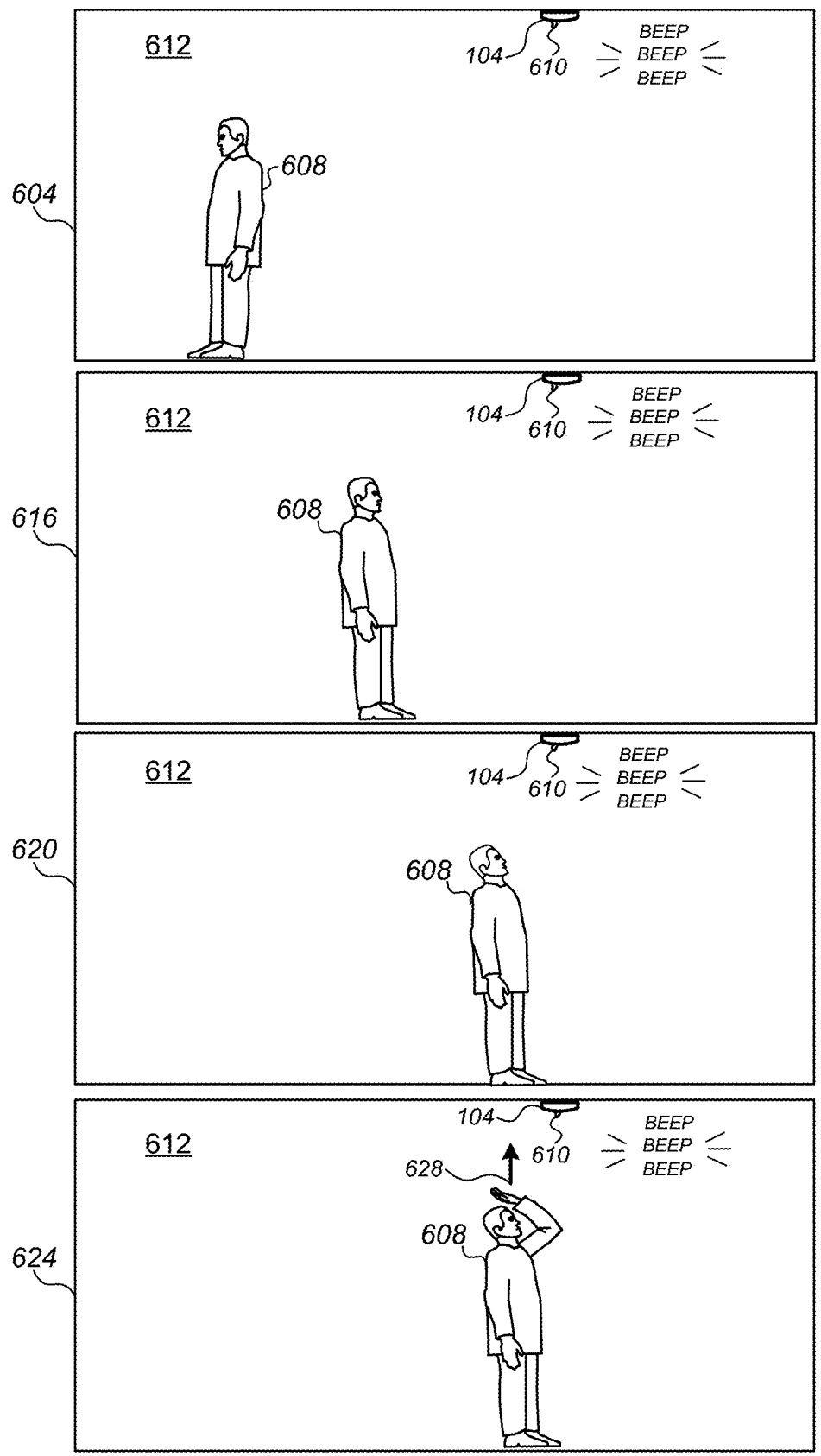
FIGS. 6-7 are schematic diagrams illustrating a silence gesture for remotely deactivating an alarm, according to an embodiment.

An example "silence gesture" will be described with references to FIGS. 6 and 7. As shown in FIG. 6 at block 604, an occupant is standing in room 612 while an alarm in hazard detector 104 is active and making a "BEEP" sound. A light 610, such as an LED, is provided on an outer portion of the smart hazard detector 104, such that the occupant 608 can see the light 610 when it is turned on. The operation of the light 610 will be described with reference to FIG. 7. Suffice to say for FIG. 6, the light is turned off in blocks 604 through 624. As shown at block 616, the occupant 608 has walked to a position closer to the smart hazard detector 104, which is mounted out of reach on the ceiling of the room. As shown at block 620, the occupant 608 walked to a position even closer to the smart hazard detector 104, such that the occupant 608 is almost directly under the smart hazard detector 104. As shown at arrow 628 of block 624, the occupant 608, while standing almost directly under the smart hazard detector 104, is beginning to extend an arm upward, toward the smart hazard detector 104.

Figure 7:
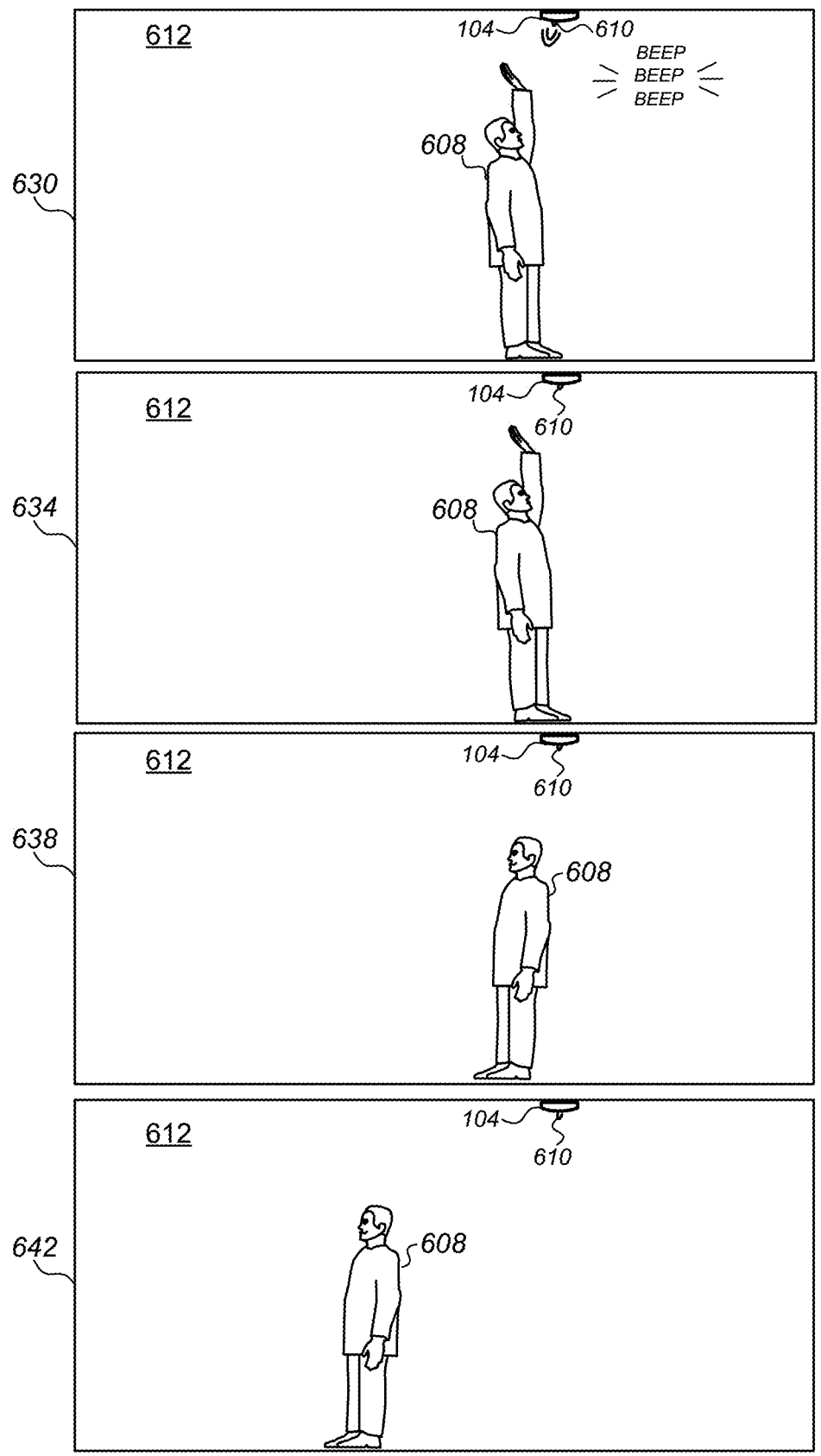

Referring now to block 630 of FIG. 7, the arm of the occupant 608 is extended upward, toward the smart hazard detector 104, while the occupant is standing almost directly under the smart hazard detector 104. After an alarm sounds and the pulse rate increases, the ultrasonic sensor the smart hazard detector 104 "looks" for a trigger to the "silence gesture" period, which is the amount of time the "silence gesture" must be maintained to deactivate the alarm. According to some embodiments, the trigger is a distance change from a baseline, and to deactivate the alarm the distance change must be maintain for the entire "silence gesture" period (e.g., three seconds). For example, if the baseline is a distance between the sensor and the floor of the room, then the sensor is looking for an object to come in between it and the floor, thereby changing the distance measured by the pulse. In some embodiments, the distance change must be significant enough to ensure that someone is close and likely intends to silence the alarm. For example, if the distance to the floor is ten feet, then the requisite distance change could be eight feet or eighty percent of the original distance. As such, the object would be required to be within two feet of the sensor to trigger the "silence gesture" period, and to deactivate the alarm the object must remain there for the duration of the period. The requisite distance change can be configured based on the height of the ceiling and based on the height of the occupants, among other things.

Referring still to block 630, the light 610 is turned on when the occupant 608 successfully triggers the "silence gesture" period, thereby signaling to the occupant 608 to remain in the position for the requisite period, such as three seconds. Here, the hand of the occupant 608 triggered the "silence gesture" period. A tolerance is built in such that if the occupant 608 slightly moves and loses but quickly regains the signal, the "silence gesture" period will continue without having to start over. As shown in block 634, the occupant kept the hand in within the requisite distance of the sensor for the duration of the "silence gesture" period and, thus the alarm has been deactivated, the "BEEP" has stopped, and the light 610 has turned off. As shown at blocks 638 and 642, the occupant 608 can walk away from the smart hazard detector 104 and resume normal activity.

It should be appreciated that, in the event the smart hazard detector 104 is of a design that receives reliable power from the wiring of the home (rather than being batter powered), a CCD chip could be used to detect the "silence gesture". However, such an arrangement is not suitable for battery-powered hazard detectors 104 because the CCD chips and associated processing consume a large amount of power and would quickly drain the battery. Other possible alternatives to ultrasonic sensors 524 include passive IR sensors, thermopile (e.g., thermo-cameras), laser-distance measuring, laser and a camera combination because camera looks for dot instead of time of arrival (dopler shift), and a full on camera and image processing system.

According to some embodiments, to enhance the reliability and effectiveness of the silence gesture, the ultrasonic sensor 524 could work in concert with one or more optical sensors to make the sensing even better. For example, when an occupant attempts to silence by placing a hand in field, the optical sensor will sense the presence of the occupant's hand, and thereby trigger the "silence gesture" period. The ultrasonic sensor 524 could also work in concert with the optical sensor after the "silence gesture" period has been triggered, where the ultrasonic sensor detects the occupant's changing hand distance, and the optical sensor detects the occupant's changing hand distance using proximity and heat techniques.

According to some embodiments, the ultrasonic sensor 524 could work in concert with the passive IR sensor. For example, when an occupant attempts to silence by placing a hand in field, the passive IR will sense this, and thereby trigger the "silence gesture" period. The ultrasonic sensor 524 could also work in concert with the thermopile (e.g., thermo-camera), where both distance change and heat are used to detect the silence gesture. For example, the thermo-camera detects when human hand is nearby and triggers the "silence gesture" period. Further, the ultrasonic sensor 524 could work in concert with the ambient light sensor. For example, when the places a hand in the field and blocks light, then the ambient light sensor know the occupant is nearby and thus triggers the "silence gesture" period.

It should be appreciated that, according to embodiments, similar "gesture" controls can be applied to other smart devices in the home, such as to the smart thermostat, the smart wall switches, etc. For example, there can be gestures for increasing or decreasing temperature controls, for turning on and off lights, HVAC, etc.

Figure 8A:
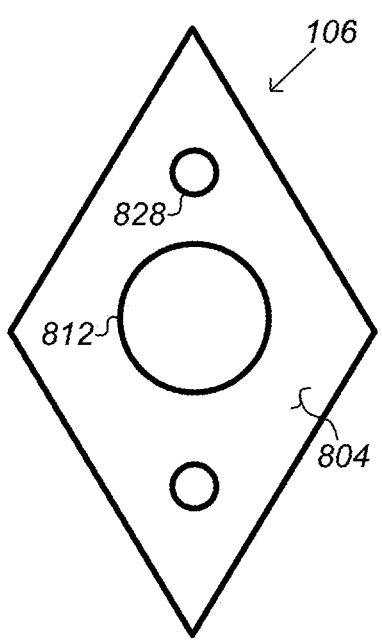
FIGS. 8A-B are simplified block diagrams illustrating components of an intelligent, multi-sensing, network-connected entryway interface device, according to an embodiment.

Turning now to FIG. 8, an illustration is provided of an exemplary embodiment of a smart doorbell 106. According to embodiments, an important underlying functionality of the smart doorbell 106 is to serve as a home entryway interface unit, providing a doorbell functionality (or other visitor arrival functionality), audio/visual visitor announcement functionality, and like functionalities. Like the smart hazard detector 104 described above with reference to FIGS. 5-7, the smart doorbell 106 is further enhanced with network-connectedness and a variety of multi-sensing capabilities to accommodate additional functionalities, and there can be substantial overlap/integration among the smart doorbell 106, the smart hazard detector 104, the smart wall switch 108, and the smart wall plug 110 that leverages their combined processing, sensing, and communications capabilities, as well as their access to cloud-based control and intelligence.

In some embodiments, the smart doorbell 106 is connected to the wiring of the smart-home environment 100. For example, as is common in many homes, a 24V low voltage wire is provided at the outer entry points of the home, such as at the front, back, and side doors. The smart doorbell 106 can be connected to this 24V low voltage wire to obtain steady and reliable power. However, it should be appreciated that the smart doorbell could include a battery for the purpose of replacing or supplementing power obtained from the home wiring. In some embodiments, the battery could be a rechargeable battery, such as a rechargeable Lithium-Ion battery, for extracting power as needed from the house wiring (e.g., 24V low voltage wire). For example, the smart doorbell 106 could charge the battery during time intervals in which the doorbell's power usage is less than what the 24V low voltage wire can safely provide, and that will discharge to provide the needed extra electrical power during time intervals in which the hardware power usage is greater than what the 24V low voltage wire can safely provide. Thus, the rechargeable battery could be used as a conventional back-up source or as a reservoir to supply excess DC power if needed for short periods.

Figure 8B:
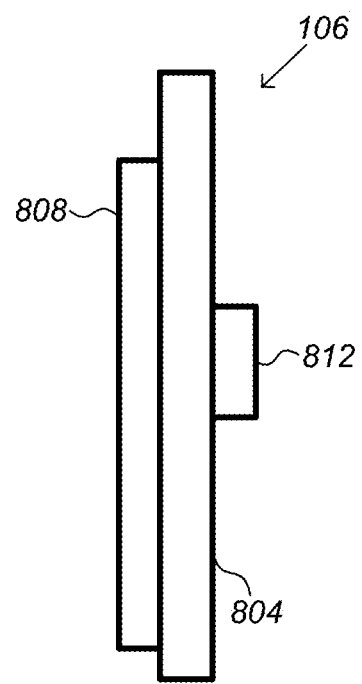

As illustrated in FIG. 8B, according to some embodiments, the smart doorbell 106 includes two parts: a head unit 804 and a backplate 808, which is also referred to as a docking station 808. This bifurcation can increase the success and commercial longevity of the wall switches 108 by making them a modular platform consisting of two basic components. As with the wall switches 108 and the hazard detectors 104, this bifurcation can increase the success and commercial longevity of the smart doorbells 106 by making them a modular platform. The docking station 808 is a permanent interface box that serves as a physical connection into area near the entry way, such as a doorframe or outer wall of the home, and to the voltage wires of the home. According to some embodiments, the head unit 804 (sometimes referred to herein as "replacement module 804") actually contains all of the sensors, processors, user interfaces, the rechargeable battery, and so forth. Users can plug and unplug the unit 804 in and out of the docking station 808. Many different commercial and functional possibilities for provisioning, maintenance, and upgrade are possible. For example, after years of using any particular head unit 804, a user will be able to buy a new version of the head unit 804 and simply plug it into the docking station 808. There are also many different versions for the head unit 804, such as an low-cost versions with few features, and then a progression of increasingly-capable versions, up to and including extremely fancy head units 804 with a large number of features. Thus, it should be appreciated that the various versions of the head units 804 can all be interchangeable, with any of them working when placed into any docking station 808. This can advantageously encourage sharing and re-deployment of old head units 804—for example, when an important high-capability head unit 804 (for the front door, for example) can replaced by a great new version of the head unit 804, then the old head unit 804 can be re-deployed to a back or basement door, etc. When first plugged into a docking station 808, the head unit 804 can ask the user (by 2D LCD display, 2D/3D holographic projection, voice interaction, etc.) a few simple questions such as, "Where am I" and the user can select "front door" or "back door" and so forth.

Sensors devices such as temperature, humidity, occupancy, ambient light, fire, smoke, carbon monoxide, active proximity, passive infrared motion, ultrasound, CCD/video camera, bar code scanner, etc., as well as I/O devices such as speakers, user interfaces, 2D/3D projectors, etc. are provided in the head unit 804. The sensors and I/O devices are generally represented at 828.

According to embodiments, technologies including the sensors 828 in combination with rules-based inference engines or artificial intelligence provided at a central server such as 164 are used to detect when packages are delivered to the door of the smart-home environment 100, and to take a variety of automated actions in response. According to some embodiments, the sensors 828 can "see" the uniform of the delivery person approaching the door or the truck of the delivery person, or the sensors can "hear" the truck in combination with a person approaching the door within a period after hearing the truck. Once the person is with a predetermined distance from the door, the smart doorbell 106, using its speaker, asks the person is he or she is a delivery person, to which that person can reply with an audible response or by indicating as such on the user interface of the doorbell. If the person is making a delivery, the doorbell can instruct the person to place the package in a location proximate the doorbell 106 such that its scanner can scan the bar code or other type of identifying tag affixed to or associated with the package being delivered.

According to embodiments, a central server, such as server 164, can use the bar code to obtain information about the package, such as the sender, recipient, a description of the item therein, whether signature is required, etc. Based on this information the rules-based inferences engines or artificial intelligence can make inference regarding which action to take next. For example, if occupants or more particularly if the specified recipient or recipients are in the home and the package is from a sender or contains an item that is of particular interest to the one or more the occupants, an announcement can be made in the home, indicating the package is currently being dropped off and providing details about the package. On the other hand, the sender or item is not of particular interest to one of the occupants based on the occupants past responses to receiving such deliveries, then no announcement will be made and the occupants can discover the package in due course. Similarly, if no occupants are home but an inference is made that the package is of particular interest to one of the occupants, a text message, email, phone call, etc. can be made the one or more identified occupants, indicating that the package in being delivered.

According to embodiments, in the event signature is required for the package but none of the occupants are home an inference is made to not disturb the occupants, the smart doorbell can provide authorization to leave the package. For example, the doorbell 106 presents an authorization code (either in plain text, barcode, or encrypted forms) on its user interface and prompts the delivery person to use his or her handheld device to record, scan, photograph, or otherwise acquire the authorization code. Once the authorization code has been acquired by the delivery person, the doorbell 106 can then instruct the delivery person regarding where to leave the package, such as at the front door, around the back of the house in a discrete location, etc.

According to embodiments, technologies including the sensors 828, such as noise, motion, and/or facial recognition detection, in combination with rules-based inference engines or artificial intelligence provided at a central server, such as server 164, are used to detect when one or more unknown individuals are approaching the home. A number of learned inferences can be made in this situation. For example, during late evening hours, an alarm will be sounded in the house, giving notice of the approaching person and/or the doorbell 106 may audibly announce to the individual that he or she is being monitored by a home security system. Further, in the event the person attempts to enter a door, window, or other access point to the home, an message will be sent to local law enforcement. However, during day time hours when one or more occupants are at home, a learned inference can be made to take no action, such as when a meter reader, mail carrier, garbage collector, etc. is approaching the house as per a reasonably predictable and learned schedule.

According to embodiments, the smart doorbell 106 provides a context-based entry keypad. In some examples, the entry keypad can be projected, such as via a 2D/3D holographic projection. In other examples, the entry keypad can be rendered on a display such a 2D LCD display. Persons standing proximate to the smart doorbell 106 can enter a code into the keypad to obtain access to the smart-home environment 100. According to embodiments, the occupants of the home get context-based keypads and/or access code. For example, the parents get a more sophisticated keypad that provides a variety of controls, whereas children get a simple keypad into which they can enter their access code. Further, non-occupants get context-based keypad, too. For example, a deliver person gets one keypad, whereas uncategorized individuals get another keypad. According to some embodiments, the keypad can vary based on factors such as time of day, current news (e.g., any recent crime in the neighborhood?), proximity of security guards and other law enforcement personnel, and which, if any, occupants are currently at home. For example, if there is a nearby security guard, then the keypad requests a three-digit access code or no access code at all, rather than the usual ten-digit access code. In another example, if no one is home or if only children or elderly people are at home, then a ten-digit code is required. However, if the parents of the children or the adult children of the elderly are at home then no access code is required or only a three-digit code is required. If the approaching person is identified as a guest, then the keypad prompts the guest to entry the guest access code assigned to him or her. It should also be appreciated that individuals are prompted to input their access code as the leave the home, too. This way the codes of the guests, the occupants, and recognize categories of strangers (e.g., delivery person) can be used to track the goings and comings of those people. It should be appreciated that this keypad can be provided on any smart device in the home, such as the wall switch 108, the thermostat 102, hazard detector 104, and the wall plug 110.

According to embodiments, when the central server such as server 164, based on information received from the doorbell 106, such as noise and motion data, determines that the street adjacent to the home has a threshold level of traffic, the inferences are made regarding the safety of the children residing at the home. For example, an alarm can be triggered in the home in the event one or more of the children are detected by the occupancy sensing to be outside of the home. This alert enables the parents or other caretakers to quickly take actions to protect the child from the traffic. Further, for example, automatic adjustments are made to audio equipment in the home of account for the increased traffic noise, such as by increasing the volume a proportionate amount.

As discussed, the sensors 828 may include temperature and humidity sensors, the data from which may be used for a number of useful services. For example, the outside humidity and temperature data is consider by the thermostat 102 when controlling the HVAC to best accomplish the occupants' desired comfort preferences. Further, for example, this information may be presented to the occupants through a number of user interfaces, such as a user interface associated with another one of the devices located inside of the home, the television, mobile and other computing devices, or audibly. In some instances, a central server such as server 164 collects this information from a plurality of smart home across a plurality of geographic locations. This aggregated data may be sold to weather services or may be used to provide weather data to smart home occupants.

According to embodiments, the smart doorbell 106 includes a button 812 that, upon being touched, depressed, or otherwise activated, causes as audible notification to be broadcasted within the home or a message to be sent to user interfaces of devices within the home or to a mobile device associated with occupants of the home. Learned inferences can be made regarding the appropriate response to activation of the button 812. For example, the audible notification is only broadcast in occupied rooms, or rooms occupied by one or more occupants who have a relationship with the person at the door, or no alarm is sound in rooms where occupants, such as small children, are determined to be sleeping. Also, for example, the occupant-selected songs, such as uploaded MP3's, may be broadcasts in the home, where different songs may be broadcast for different occupants at home at the time or based on the identity of the person at the door. Further, for example, technologies and sensors at the smart doorbell 106 may identify the person based on facial recognition or based on other characteristics such as the manner in which the person approached the door. For example over time, based on input received from the smart doorbell 106 a central server can build up an address book of profile data about people who approach the door, such as some identifying biometric data. For example, the address book can be built over time using low-resolution data such as ultrasonic, passive IR, etc. to create a unique signature for individuals. This combined data from different domains and becomes almost like a fingerprint regarding how that person approaches the house. In some instances, when a "familiar" person approaches the door, the smart doorbell 116 "asks" the person if he is "John Doe", to which the person can verbally or physically respond. Upon obtaining this information John Doe's name or image can be announced or projected on device in the home and/or John Doe will be given certain access rights to the home, such as for example the door will automatically unlock as he approaches. Further, in addition to or instead of identification based on these unique "signatures", individuals may enable their mobile devices to communicate with the smart doorbell 116, such as via BLUETOOTH, NFC, or other wireless protocols. Also, for example, individual may "swipe" their smart phones in front of the smart doorbell's RFID scanner. Upon identifying the individual, the smart doorbell may give the individual certain access right to the home, such as by automatically unlocking the door.

Figure 9:
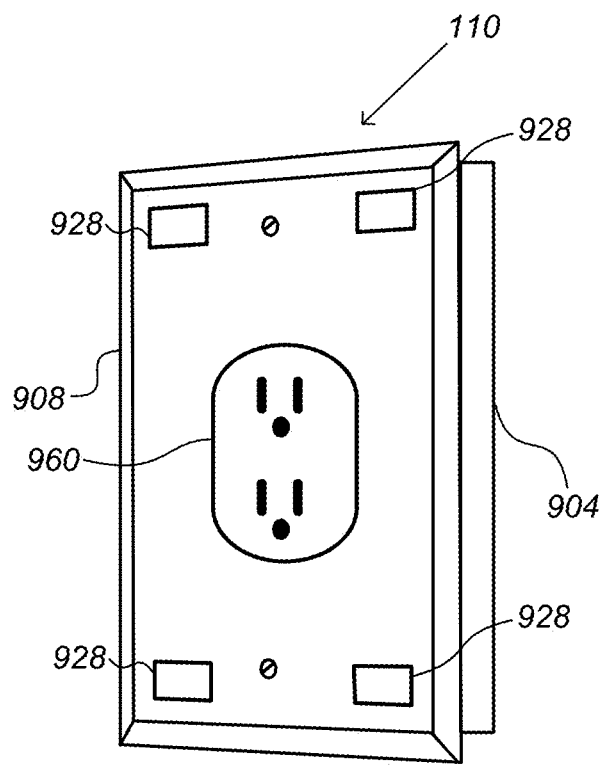
FIG. 9 is a schematic diagram illustrating an intelligent, multi-sensing, network-connected wall plug, according to an embodiment.

According to embodiments, technologies including the sensors 828 in combination with rules-based inference engines or artificial intelligence provided at a central server, such as server 164, also make learned Turning now to FIG. 9, an illustration is provided of an exemplary embodiment of a smart wall plug 110. According to embodiments, the smart wall plugs 110 enhance the smart-home environment 100 by providing a retrofit wall plug that, in addition to maintaining the basic character and purpose of a wall plug, incorporates a host of sensing and communication capabilities for enhancing occupant comfort, convenience, and safety. Much like the smart wall switches 108, by virtue of being mounting in place of traditional wall plugs, the smart wall plugs 110 have access to plentiful electrical operating power, such as by connecting to wiring (e.g., to 120V "hot" line voltage wires) that is located behind the walls 154 of the smart-home environment 100 and that is present at virtually all standard home wall plugs. This unlimited power budget, the numerous installation locations throughout the home, and the reasonably ample physical space in its housing to fit the necessary components, combine to enable the smart wall plugs 110 to accommodate a rich and wide variety of sensing and communications capabilities for the smart-home environment 100, as well as a general platform for the provision of even newer sensing and communications hardware as it becomes available. In addition to numerous installation locations inside the home, there are numerous outdoor locations outside of the home, too. For example, smart wall plugs may 110 may be mounted on the outside surface of external walls of the smart-home environment, and thereby may connect to the same wiring (e.g., to 120V "hot" line voltage wires) as do the indoor wall plugs.

A rich variety of new interactions are made possible between the smart wall plugs 110 and other devices of the smart-home environment 100. Occupancy, motion, or presence sensing, for example, can be enhanced by virtue of the numerous installation locations of wall plugs inside and outside of the home, albeit some of these locations are hidden behind furniture or in locations where people are unlikely to go. According to embodiments, the smart wall plugs 110 can include all or some of the components that are included in the wall switch 108, as illustrated in FIGS. 4A-C. For example, the smart wall plugs 110 can be comprised of two primary parts: a head unit 908 and a docking station 904, which is a permanent interface box that serves as a physical connection into the wall and to the 120V line voltage wires or other wiring of the smart-home environment 100. This bifurcation can increase the success and commercial longevity of the smart wall plugs 110 by making them a modular platform consisting of two basic components. According to embodiments, the head unit 908 contains the sensors, processors, the I/O devices and receptacles, and so forth. Users can upgrade and/or redistribute wall plug functionality throughout the home by plugging and unplugging head units of varying capabilities in and out of the docking stations in various locations throughout the home. For example, to enhance security of the smart-home environment 100, head units 908 having advanced motion sensing capabilities can be plugged into docking stations located in areas having clear lines of sight to entry points, such as doorways and windows. Further, these head units 908 can be plugged into docking stations location in areas having clear lines of sight in commonly occupied rooms, rather than behind furniture in or unused rooms. As discussed, these head units may be capable of wirelessly communicating detected motion and can therefore serve as a "tripwire" for the home security system, either inside the home or outside the home. For example, smart wall plugs 110 located outside the home, such as on external walls near windows and doors provide outdoor tripwires that alert the central server or cloud-computing system 164 to the presence of intruders before unwelcome entry into the home even occurs.

According to some embodiments, the head unit 908 includes a standard duplex receptacle 960 having upper and lower outlets, each having three slots. The head unit 908 further contains some or all of a main processor, storage, audio speaker, microphone, power converter, GPS receiver, RFID locater, etc. Additionally, the head unit 908 may include wireless and wired networking. In view of the ample power availability, a variety of communications capabilities can be provided, including Wi-Fi, ZigBee, 3G/4G wireless, CAT6 wired Ethernet, and even optical fiber from the curb. According to embodiments, the smart wall plugs 110 are spokesman nodes in the mesh network described above. For example, the smart wall plugs 110 regularly send out messages regarding what they are sensing and, in addition to sending out their own messages, the smart wall plugs 110 repeat messages from other smart devise in the mesh network, thereby causing the messages to travel from node to node (i.e., smart device to smart device) throughout the smart-home environment 100. As spokesman nodes in the smart-home environment 100, the smart wall plugs 110 are able to "drop down" to low-powered communication protocols to receive messages from low-power nodes, translate the messages to other communication protocols, and send the translated messages to other spokesman nodes and/or the central server or cloud-computing system 164. Thus, the smart-wall plugs 110 enable the low-powered nodes using low-power communication protocols to send messages across the entire smart-home environment 100 as well as over the Internet 162 to the central server or cloud-computing system 164. For example, battery operated smart hazard detectors 104 are able to preserve their limited power resource, yet also communicate with the enteral server or cloud-computing system 164 in real time or near real time by sending messages in low-power protocols to the wall plugs 110 which repeat the messages in high-power protocols, which are transmitted to the central server or cloud-computing system 164. According to embodiments, the mesh network enables the central server or cloud-computing system 164 regularly receive data from all of the smart devices in the home, make inferences based on the data, and send commands back to individual one of the smart devices to accomplish some of the smart-home objectives described herein.

Furthermore, because the smart wall plug 110 can be connected to the home 120V system, a HomePlug or other powerline-communications capability can be provided (See FIGS. 4A-C for example illustrations of such components being provided on a wall switch 108). It should also be appreciated that the smart wall plugs 110 may include sensors 928 such as temperature, humidity, occupancy, ambient light, fire, smoke, carbon monoxide, active proximity, passive infrared motion, ultrasound, CCD/video camera, an ambient light sensor, such as a photoresistor or a single-pixel sensor that measures light in the room, etc.

In some examples, the wall plug 110 may include or be associated with a light source having variable intensity and color, and can therefore function in a manner similar to the smart nightlight 170 described above. In some embodiments, the light source of the wall plug 110 is configured to activate when the ambient light sensor detects that the room is dark and/or when the occupancy sensor detects a person's presence or movement. The color and intensity of the light source can be adjusted based on information received from sensor of the wall plug 110 or from other smart devices in the smart-home environment. For example, in the event the central server or cloud-computing system 164 triggers an alarm indicating unauthorized intrusion (e.g., based on motion detection data received from smart devices in the home), the light source associated with the smart wall plugs 110 can be activated. In this example, the light sources associated with the wall plugs 110 can emit a high-intensity red-colored light to indicate that an emergency is occurring and to cause any intruder to leave the home.

According to embodiments, the smart wall plugs 110 wirelessly communicate with a central server such as server 164. Rules-based inference engines or artificial intelligence provided at a central server such as 164 make security-related decisions based on data received from the smart wall plugs 110. For example, decisions are made regarding use when to trigger an alarm, when to turn on lights, when to send a warning to the owner's mobile device or to the neighborhood network. Furthermore, the intelligence of the central process can be used for safety. For example, the central server can be programmed with safe operating parameters for each application in the smart home, and can shutoff power to the appropriate wall plug 110 when the corresponding application deviates from its safe operating parameters. Also for example, in the event data from an occupancy sensor on a particular wall plug 110 indicates that a small child is really close the wall plug, the central server may shut off power to that plug. Further, user can remotely control, such as by use of their mobile device, the outlets in the home. For example, a parent may want to shutoff power to all wall plugs 110 in their child's room, or that are outside of the home and there is some risk that a child may be attracted to the plug.

Figure 10A:
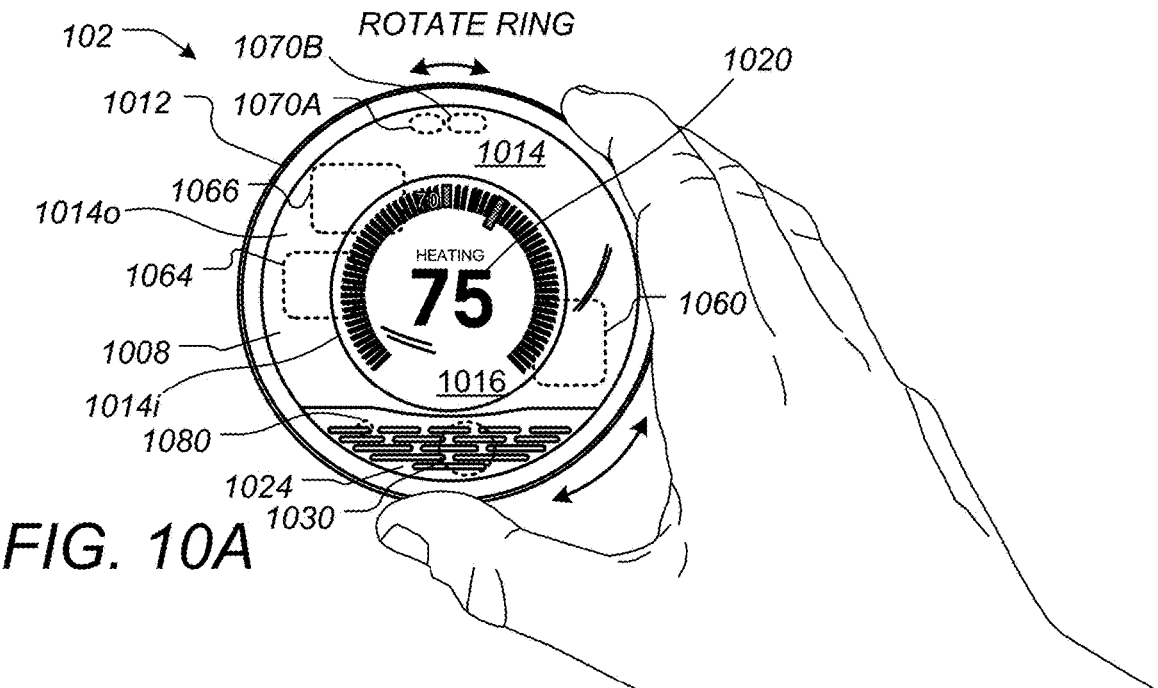
FIGS. 10A-C are schematic diagrams illustrating an intelligent, multi-sensing, network-connected thermostat, according to an embodiment.
Figure 10B:
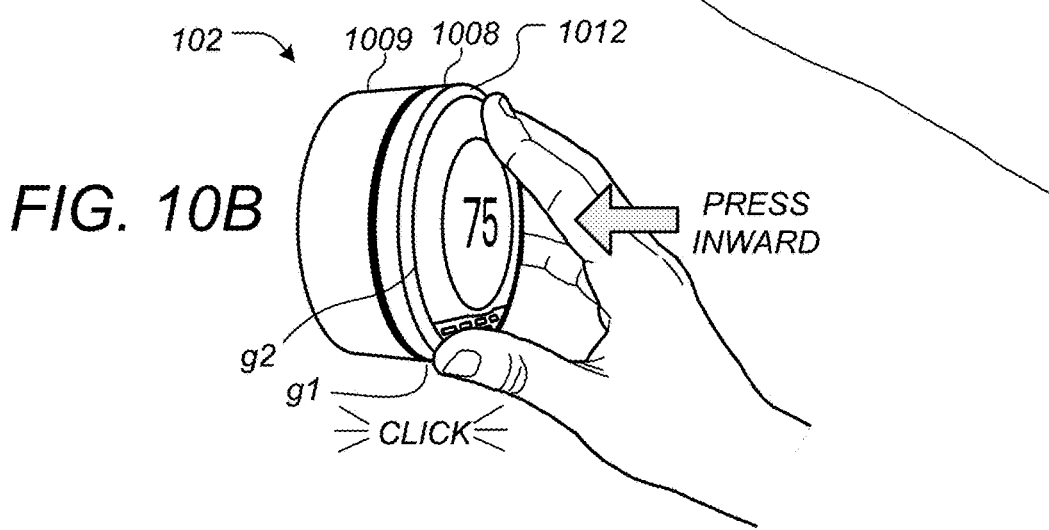

Turning now to FIGS. 10A-B, illustrations of a smart thermostat 102 are provided, according to some embodiments. Unlike many prior art thermostats, smart thermostat 102 preferably has a sleek, simple, uncluttered and elegant design that does not detract from home decoration, and indeed can serve as a visually pleasing centerpiece for the immediate location in which it is installed. Moreover, user interaction with smart thermostat 102 is facilitated and greatly enhanced over known conventional thermostats by the design of smart thermostat 102. The smart thermostat 102 includes control circuitry and is electrically connected to an HVAC system, such as is shown with unit 100 in FIGS. 1 and 2. Smart thermostat 102 is wall mounted, is circular in shape, and has an outer rotatable ring 1012 for receiving user input. Smart thermostat 102 is circular in shape in that it appears as a generally disk-like circular object when mounted on the wall. Smart thermostat 102 has a large front face lying inside the outer ring 1012. According to some embodiments, smart thermostat 102 is approximately 100 mm in diameter.

The outer rotatable ring 1012 allows the user to make adjustments, such as selecting a new target temperature. For example, by rotating the outer ring 1012 clockwise, the target temperature can be increased, and by rotating the outer ring 1012 counter-clockwise, the target temperature can be decreased. The smart thermostat 102 may be configured to receive a plurality of types of inputs by virtue of the rotatable ring 1012, such as a scrolling input and a selection input. For example, a rotation of the ring may allow a user to scroll through an array of selection options, and inwards pressure exerted on the ring (inward click) may allow a user to select one of the options (e.g., corresponding to a particular scroll position).

The outer rotatable ring 1012 may include a component that may be physically rotated, or, in other embodiments, a static component that may sense a user's virtual rotation of the ring. For some embodiments, the outer rotatable ring 1012 may include a touch pad configured to track arcuate motion of a user's finger on the touch pad. The touch pad may comprise, e.g., a ring-shaped or circular area. In some instances, the touch pad includes multiple portions (e.g., to detect arcuate motion in a first ring-shaped area and to detect tapping in a second inner circular area). Boundaries of a touch pad area may be identified to a user using, e.g., visual or tactile cues. For example, a ring-shaped touchpad area may be indented compared to neighboring areas on the smart thermostat 102, or the area may be a different color than neighboring areas.

For preferred embodiments such as those of FIG. 10A in which the outer ring 1012 is a continuous loop without fiducial markers, one or more advantages are brought about. Thus, a user may physically rotate the ring (in embodiments in which the ring is configured to be physically rotatable) regardless of a starting position of the ring. Further, a user may select, e.g., a value of a variable (e.g., select a particular menu, a particular setpoint temperature value, etc.) by rotating the ring multiple times. This feature may be particularly advantageous as the user does not need not to worry about precise rotations in order to select a desired option.

The front face of the smart thermostat 102 comprises a clear cover 1014 that according to some embodiments is polycarbonate, and a metallic portion 1024 preferably having a number of slots formed therein as shown. According to some embodiments, the surface of cover 1014 and metallic portion 1024 form a common outward arc or spherical shape gently arcing outward, and this gentle arcing shape is continued by the outer ring 1012.

Although being formed from a single lens-like piece of material such as polycarbonate, the cover 1014 has two different regions or portions including an outer portion 1014o and a central portion 1014i. According to some embodiments, the cover 1014 is painted or smoked around the outer portion 1014o, but leaves the central portion 1014i visibly clear so as to facilitate viewing of an electronic display 1016 disposed thereunderneath. According to some embodiments, the curved cover 1014 acts as a lens that tends to magnify the information being displayed in electronic display 1016 to users. According to some embodiments the central electronic display 1016 is a dot-matrix layout (individually addressable) such that arbitrary shapes can be generated, rather than being a segmented layout. According to some embodiments, a combination of dot-matrix layout and segmented layout is employed. According to some embodiments, central display 1016 is a backlit color liquid crystal display (LCD). An example of information displayed on the electronic display 1016 is illustrated in FIG. 10A, and includes central numerals 1020 that are representative of a current setpoint temperature.

Particular presentations displayed on the electronic display 1016 may depend on detected user input. For example, one of a plurality of variables (e.g., current setpoint temperature versus learning status) or variable values (e.g., 65 degrees versus 75 degrees) may be displayed. The one being displayed may depend on a user's rotation of the outer rotatable ring 1012. Thus, for example, when the device is configured to display a current setpoint temperature, the value being displayed may gradually increase as the user rotates the ring in a clockwise direction. The sign of the change in the displayed temperature may depend on whether the user is rotating the ring in a clockwise or counterclockwise direction. The speed at which the displayed temperature is changing may depend (e.g., in a linear manner) on the speed at which the user is rotating the ring.

As described above, a displayed characteristic may vary depending on received user input. For example, a displayed temperature may increase as a user rotates the outer rotatable ring 1012 clockwise, or a highlighted indicator may progress across a list of displayed options as the user rotates the ring 1012. Further, or additionally, user inputs may cause the appearance of new types of information. For example, if a user is viewing setpoint-temperature options, a dramatic clockwise rotation may cause a flashing red symbol (to convey an anti-environmental message). Thus, a relationship may exist between a single type of user input (e.g., ring rotation) and a change in an active variable (e.g., setpoint temperature changes), and relationships may further exist between the single type of user input and an inactive variable (e.g., an environmental warning flag). The latter relationship may be indirect and depend on a value or change in values of the active variable.

The presentations on the electronic display 1016 may depend on one or more types of user input. For example, the display may change in a first manner (e.g., to show a varying selection option) as a user rotates the outer rotatable ring 1012 and may change in a second manner (e.g., to confirm a selection or default to a menu screen) as the user exerts inwards pressure on the outer rotatable ring 1012.

According to some embodiments, metallic portion 1024 has number of slot-like openings so as to facilitate the use of a passive infrared motion sensor 1030 mounted thereberneath. The metallic portion 1024 can alternatively be termed a metallic front grille portion. Further description of the metallic portion/front grille portion is provided in the commonly assigned U.S. Ser. No. 13/199,108. The design of the metallic portion 1024 compliments the sleek, simple, uncluttered and elegant design of smart thermostat 102 while facilitating the integration and operation of sensors located within a housing of the thermostat. In the implementation as illustrated, smart thermostat 102 is enclosed by housing with a forward-facing surface including the cover 1014 and the metallic portion 1024. Some implementations of the housing include a back plate and a head unit. The housing provides an attractive and durable configuration for one or more integrated sensors used by smart thermostat 102 and contained therein. In some implementations, the metallic portion 1024 may be flush-mounted with the cover 1014 on the forward-facing surface of housing. Together the metallic portion 1024 as incorporated in housing does not detract from home or commercial decor, and indeed can serve as a visually pleasing centerpiece for the immediate location in which it is located.

The metallic portion 1024 is designed to conceal sensors from view promoting a visually pleasing quality of the thermostat yet permitting them to receive their respective signals. Openings in the metallic portion 1024 along the forward-facing surface of the housing allow signals to pass through that would otherwise not pass through the cover 1014. For example, glass, polycarbonate or other similar materials used for cover 1014 are capable of transmitting visible light but are highly attenuating to infrared energy having longer wavelengths in the range of 10 microns, which is the radiation band of operation for many passive infrared (PIR) occupancy sensors. Notably, included in the smart thermostat 102, according to some preferred implementations, is an ambient light sensor (not shown) and an active proximity sensor (not shown) positioned near the top of the thermostat just behind the cover 1014. Unlike PIR sensors, the ambient light sensor and active proximity sensor are configured to detect electromagnetic energy in the visible and shorter-infrared spectrum bands having wavelengths less than 1 micron, for which the glass or polycarbonate materials of the cover 1014 are not highly attenuating. In some implementations, the metallic portion 1024 includes openings in accordance with one or more implementations that allow the longer-wavelength infrared radiation to pass through the openings towards a passive infrared (PIR) motion sensor 1030 as illustrated. Because the metallic portion 1024 is mounted over the radiation receiving surface of PIR motion sensor 1030, PIR motion sensor 1030 continues to receive the longer wavelength infrared radiation through the openings and detect occupancy in an enclosure.

Additional implementations of the metallic portion 1024 also facilitate additional sensors to detect other environmental conditions. The metallic portion may at least partly conceal and/or protect one or more such sensors. In some implementations, the metallic portion 1024 helps a temperature sensor situated inside of the thermostat's housing measure the ambient temperature of air. Openings in the metallic portion 1024 promote air flow towards a temperature sensor located below the metallic portion 1024 thus conveying outside temperatures to the interior of the housing. In further implementations, the metallic portion 1024 may be thermally coupled to a temperature sensor promoting a transfer of heat from outside the housing.

The smart thermostat 102 is preferably constructed such that the electronic display 1016 is at a fixed orientation and does not rotate with the outer ring 1012, so that the electronic display 1016 remains easily read by the user. For some embodiments, the cover 1014 and metallic portion 1024 also remain at a fixed orientation and do not rotate with the outer ring 1012. According to one embodiment in which the diameter of the smart thermostat 102 is about 80 mm, the diameter of the electronic display 1016 is about 45 mm. According to some embodiments an LED indicator 1080 is positioned beneath portion 1024 to act as a low-power-consuming indicator of certain status conditions. For, example the LED indicator 1080 can be used to display blinking red when a rechargeable battery of the thermostat is very low and is being recharged. More generally, the LED indicator 1080 can be used for communicating one or more status codes or error codes by virtue of red color, green color, various combinations of red and green, various different blinking rates, and so forth, which can be useful for troubleshooting purposes.

Motion sensing as well as other techniques can be used in the detection and/or prediction of occupancy, as it is described further in the commonly assigned U.S. Ser. No. 12/881,430, supra. According to some embodiments, occupancy information is used in generating an effective and efficient scheduled program. Preferably, an active proximity sensor 1070A is provided to detect an approaching user by infrared light reflection, and an ambient light sensor 1070B is provided to sense visible light. The proximity sensor 1070A can be used to detect proximity in the range of about one meter so that the smart thermostat 102 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 1070B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the smart thermostat 102 is controlled by only two types of user input, the first being a rotation of the outer ring 1012 as shown in FIG. 10A (referenced hereafter as a "rotate ring" or "ring rotation" input), and the second being an inward push on an outer cap 1008 (see FIG. 10B) until an audible and/or tactile "click" occurs (referenced hereafter as an "inward click" or simply "click" input). For the embodiment of FIGS. 10A-10B, the outer cap 1008 is an assembly that includes all of the outer ring 1012, cover 1014, electronic display 1016, and metallic portion 1024. When pressed inwardly by the user, the outer cap 1008 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 10A-10B, an inward click can be achieved by direct pressing on the outer ring 1012 itself, or by indirect pressing of the outer ring by virtue of providing inward pressure on the cover 1014, metallic portion 1024, or by various combinations thereof. For other embodiments, the smart thermostat 102 can be mechanically configured such that only the outer ring 1012 travels inwardly for the inward click input, while the cover 1014 and metallic portion 1024 remain motionless. It is to be appreciated that a variety of different selections and combinations of the particular mechanical elements that will travel inwardly to achieve the "inward click" input are within the scope of the present teachings, whether it be the outer ring 1012 itself, some part of the cover 1014, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 1012 has been found particularly advantageous, since the user's fingers do not need to be lifted out of contact with the device, or slid along its surface, in order to go between ring rotations and inward clicks. Moreover, by virtue of the strategic placement of the electronic display 1016 centrally inside the rotatable ring 1012, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108.

Figure 10C:
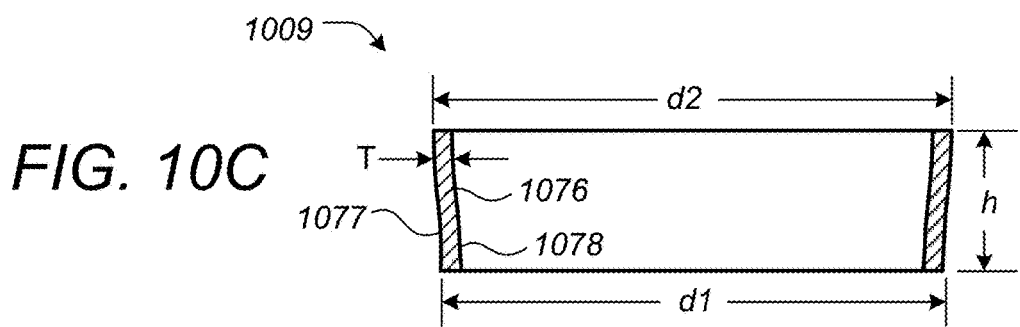

FIG. 10C illustrates a cross-sectional view of a shell portion 1009 of a frame of the thermostat of FIGS. 10A-B, which has been found to provide a particularly pleasing and adaptable visual appearance of the overall smart thermostat 102 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 1009 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 1009 has the shape of a frustum that is gently curved when viewed in cross-section, and comprises a sidewall 1076 that is made of a clear solid material, such as polycarbonate plastic. The sidewall 1076 is backpainted with a substantially flat silver- or nickel-colored paint, the paint being applied to an inside surface 1078 of the sidewall 1076 but not to an outside surface 1077 thereof. The outside surface 1077 is smooth and glossy but is not painted. The sidewall 1076 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 10C. The outer ring 1012 of outer cap 1008 is preferably constructed to match the diameter d2 where disposed near the second end of the shell portion 1009 across a modestly sized gap g1 therefrom, and then to gently arc back inwardly to meet the cover 1014 across a small gap g2. It is to be appreciated, of course, that FIG. 10C only illustrates the outer shell portion 1009 of the smart thermostat 102, and that there are many electronic components internal thereto that are omitted from FIG. 10C for clarity of presentation, such electronic components being described further hereinbelow and/or in other ones of the commonly assigned incorporated applications, such as U.S. Ser. No. 13/199,108.

According to some embodiments, the smart thermostat 102 includes a processing system 1060, display driver 1064 and a wireless communications system 1066. The processing system 1060 may be disposed within a housing of smart thermostat 102, coupled to one or more temperature sensors of smart thermostat 102 and/or coupled to rotatable ring 1012. The processing system 1060 may be configured to dynamically identify user input via rotatable ring 1012, dynamically identifying a variable value (e.g., a setpoint temperature value), and/or dynamically identify an HVAC-control-related property. The processing system 1060 may be configured and programmed to provide an interactive thermostat menuing system (e.g., such as the menuing system shown in FIG. 5) on display area 1016 responsive to an inward pressing of rotatable ring 1012 and/or to provide user navigation within the interactive thermostat menuing system based on rotation of rotatable ring 1012 and inward pressing of rotatable ring 1012 (e.g., such as is described in relation to FIG. 5). The processing system 1060 may be adapted to cause the display driver 1064 and display area 1016 to display information to the user and/or to receive user input via the rotatable ring 1012.

For example, an active variable (e.g., variable-value selection, setpoint selection, zip-code selection) may be determined based on a default state, smart logic or previously received user input. A relationship between the variable and user input may be identified. The relationship may be, e.g., linear or non-linear, continuous or discrete, and/or saturating or non-saturating. Such relationships may be pre-defined and stored within the thermostat. User input may be detected. Analysis of the user input may include, e.g., identifying: a type of user input (tapping versus rotation), a degree of input (e.g., a degree of rotation); a final input position (e.g., a final angular position of the rotatable ring); an input location (e.g., a position of a tapping); and/or a speed of input (e.g., a speed of rotation). Using the relationship, the processing system 1060 may then determine a display indicator, such as a digital numerical value representative of an identified value of a variable (e.g., a setpoint temperature). The display indicator may be displayed on display area 1016. For example, a digital numerical value representative of a setpoint temperature to be displayed may be determined based on a prior setpoint value and a saturating and continuous relationship between rotation input and the temperature. The displayed value may be, e.g., numeric, textual or graphical.

The processing system 1060 may further set a variable value in accordance with a user selection. For example, a particular type of user input (e.g., inwards pressure exertion) may be detected. A value of a selected variable may be determined based on, e.g., a prior ring rotation, displayed variable value, etc. The variable may then be set to this value.

The processing system 1060, according to some embodiments, is capable of carrying out the governance of the operation of smart thermostat 102 including the user interface features described herein. The processing system 1060 is further programmed and configured to carry out other operations as described further hereinbelow and/or in other ones of the commonly assigned incorporated applications. For example, processing system 1060 is further programmed and configured to maintain and update a thermodynamic model for the enclosure in which the HVAC system is installed, such as described in U.S. Ser. No. 12/881,463. According to some embodiments, the wireless communications system 1066 is used to communicate with devices such as personal computers and/or other thermostats or HVAC system components, which can be peer-to-peer communications, communications through one or more servers located on a private network, and/or communications through a cloud-based service.

It should be appreciated that the smart thermostat 102 could be equipped with a tactile mechanical feedback feature for providing software-triggered mechanical feedback to encourage energy efficient user behavior. For example, in the event a user attempts to input an ill-advised temperature setting (e.g., a setting that consumes a large amount of energy), the tactile mechanical feedback features provide the user with negative mechanical feedback, such as by vibrating, making the ring hard or impossible to turn.

Further, it should be appreciated that any of the smart devices described herein, such as the smart hazard detector, the smart thermostat, the smart wall switch, the smart doorbell, could have means for self-generating power and optionally storing the generated power in a local battery. For example, in some embodiments, the smart devices include a Peltier Junction for generating power. In these embodiments, for example, the Peltier Junction generates electricity from heat differentials created between the smart device and its mounting location, such as when the smart device gets hot from use. In other embodiments, the smart devices are equipped with generators, such as piezoelectric devices that generate electricity when the device is physically used, such as when a user turns the ring on the smart thermostat. While piezoelectric devices are used in this example, it should be appreciated that any generator devices known to those having skill in the art could be used.

Further included and illustrated in the exemplary smart-home environment 100 of FIG. 1 are service robots 162 each configured to carry out, in an autonomous manner, any of a variety of household tasks. For some embodiments, the service robots 162 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 162 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 162 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 162 is configured to move itself into the immediate presence (e.g., within five feet) of a particular occupant who has settled into a particular location in the home (e.g. in the dining room to eat their breakfast and read the news). The localized-thermostat service robot 162 includes a temperature sensor, a processor, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 162 proceeds to move and park itself next to the couch and keep that particular immediate space at a comfortable temperature.

Technologies by which the localized-thermostat service robot 162 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 162 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 162 can be considered to be facilitating what can be called a "personal safety-area network" for the occupant, with the objective being to ensure there is no excessive carbon monoxide, smoke, fire, etc.) in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 162, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 162 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 162 can be advised by other smart-home sensors that the temperature and humidity levels are rising in the kitchen, which is nearby to the occupant's current dining room location, and responsive to this advisory the hazard detector service robot 162 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 162 having respective dedicated ones of such functionalities, by a single service robot 162 having an integration of two or more different ones of such functionalities, and/or any combinations thereof (including the ability for a single service robot 162 to have both "away" and "human facing" functionalities) without departing from the scope of the present teachings. Electrical power can be provided by virtue of rechargeable batteries or other rechargeable methods, with FIG. 1 illustrating an exemplary out-of-the-way docking station 164 to which the service robots 162 will automatically dock and recharge its batteries (if needed) during periods of inactivity. Preferably, each service robot 162 includes wireless communication components that facilitate data communications with one or more of the other wirelessly communicating smart-home sensors of FIG. 1 and/or with one or more other service robots 162 (e.g., using Wi-Fi, Zigbee, Z-Wave, 6LoWPAN, etc.), and one or more of the smart-home devices of FIG. 1 can be in communication with a remote server over the Internet. Alternatively or in conjunction therewith, each service robot 162 can be configured to communicate directly with a remote server by virtue of cellular telephone communications, satellite communications, 3G/4G network data communications, or other direct communication method.

Provided according to some embodiments are systems and methods relating to the integration of the service robot(s) 162 with home security sensors and related functionalities of the smart home system. The embodiments are particularly applicable and advantageous when applied for those service robots 162 that perform "away" functionalities or that otherwise are desirable to be active when the home is unoccupied (hereinafter "away-service robots"). Included in the embodiments are methods and systems for ensuring that home security systems, intrusion detection systems, and/or occupancy-sensitive environmental control systems (for example, occupancy-sensitive automated setback thermostats that enter into a lower-energy-using condition when the home is unoccupied) are not erroneously triggered by the away-service robots.

Provided according to one embodiment is a home automation and security system (e.g., as shown in FIG. 1) that is remotely monitored by a monitoring service by virtue of automated systems (e.g., cloud-based servers or other central servers, hereinafter "central server") that are in data communications with one or more network-connected elements of the home automation and security system. The away-service robots are configured to be in operative data communication with the central server, and are configured such that they remain in a non-away-service state (e.g., a dormant state at their docking station) unless permission is granted from the central server (e.g., by virtue of an "away-service-OK" message from the central server) to commence their away-service activities. An away-state determination made by the system, which can be arrived at (i) exclusively by local on-premises smart device(s) based on occupancy sensor data, (ii) exclusively by the central server based on received occupancy sensor data and/or based on received proximity-related information such as GPS coordinates from user smartphones or automobiles, or (iii) any combination of (i) and (ii)) can then trigger the granting of away-service permission to the away-service robots by the central server. During the course of the away-service robot activity, during which the away-service robots may continuously detect and send their in-home location coordinates to the central server, the central server can readily filter signals from the occupancy sensing devices to distinguish between the away-service robot activity versus any unexpected intrusion activity, thereby avoiding a false intrusion alarm condition while also ensuring that the home is secure. Alternatively or in conjunction therewith, the central server may provide filtering data (such as an expected occupancy-sensing profile triggered by the away-service robots) to the occupancy sensing nodes or associated processing nodes of the smart home, such that the filtering is performed at the local level. Although somewhat less secure, it would also be within the scope of the present teachings for the central server to temporarily disable the occupancy sensing equipment for the duration of the away-service robot activity.

According to another embodiment, functionality similar to that of the central server in the above example can be performed by an on-site computing device such as a dedicated server computer, a "master" home automation console or panel, or as an adjunct function of one or more of the smart-home devices of FIG. 1. In such embodiment, there would be no dependency on a remote service provider to provide the "away-service-OK" permission to the away-service robots and the false-alarm-avoidance filtering service or filter information for the sensed intrusion detection signals.

According to other embodiments, there are provided methods and systems for implementing away-service robot functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s), on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot, and are further configured such that no disturbance-detected outcome will occur for as long as that particular detectable signal or environmental "signature" is detected. By way of example, a particular kind of vacuum-cleaning away-service robot may emit a specific sound or RF signature. For one embodiment, the away-service environmental signatures for each of a plurality of known away-service robots are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots for that home during that training session, and thereafter will suppress disturbance-detected outcomes for intervals in which those environmental signatures are heard.

Figure 15:
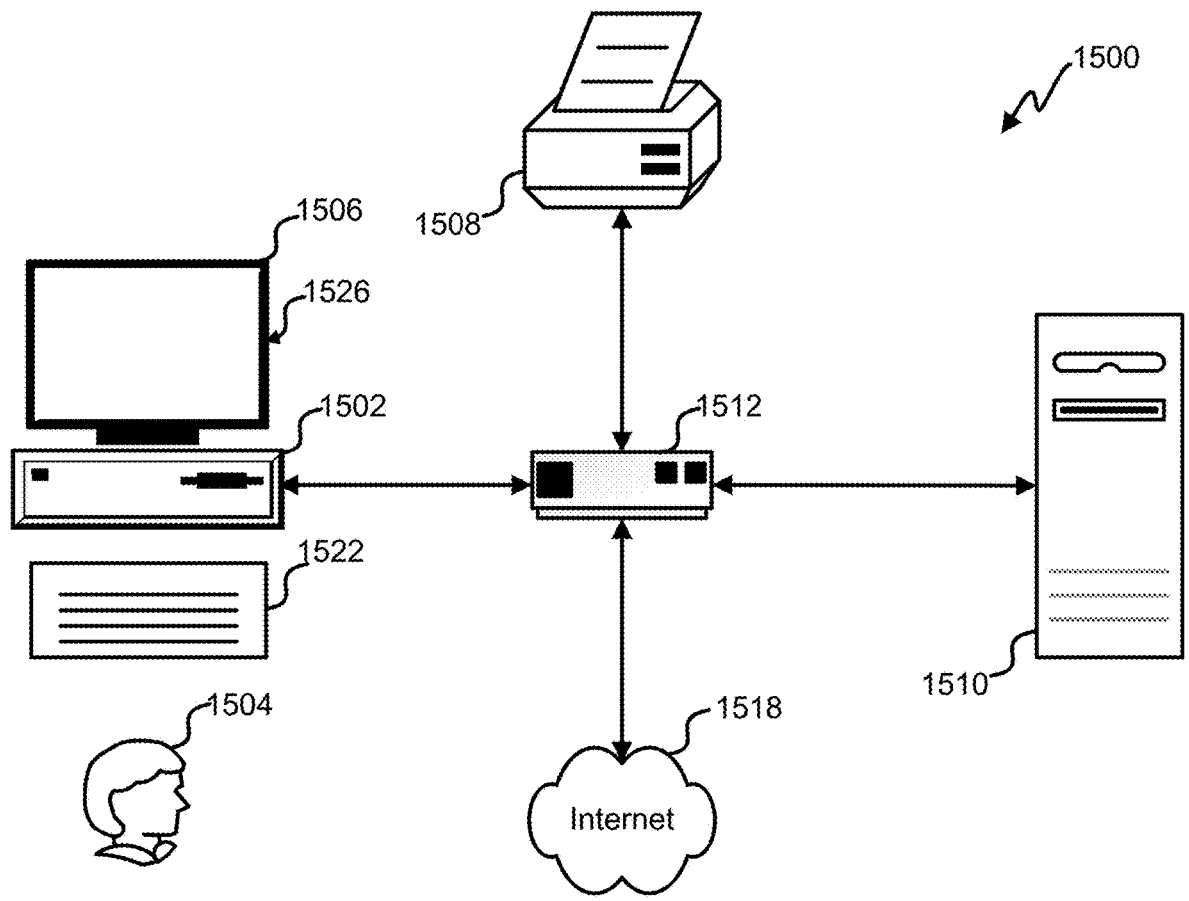
FIG. 15 illustrates a block diagram of an embodiment of a computer system.

Referring next to FIG. 15, an exemplary environment with which embodiments may be implemented is shown with a computer system 1500 that can be used by a user 1504 to remotely control, for example, one or more of the sensor-equipped, network-connected smart-home devices according to one or more of the embodiments. The computer system 1510 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. The computer system 1500 can include a computer 1502, keyboard 1522, a network router 1512, a printer 1508, and a monitor 1506. The monitor 1506, processor 1502 and keyboard 1522 are part of a computer system 1526, which can be a laptop computer, desktop computer, handheld computer, mainframe computer, etc. The monitor 1506 can be a CRT, flat screen, etc.

A user 1504 can input commands into the computer 1502 using various input devices, such as a mouse, keyboard, track ball, touch screen, etc. If the computer system 1500 comprises a mainframe, a designer 1504 can access the computer 1502 using, for example, a terminal or terminal interface. Additionally, the computer system 1526 may be connected to a printer 1508 and a server 1510 using a network router 1512, which may connect to the Internet 1518 or a WAN.

The server 1510 may, for example, be used to store additional software programs and data. In one embodiment, software implementing the systems and methods described herein can be stored on a storage medium in the server 1510. Thus, the software can be run from the storage medium in the server 1510. In another embodiment, software implementing the systems and methods described herein can be stored on a storage medium in the computer 1502. Thus, the software can be run from the storage medium in the computer system 1526. Therefore, in this embodiment, the software can be used whether or not computer 1502 is connected to network router 1512. Printer 1508 may be connected directly to computer 1502, in which case, the computer system 1526 can print whether or not it is connected to network router 1512.

Figure 16:
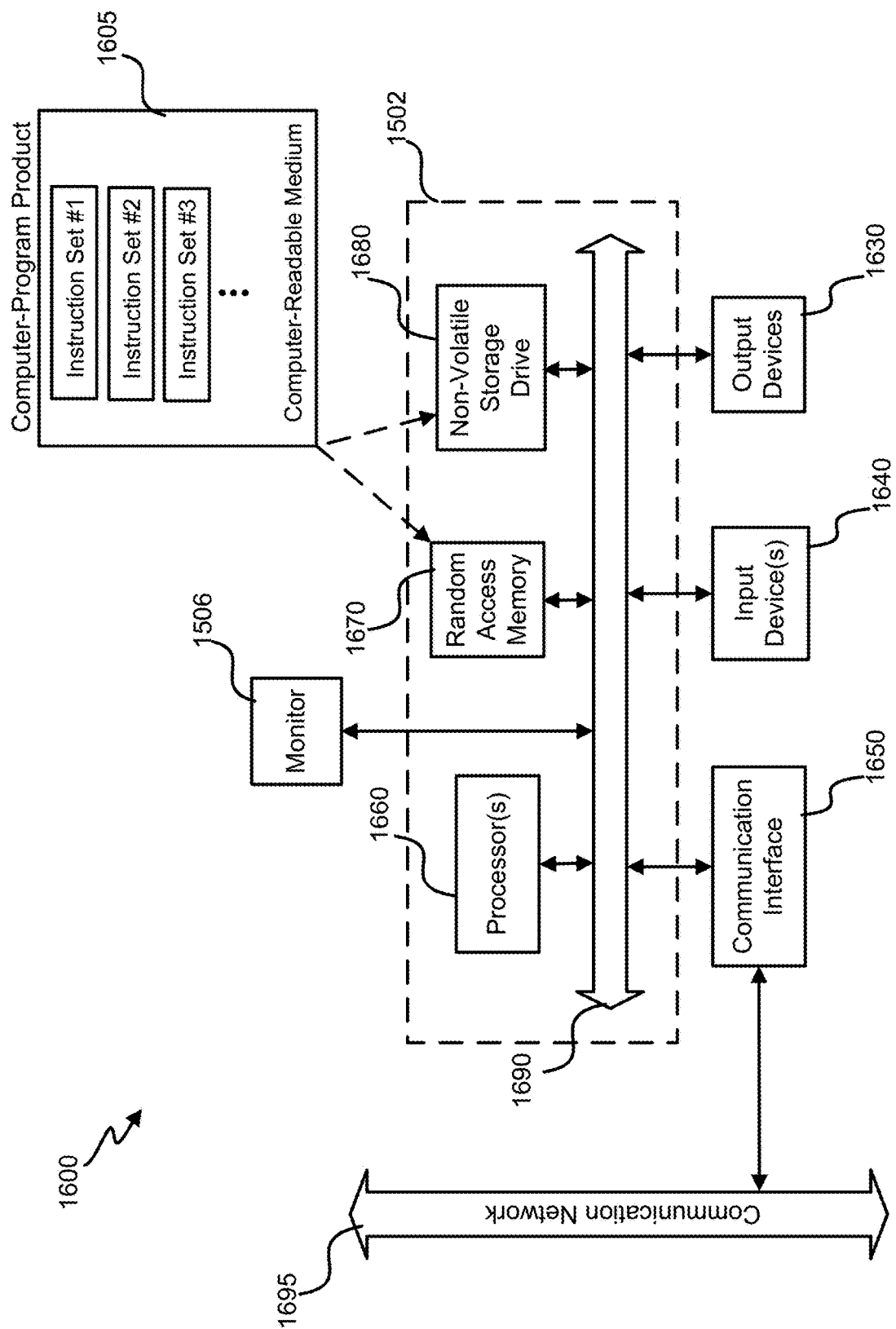
FIG. 16 illustrates a block diagram of an embodiment of a special-purpose computer.

With reference to FIG. 16, an embodiment of a special-purpose computer system 1600 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1526, it is transformed into the special-purpose computer system 1600.

Special-purpose computer system 1600 comprises a computer 1502, a monitor 1506 coupled to computer 1502, one or more additional user output devices 1630 (optional) coupled to computer 1502, one or more user input devices 1640 (e.g., keyboard, mouse, track ball, touch screen) coupled to computer 1502, an optional communications interface 1650 coupled to computer 1502 and/or a communication network 1695, a computer-program product 1605 stored in a tangible computer-readable memory in computer 1502. Computer-program product 1605 directs system 1600 to perform the above-described methods. Computer 1502 may include one or more processors 1660 that communicate with a number of peripheral devices via a bus subsystem 1690. These peripheral devices may include user output device(s) 1630, user input device(s) 1640, communications interface 1650, and a storage subsystem, such as random access memory (RAM) 1670 and non-volatile storage drive 1680 (e.g., disk drive, optical drive, solid state drive), which are forms of tangible computer-readable memory.

Computer-program product 1605 may be stored in non-volatile storage drive 1680 or another computer-readable medium accessible to computer 1502 and loaded into memory 1670. Each processor 1660 may comprise a microprocessor, such as a microprocessor from Intel® or Advanced Micro Devices, Inc.®, or the like. To support computer-program product 1605, the computer 1502 runs an operating system that handles the communications of product 1605 with the above-noted components, as well as the communications between the above-noted components in support of the computer-program product 1605. Exemplary operating systems include Windows® or the like from Microsoft Corporation, Solaris® from Sun Microsystems, LINUX, UNIX, and the like.

User input devices 1640 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1640 are typically embodied as a computer mouse, a trackball, a track pad, a joystick, wireless remote, a drawing tablet, a voice command system. User input devices 1640 typically allow a user to select objects, icons, text and the like that appear on the monitor 1506 via a command such as a click of a button or the like. User output devices 1630 include all possible types of devices and mechanisms to output information from computer 1502. These may include a display (e.g., monitor 1506), printers, non-visual displays such as audio output devices, etc.

Communications interface 1650 provides an interface to other communication networks and devices and may serve as an interface to receive data from and transmit data to other systems, WANs and/or the Internet 1518. Embodiments of communications interface 1650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1650 may be coupled to a computer network, to a FireWire® bus, or the like. In other embodiments, communications interface 1650 may be physically integrated on the motherboard of computer 1502, and/or may be a software program, or the like.

RAM 1670 and non-volatile storage drive 1680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1670 and non-volatile storage drive 1680 may be configured to store the basic programming and data constructs that provide the functionality of various embodiments of the present invention, as described above.

Software instruction sets that provide the functionality of the present invention may be stored in RAM 1670 and non-volatile storage drive 1680. These instruction sets or code may be executed by the processor(s) 1660. RAM 1670 and non-volatile storage drive 1680 may also provide a repository to store data and data structures used in accordance with the present invention. RAM 1670 and non-volatile storage drive 1280 may include a number of memories including a main random access memory (RAM) to store of instructions and data during program execution and a read-only memory (ROM) in which fixed instructions are stored. RAM 1670 and non-volatile storage drive 1680 may include a file storage subsystem providing persistent (non-volatile) storage of program and/or data files. RAM 1670 and non-volatile storage drive 1680 may also include removable storage systems, such as removable flash memory.

Bus subsystem 1690 provides a mechanism to allow the various components and subsystems of computer 1502 communicate with each other as intended. Although bus subsystem 1690 is shown schematically as a single bus, alternative embodiments of the bus subsystem may utilize multiple busses or communication paths within the computer 1502.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. According to embodiments, storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

What is claimed is:

1. A home automation system, comprising:
a service robot system that comprises:
a service robot that autonomously moves within a structure to perform a household task; and
a wireless communication interface, wherein the service robot system is configured to transmit, via the wireless communication interface, an indication of robot activity indicative of the service robot moving within the structure; and
a home security system comprising a plurality of motion sensors, distributed across a plurality of different types of smart-home devices, that detect motion within the structure, wherein the home security system is configured to:
determine that no occupants are present within the structure based on a lack of movement detected by the plurality of motion sensors;
transmit a permission message that authorizes the service robot to move within the structure in response to determining that no occupants are present within the structure; and
distinguish intrusion activity from robot activity based at least in part on the indication of robot activity transmitted by the wireless communication interface of the service robot system.

2. The home automation system of claim 1, wherein the indication of the robot activity comprises in-home location coordinates of the service robot.

3. The home automation system of claim 1, wherein the indication of robot activity comprises a signal output by the service robot while moving.

4. The home automation system of claim 3, wherein the signal is selected from the group of signals consisting of: an optical notifying signal, an audible notifying signal, an infrared notifying signal, an ultrasonic notifying signal, and a wirelessly transmitted data notification.

5. The home automation system of claim 1, wherein the service robot system deploys the service robot at least partially based on the permission message being received.

6. The home automation system of claim 1, wherein the home security system filters detected movement based on an occupancy sensing profile that indicates expected movement by the service robot.

7. The home automation system of claim 1, wherein the household task is selected from the group of household tasks consisting of: floor sweeping, floor washing, playing music for an occupant, serving as a localized thermostat for an occupant, serving as a localized air monitor or purifier for an occupant, serving as a localized baby monitor, and serving as a localized hazard detector for an occupant.

8. The home automation system of claim 1, wherein the service robot system is configured to:
transmit, via the wireless communication interface, a request for the service robot to be permitted to move within the structure; and
deploy the service robot in response to receiving a permission granted message in response to the request.

9. The home automation system of claim 1, wherein the home security system is configured to distinguish intrusion activity from robot activity based at least in part on detecting an activity signature of the service robot, wherein the activity signature indicates sounds, vibrations, and/or RF emissions emitted by the service robot when deployed.

10. The home automation system of claim 1, wherein the home security system comprises a remote server system that is remotely located from the structure.

11. A method for using a service robot in a presence of a home security system, the method comprising:
monitoring, by the home security system, an interior of a structure for motion using a plurality of motion sensors distributed across a plurality of different types of smart-home devices;
determining that no occupants are present within the structure based on a lack of movement detected by the plurality of motion sensors;
transmitting, by the home security system, a permission message that authorizes the service robot to move within the structure in response to determining that no occupants are present within the structure;
receiving, by the home security system, an indication of robot activity indicative of the service robot moving within the structure; and suppressing, by the home security system, a motion notification based at least in part on the received indication of robot activity.

12. The method for using the service robot in the presence of the home security system of claim 11, wherein the indication of the robot activity comprises in-home location coordinates of the service robot.

13. The method for using the service robot in the presence of the home security system of claim 11, wherein the indication of robot activity comprises a signal output by the service robot while moving.

14. The method for using the service robot in the presence of the home security system of claim 13, wherein the signal is selected from the group of signals consisting of: an optical notifying signal, an audible notifying signal, an infrared notifying signal, an ultrasonic notifying signal, and a wirelessly transmitted data notification.

15. The method for using the service robot in the presence of the home security system of claim 11, further comprising: deploying the service robot at least partially in response to the permission message being received.

16. The method for using the service robot in the presence of the home security system of claim 11, the method further comprising:
transmitting, by a service robot system, a request for the service robot to be permitted to move within the structure; and
deploying, by the service robot system, the service robot in response to receiving a permission granted message in response to the request.

* * * * *